(12) United States Patent  
Tonkovich et al.

(10) Patent No.: US 8,122,909 B2
(45) Date of Patent: Feb. 28, 2012

(54) SURFACE FEATURES IN MICROPROCESS TECHNOLOGY

(75) Inventors: Anna Lee Tonkovich, Dublin, OH (US); Bin Yang, Columbus, OH (US); Steven T. Perry, Galloway, OH (US); Sean P. Fitzgerald, Columbus, OH (US); Ravi Arora, New Albany, OH (US); Kai Jarosch, Bexley, OH (US); Thomas D. Yuschak, Lewis Center, OH (US); Maddalena Fanelli, Columbus, OH (US); Tim Sullivan, Dublin, OH (US); Terry Mazanec, Solon, OH (US)

(73) Assignee: Velocys, Plain City, OH (US)

( * ) Notice: Subject to any disclaimer, the term of this patent is extended or adjusted under 35 U.S.C. 154(b) by 918 days.

(21) Appl. No.: 11/388,792

(22) Filed: Mar. 23, 2006

(65) Prior Publication Data

US 2007/0017633 A1 Jan. 25, 2007

Related U.S. Application Data

(63) Continuation-in-part of application No. 11/089,440, filed on Mar. 23, 2005.

(60) Provisional application No. 60/697,900, filed on Jul. 8, 2005, provisional application No. 60/727,126, filed on Oct. 13, 2005, provisional application No. 60/731,596, filed on Oct. 27, 2005.

(51) Int. Cl.
*F15C 1/06* (2006.01)

(52) U.S. Cl. ............................ 137/833; 210/511; 210/634

(58) Field of Classification Search ....................... None
See application file for complete search history.

(56) References Cited

U.S. PATENT DOCUMENTS

| | | | |
|---|---|---|---|
| 4,715,436 | A | 12/1987 | Takahashi et al. |
| 6,241,379 | B1 | 6/2001 | Larsen |
| 6,736,983 | B1 | 5/2004 | Thies et al. |
| 6,755,211 | B1 | 6/2004 | O'Connor et al. |
| 7,473,404 | B2 | 1/2009 | Chopard et al. |
| 2003/0152488 | A1 | 8/2003 | Tonkovich et al. |
| 2004/0028580 | A1 | 2/2004 | Toru et al. |
| 2004/0228781 | A1 | 11/2004 | Tonkovich et al. |
| 2005/0244304 | A1 | 11/2005 | Tonkovich et al. |
| 2005/0272965 | A1 | 12/2005 | Tonkovich et al. |
| 2006/0016215 | A1 | 1/2006 | Tonkovich et al. |
| 2006/0016216 | A1 | 1/2006 | Tonkovich et al. |
| 2006/0142401 | A1 | 6/2006 | Tonkovich et al. |

FOREIGN PATENT DOCUMENTS

| WO | W003/011443 | 2/2003 |
|---|---|---|
| WO | WO 03/011443 | 2/2003 |

OTHER PUBLICATIONS

Stroock, Abraham D., et al. Controlling Flows in Microchannels with Patterned Surface Charge and Topography, 2003, Accounts of Chemical Research, vol. 36, pp. 597-604.*

(Continued)

*Primary Examiner* — Vickie Kim
*Assistant Examiner* — Robert Xu
(74) *Attorney, Agent, or Firm* — Frank Rosenberg

(57) ABSTRACT

This invention relates to microchannel apparatus that includes microchannels with interior surface features for modifying flow; processes utilizing this microchannel architecture, and methods of making apparatus having these features.

21 Claims, 20 Drawing Sheets

OTHER PUBLICATIONS

Written Opinion of the International Searching Authority, PCT/US2006/011198, mailed Aug. 3, 2006.

Kandlikar, "Exploring Roughness Effect on Laminar Internal Flow—Are We Ready for Change?" Nanoscale and Microscale Thermophysicl Engineering, 12, 61-82, 2008.

Jensen, "Smaller, faster chemistry," Nature, 735-736, 1998.

Stroock et al., "Controlling Flows in Microchannels with Patterned Surface Charge and Topography," Acc. Chem. Res. 2003, 36, 597-604.

Stroock et al., "Chatoic Mixer for Microchannels," Science, vol. 295, 647-651 (2002).

Liu et al., "Two-fluid mixing in a microchannel," Int'l J. Heat and Fluid Flow 25 (2004) 986-995.

Chew et al., "Techniques to enhance fluid micromixing and chaotic micromixers," Mod. Phys. Lett. B, vol. 19 (2005) 1567-1570.

Schonfeld et al., "Simulatoin of Helical Flows in Microchannels," AIChE Journal, 771-778, 2004.

Hessel et al., "Micromixers—a review on passive and active mixing principles," Chem. Eng. Sci. 60 (2005) 2479-2501.

Office Action (English Translation) from corresponding JP Application No. 2008-503289, mailed Aug. 31, 2010.

Office Action (English Translation) from corresponding CN Application No. 2006-80017580.9, mailed Jul. 27, 2010.

\* cited by examiner

Option 1

Option 2

Option 3

Option 4

CIS B
FLOW

Figure 3. Concept A design detail

FANELLI

SHARKS TOOTH

HOUSE

SURFACE FEATURES IN MICROPROCESS TECHNOLOGY

RELATED APPLICATIONS

This application is a continuation-in-part of U.S. patent application Ser. No. 11/089,440 filed 23 Mar. 2005. Also, in accordance with 35 U.S.C. sect. 119(e), this application claims priority to U.S. Provisional Applications Nos. 60/697,900 filed 8 Jul. 2005, 60/727,126 filed 13 Oct. 2005 and 60/731,596 filed 27 Oct. 2005.

FIELD OF THE INVENTION

This invention relates to microchannel apparatus that includes microchannels with interior surface features for modifying flow; processes utilizing this microchannel architecture, and methods of making apparatus having these features.

INTRODUCTION

In recent years there has been tremendous academic and commercial interest in microchannel devices. This interest has arisen due to the advantages from microtechnology including reduced size, increased productivity, the ability to size systems of any desired capacity (i.e., "number-up" channels), increased heat transfer, and increased mass transfer. A review of some of the work involving microreactors (a subset of microchannel apparatus) has been provided by Gavrilidis et al., "Technology And Applications Of Microengineered Reactors," Trans. IChemE, Vol. 80, Part A, pp. 3-30 (January 2002).

Surface features have been used for mixing within microchannels. The prior art employs surface features in microfluidic applications to enhance mixing of two fluid streams at very low Reynolds numbers. Typical values of Reynolds numbers are less than 100, and more often on the order of 0.1 to 10. A good mixer is defined by a small variation in mass composition in the cross sectional area exiting the micromixer. Further, the prior art suggests that the use of surface features is particularly useful at low Reynolds numbers, but the mixing efficiency decreases as the Reynolds numbers increases beyond 10 or 100.

The prior art micromixers that are based on the use of a grooved or recessed angled wall or walls was first discussed by Svasek in 1996, where a series of angled grooves (one constant angle diagonal groove per feature) were placed in one wall for mixing an iodine blue starch solution with a photographic fixer solution. Enhanced mixing was described as compared to a flat channel, where the objective was to mix by folding the flow in the main channel such that the diffusion distance of the two liquids in the main flow channel is reduced and diffusion can complete the final mixing. The groove depth to channel gap ratio is 0.25.

The use of grooved surfaces again appeared in December 2001 on the web by Johnson, Ross and Locascio who described the use of four diagonal grooves (one constant diagonal groove per feature) to enhance mixing in the main channel of a micromixer. The authors describe improved mixing at lower flowrates or lower Reynolds numbers for all cases evaluated. They also describe the addition of varying angles on diagonal grooves after a section of 4 repeated like grooves. While the performance was improved, mixing performance decreased as the Reynolds number increased. The well or groove depth to channel gap ratio was 2.74.

In January 2002, Strook et al describe in Science the use of two groove channel micromixers, one with a constant oblique angle groove and a second pattern referred to as a staggered herringbone mixer (SHM), where the angled features were changed after six features in series. The focus of this work was to improve mixing of two liquids across the microchannel for low Reynolds numbers streams (less than 100). The authors describe that the mixing length increases linearly with the log of the Peclet number. The Peclet number is defined by the velocity times the channel gap divided by the diffusivity. At higher velocities, the required mixing length increase, showing disadvantaged mixing. The groove depth to channel gap ratio was a maximum of 0.6 for the SHM.

Also in 2002, Strook et al describe in Analytical Chemistry a series of like oblique angles with constant angle for mixing a fluid mixture with a Reynolds number of, where The groove depth to channel gap ratio was a maximum of 1.175. The authors describe the helicity of the flow which reflects the pitch of the rotating flow stream. The authors state that the staggered herringbone mixer will speed up mixing in microfluid devices by creating Lagrangian chaos at low Reynolds numbers.

Johnson and Locascio in June 2002 describe a micromixer with four slanted grooves in series to enhance mixing in the bulk flow channel. The authors state that the transport of the liquid increased across the channel as the well or groove depth increased up to 50 microns, with no increase beyond this depth. Larger depths were stated as a dead zone area where flow or molecules could be trapped rather than mixed. The Reynolds number was less than 1. The authors also state that the axial dispersion of the channels with wells or grooves was higher than the axial dispersion for the flat or well-less walls. The groove depth to channel gap ranged from 0.32 to 2.74. Beyond a ratio of 1.6 the authors note no additional improvement. In all cases, the figures show little access of the mixing fluid against the inner wall of the groove.

Strook and Whitesides discuss, in Accounts of Chemical Research, in 2003 the use of the staggered herringbone mixer to stretch and fold the flow in the main channel by changing the orientation of the grooves at regular intervals or cycles. A groove depth to channel gap ratio of 0.44 was used for Reynolds numbers less than 1. The authors state that the mixing length is proportional to the log of the flow velocity because the staggered herringbone mixers (SHM) promote chaotic advection in the main flow channel. In unmixed channels, the mixing length is proportional to the flow velocity. The authors also state that the SHM reduces dispersion for Poiseuille flow in microchannels.

In 2003, Aubin et al describe in Chemical Engineering Technology that the diagonal mixer creates very little convective mixing because a strong helical flow is created around the edge of the channel but does not incorporate the center flow of the channel. The SHM by contrast creates very good in-channel mixing. The groove depth to channel gap ratio was less than 0.6 in this study. The Reynolds number was 2. The authors state that the lowest levels of fluid deformation (indicative of fluid stretching or movement) are found in the channel grooves but that this may not be a good metric for quantifying mixing performance.

Wang et al published in July 2003 in J. Micromech. Microeng a numerical investigation of microchannels with patterned grooves. The groove depth to channel gap ratio varied from 0.1 to 0.86. A Reynolds number range from 0.25 to 5 was used. The pattern consisted of a series of like oblique angled grooves, each with a constant angle. The authors state the groove aspect ratio as the most important variable for mixing, where the 0.86 was better than the 0.1. The flow patterns appear to be a single vortex in the main channel.

From the figures it appears that the amplitude of the rate of shear or defined helicity is lower as Reynolds number is increased. The mean or average shear or helicity over the cycle appears to be independent of Reynolds number. The authors state that chaotic advection was not present for this geometry. The authors state that patterned grooves in microchannels create dead volumes but that deeper features also improve mixing and reduce the channel length for mixing. These mixers are stated to work at a relatively low flow velocity (Re<5) which reduces pressure drop.

Bennett and Wiggins published, in 2003 on the web a comparison of various geometries of the SHM. Specifically, the short legs were removed and the grooves were halved and doubled in depth. The Reynolds number was less than 0.1. Improved mixing was found with the double depth grooves over the original SHM, where removing the short legs was slightly worse as was the half depth grooves over the original SHM. The authors state the effectiveness of the mixer as a result of ditch mixing, where some fluid is shuttled across the channel in the groove or ditch to add more shear to the fluid and thus enhance mixing. As a result of this proposed mechanism, the authors suggest that the short legs of the SHM may be removed with very little impact—thus creating features with only one angle. The authors also state that the pressure drop for the grooved channels is less than the simple grooveless channels because the openings of the grooves effectively act to weaken the no-slip boundary condition. Finally, the authors discuss the mixing length as an increasing function with the log of the Pe. That is the mixing length increases with either an increasing velocity or diffusion distance or a decreasing mass diffusivity.

Kim et al in April 2004 published the use of a barrier embedded chaotic micromixer, where a barrier is placed within the main flow channel in addition to a series array of angled grooves that contain one angle per feature. The authors note that features could be patterned on both the top and bottom of a channel and that stronger helical flows could be achieved. The authors suggest that stronger helical flows will create higher order mixing. The groove depth to channel gap ratio is 0.15. The height of the barrier is 40 microns extending into the 60 micron microchannel gap. The Reynolds number varied from 0.228 to 2.28. The authors show that the mixing intensity decreases as the Reynolds number increases within a given length of microchannel (21 mm), and that the mixing length increases logarithmically with increasing Reynolds number.

Also in April 2004, Schonfeld and Hardt published work on helical flows in microchannels. They state that heat transfer from the channel walls is enhanced and hydrodynamic dispersion of concentration tracers transported through a channel is reduced. They numerically evaluated a surface feature pattern with one oblique angle groove on either one or two walls of the microchannel with a ratio of groove depth to channel gap from 0.02 to 6.3. The authors state that the average of the ratio of transverse velocity vectors in the y (channel width) and x (channel length) planes within the surface features increases linearly from −1 to −0.4 in the groove well and then increases exponentially in the main channel flow path until leveling off at the channel center line at zero or essentially no net cross channel flow in the bulk flow channel. The cross channel flow vectors move back and forth at roughly the same velocity. The authors state that with two walls, the lamellae entanglement of the two fluid streams to be mixed is increased thus creating an enlarged interfacial surface area for diffusive mixing in the main channel. The authors analyzed the dependency of the relative transverse velocity on Reynolds number and reported finding a surprisingly weak dependency. The absolute transverse velocity within the oblique ridges is enhanced when the Reynolds number varies from 1 to 1000, the relative transverse velocity above the structures is only scarcely affected. For the cases stated, the ratio of average y and x velocity in the main channel is about zero across the gap of the microchannel. As Reynolds number increased, the relative velocity of fluid across the main channel in the width direction was not changed.

Locascio published in May 2004 a summary of microfluid mixing. She stated that mixing was induced by fluid rolling or folding as it passed over the features at the bottom of the channel. Little fluid motion is shown at the bottom of the channel. Mixing in the groove channel devices occurred by diffusive mixing that was enhanced by reducing the diffusion length between two fluids through the folding effect.

Also in May 2004, Kang and Kwon published a comparison of the slanted groove micromixer (all features with one angle), the SHM, and the barrier embedded micromixer. Each had a ratio of groove depth to channel gap of 0.1765. Each contained 24 features in series, where the SHM had two sets of 12 features where the apex of the two-angled feature moved from one side to the other side of the channel. The Reynolds number is stated to be on the order of 0.01. The slanted groove mixer is stated to be a poor mixer and the SHM to be the best mixer. The in channel flow patterns show a folding and blending of material in the main flow channel.

Liu, Kim, and Sung published in July 2004 a study evaluating grooved micromixers. The dimensions from Strook's Science article were scaled with a constant aspect ratio to evaluate a channel with a hydraulic diameter of 200 microns versus 111 microns. The resulting ratio of groove depth to channel gap was 0.23. The mixing performance at a Reynolds number of 1 was slightly better than at a Reynolds number of 10. The authors state that the mixing performance deteriorated at higher Reynolds numbers due to a significant reduction in the residence time of the fluids inside the mixer.

Strook and McGraw in March 2004 published a simple lid-driven cavity flow model to qualitatively compare the mixing patterns to actual experiments. The model looked at the SHM with a total surface feature repeating unit length of 0.9 mm. The groove depth to channel gap is 0.44. The Stokes flow of Reynolds number approaching 0 was used in the model to compare with the Re=0.01 flow. Qualitatively the model described the results of the experiment, specifically that the movement of one "lobe of fluid" from one lobe right to left and one from left to right through the SHM grooves. However, the models Stokes flow relegates it to non-inertial flows where flow inertia can't compete with momentum diffusion.

Sato et al published in November 2004 a study with slanted single angle feature on 3 walls. The authors describe a tight spiral flow that is created. The ratio of groove depth to channel gap is 0.3. The authors state better results when the features on the two side walls are shifted, where 5 slant grooves in a row are present on one side wall then stop while 5 slant grooves in a row start on the opposing side wall and stop and so on. The Reynolds number is less than 10 for this work.

Howell et al in April 2005 published a study with grooves placed on the top and bottom of the microchannel. The grooves consisted of a set of 4 slanted single angle grooves followed by four chevron grooves then followed again by 4 single angle grooves and so on. The ratio of groove depth to channel gap ranged from 0.24 to 0.74. the Reynolds number studied ranged from 0.06 to 10. The flow primarily stretched and folded in the main flow path to create more closely spaced lamellae for diffusive mixing. The authors state that they find no significant change in the flow pattern is observed over the range of Reynolds numbers investigated.

Yang, Huang, and Lin published in August 2005 a study of geometric effects on fluid mixing in grooved micromixers. Again, the fluid was stated as folding and stretching to reduce the diffusion length for mixing. The ratio of groove depth to channel gap ranged from 0.15 to 0.44. The Reynolds number was 10. The authors state no significant correlation between pressure loss and mixing index. The authors evaluated the SHM with sets of 6 like features in a row before alternating the location of the apex of the next set of 6 like features along the width of the main channel. The ratio of flow in the grooves to the main channel is considered to be an important metric for mixing. The maximum flowrate in the groove relative to the flowrate in the main channel is 8.9%.

REFERENCE LIST

Aubin, Joelle, Fletcher, David F., Bertrand, Joel and Xuereb, Catherine, "Characterization of the Mixing Quality in Micromixers," *Chem. Eng. Technol.* 26, 12 (2003).

0 Bennett, John Patrick and Wiggins, Chris H., "A Computational Study of Mixing MicroChannel Flows," Columbus University, New York, N.Y., Jul. 15 (2003).

Chew, Y. T., Xia, H. M. and Shu, C, "Techniques to Enhance Fluid Micro-Mixing and Chaotic Micromixers," *World Scientific Modern Physics Letters B*, Vol. 19, Nos. 28 & 29, 1567-1570 (2005).

Hessel, Volker, Lowe, Holger and Schonfeld, Friedhelm, "Micromixers—a review on passive and active mixing principles," *Chemical Engineering Sciences* 60, 2479-2501 (2005).

Howell, Peter B., Mott, David R., Fertig, Stephanie, Kaplan, Carolyn R., Golden, Joel P., Oran, Elaine S. and Ugler, Frances S., "A microfluidic mixer with grooves placed on top and bottom of the channel," *The Royal Society of Chemistry Lab Chip*, 5, 524-230, (2005).

Johnson, Timothy J. and Locascio, Laurie E., "Characterization and optimization of slanted well designs for microfluidic mixing under electroosmotic flow," *The Royal Society of Chemistry*, Lab Chip, 2, 135-140(2002).

Johnson, Timothy J., Ross, David and Locascio, Laurie E., "Rapid Microfluidic Mixing," *Analytical Chemistry*, Vol. 74, No. 1, Jan. 1 (2002).

Kang, Tae Gon and Kwon, Tai Hun, "Colored particle tracking method for mixing analysis of chaotic micromixers," *Journal of Micromechanics and Microengineering*, 14, 891-899 (2004).

Kim, Dong Sung, Lee, Seok Woo, Kwon, Tai Hun and Lee, Seung S., "A barrier embedded chaotic micromixer," *Journal of Micromechanics and Microengineering*," 14, 798-805 (2004).

Liu, Ying Zheng, Kim, Byoung Jae and Sung, Hyung Jin, "Two-fluid mixing in a microchannel," *Elsevier International Journal of Heat and Fluid Flow*, 25, 986-995 (2004).

Locascio, Laurie E., "Microfluidic mixing," *Anal Bioanal Chem*, 379: 325-327, May 5 (2004).

Nguyen, Nam-Trung and Wu, Zhigang, "Micromixers—a review." *Journal of Micromechanics and Microengineering* 15 R1-R16 (2005).

Sato, Hironobu, Ito, Seiki, Tajima, Kenji, Orimoto, Norimune, Shoji, Shuichi, "PDMS microchannels with slanted grooves embedded in three walls to realize efficient spiral flow," *Elsevier B.V. Sensors and Actuators A* 119, 365-371, (2005).

Schonfeld, F., Hessel, V. and Hofmann, C, "An optimized split-and-recombine micro-mixer with uniform 'chaotic' mixing," *The Royal Society of Chemistry Lab Chip*, 4, 65-69 (2004).

Schonfeld, Friedhelm and Hardt, Steflen, "Simulation of Helical Flows in Microchannels," *AlChE Journal* Vol. 50, No. 4 April (2004).

Stremler, Mark A., Haselton, F. R. and Aref, Hassan, "Designing for chaos; applications of chaotic advection at the microscale," *The Royal Society* 362, 1019-1036 (2004).

Stroock, Abraham D. and McGraw, Gregory J., "Investigation of the staggered herringbone mixer with a simple analytical model," *The Royal Society* 10.1098/rsta. 1357 (2003).

Stroock, Abraham D. and Whitesides, George M , "Controlling Flows in Microchannels with Patterned Surface Change and Topography," *Accounts of Chemical Research*, 597-604, Vol. 36, No. 8. (2003).

Stroock, Abraham D., Dertinger, Stephan K., Whitesides, George M. and Ajdari, Armand, "Patterning Flows Using Grooved Surfaces," *Analytical Chemistry*, Vol. 74, No. 20, Oct. 15, (2002).

Stroock, Abraham D., Dertinger, Stephan K. W., Ajdari, Armand, Mezic, Igor, Stone, Howard A., and Whitesides, George M., "Chaotic Mixer for Microchannels," *Science* Vol. 295, 25 Jan. (2002).

Svasek, Peter, Jobst, Gerhard, Urban, Gerald and Svasek, Edda, "Dry Film Resist Based Fluid Handling Components for μTAS," *Analytical Methods & Instrumentation: Special Issue*, 78-80, (1996).

Wang, Hengzi, Iovenitti, Pio, Harvey, Erol and Masood, Syed, "Numerical investigation of mixing in microchannels with patterned grooves," *Journal of Micromechamcs and Microengineering* 13, 801-808 (2003).

Wang, Hengzi, Masood, A/Prof. Syed, Iovenitti. Dr. Pio and Harvey, A/Prof. Erol, "Passive Mixing in a MicroChannel," Abstract, 261-268.

Yang, Jing-Tang, Huang, Ker-Jer and Lin, Yu-Chun, "Geometric effects on fluid mixing in passive grooved micromixers," *The Royal Society of Chemistry Lab Chip*, 5, 1140-1147 (2005).

SUMMARY OF THE INVENTION

In the present invention, surface features in microchannels can be used to enhance unit operations as the Reynolds number is increased. In the invention, the surface features can be advantageously employed at Re of 100 or more, in some embodiments Re is 200 or more, 1000 or more. and in some embodiments Re is in the range of 300 to 2200. Further, the use of surface features offers additional surprising enhancement in the turbulent regime as well.

An important element in many aspects of the present invention is the interaction of fluid molecules with an "active surface." A surface is considered active if either mass or heat is exchanged at the surface. The surface is inclusive of the floor and sides of the grooves as well as the ridges between features. A "ridge" is a wall or the surface that connects at least two open surface features and is open to the main flow channel. As the number of interactions of the fluid with the active surface is increased, the performance of the unit operation is further enhanced. For the case of a chemical reactor, a heterogeneous catalyst may be disposed within the surface features as well as on the tops or ridges or flat regions of the microchannel and optionally along all surfaces or selected surfaces. Rather than diffusion as the sole driving force for movement of the reacting species to the active wall, advection or flow convection becomes a dominant driving force for quickly moving reactants to the catalytic wall and removing products from the wall to the bulk flow stream. As an example, if diffusion alone is the dominant driving force for moving flow from the bulk to the active catalyst wall, a characteristic time may be on the order of a few to tens of milliseconds for gaseous chemical reactors that operate with an overall contact time of a few to tens of milliseconds. For a stream of methane and air in a 1 mm channel at 850 C and 1.0 bar the diffusivity is about 2.2 cm^2/sec and the diffusion distance from the center of the channel gap (assuming that catalyst is disposed in active surface features on both sides of the microchannel gap) is about 0.5 mm. The resulting characteristic time for diffusion is on the order of 1 millisecond.

A characteristic average velocity in the main channel is 100 m/s for a high velocity and high laminar Reynolds number example (Re on the order of 700 for a dilute methane stream in air at 850 C and 1 atm). At this velocity for a purely laminar stream, the centerline velocity is 1.5 times the average, for a total of 150 m/s. In a 10 cm length channel, the molecules flowing along the centerline of the channel gap would spend on average roughly 0.7 ms in the channel. Thus diffusion alone would likely be insufficient for those reacting molecules to hit the active catalyst wall. Even if the velocity in the main channel were ten times lower, at an average velocity of 10 m/s for a Reynolds number less than 100, the residence time of the centerline molecules (meaning molecules near the center of the channel gap) would raise to 7 milliseconds. In essence, by diffusion alone there would be on average of less than ten collisions of the centerline reacting molecules with the active catalyst wall.

Contrast this performance for the case of the active surface features where the push and pull forces fluid and reactants into the surface features. Model results have shown that the flow velocity in the x and y directions (where z is along the flow length, and x and y are in the lateral (side to side) and transverse (top to bottom) flow directions, respectively) does not exceed the average flow velocity in the z direction for a corresponding flat channel, but is on the order of 1%, or 5%, 100%, 20% or greater of the average flow velocity in the length direction. Correspondingly, for this example, an average velocity in the y direction (top to bottom of the microchannel or between the active surface feature walls assuming that active walls are disposed on both surfaces) is at least 1 m/s. At this velocity, the characteristic time for advection of the reacting molecules to the active surface feature walls is less than 0.5 milliseconds—or less than half the time required by diffusion. As the velocity in the y-direction increases further, the characteristic time for advection reduces correspondingly.

This time difference alone between convection and diffusion tells part of the advantage, but not the entire advantage. An additional advantage of the active surface features is a reduction in mass dispersion that makes the number of contacts of molecules from the bulk flow in the main gap with the active surface feature wall much higher. Further, once the molecules have entered the active surface feature groove, they are out of the main flow path and not subject to the same flow advection that moves the molecules away or down stream from the active surface feature grooves. By this manner, the classical Taylor-Aris dispersion is reduced by allowing molecules to spend more time in the active surface feature to promote the desired unit operation.

The disposition of a catalyst in a prior art surface feature would create only modest enhancement because the objective of the previous devices was to allow the molecules to mix in the bulk flow channel but not actively collide or interact with the active surface feature walls. For the present invention, it is desirable to have at least 1, or 2 or 3 or more collisions of the centerline molecules with the active surface feature walls for good performance. Further, it is advantageous to have at least 30% of all mass entering at least one channel that comprises at least one surface feature section to enter at least one surface feature at least once in a surface feature section. A "surface feature section" is defined as a continuous series of closely spaced surface features in a wall along the flow length of a microchannel. In methods of the present invention, a "surface feature section" is where the flow does not substantially relax to a laminar parabolic flow profile between two features. In some preferred embodiments of the present invention, at least 50%, more preferably at least 70%, and still more preferably at least 90% of the mass entering the channel enters at least one active surface feature in a surface feature section.

For unit operations, including homogeneous chemical reactions and heat exchangers, interaction of the bulk flow species with the active surface feature wall is also advantageous to transfer heat to an adjacent heat transfer chamber. Unlike the prior art micromixers, it is desirable to move the bulk stream near and past the wall and not necessarily completely and uniformly mix the bulk flow stream. An active surface feature wall that moves more fresh fluid near and past the active surface will be preferential over a design that primarily mixes the bulk stream.

For these applications, performance is enhanced with higher Reynolds numbers as opposed to disadvantaged at higher Reynolds numbers because the high momentum streams are moved into a repeating rotating flow pattern that winds the bulk flow past the active surface features and does not substantially stop the flow rotation and try to turn it back in an opposing direction. Once the flow has started to turn in a fixed direction within the active surface features, it continues in the same direction thus demonstrating a high vorticity such that the fluid is replenished against the active surface feature walls. As the momentum is increased at higher Reynolds numbers, the relative vorticity or angular force to spin the fluid also increases and thus the number of contacts or collisions with or near the active surface feature walls is also increased. For these cases, however, vorticity alone is not the only element. Patterns that merely spin the fluid in the bulk flow path, such as that created by a single angular diagonal feature groove across the width of a microchannel wall do not do a good job of pulling the center flow stream into the active surface features. In the present invention, the geometry of the active surface feature wall pattern may be designed to enhance "contact" (as defined to a molecule breaking the plane of the active surface feature groove and entering into the recessed and angled groove) with active surface features. The preferable active surface features have more than one angle across the width of at least one wall of the microchannel. "At least one angle" means that there is a change in slope—the feature is not a straight line but contains a bend; the feature is preferably contiguous such as a chevron or zig-zag; but in some embodiments a surface feature having "at least one angle" could be discontinuous if the elements of the feature are aligned so that, except for a gap, the recesses or protrusions would connect—an example is a chevron with a missing apex.

For the prior art examples, the relative time spent within the surface features for a typical molecule was less than about 10%, while for a typical molecule in the present invention the time spent within the surface features for a typical molecule is preferably greater than about 15%, more preferably greater than 20%, and more preferably still greater than about 30% of the average residence time spent in the channel is spent in the active surface features. The time that a molecule spends within an active surface feature is defined by the time that the molecules spend after breaking the plane of the surface features and have moved out of the bulk flow path. The "bulk flow path" is esentially continuous from inlet to outlet, where the active surface features typically start and stop along the length of the flow path.

For the invention, the performance enhancement of the active surface features relative to a corresponding featureless or flat or smooth wall is typically improved as the residence time is decreased. The featureless wall is defined by a microchannel that has a gap not inclusive of the depth of the recessed features and having the same width and length. As the Reynolds number increases the importance of inertial forces increases. For higher inertia or momentum streams, maintaining the momentum in a single primary direction rather than reversing or changing directions makes it easier to keep the stream turning. As the stream keeps turning, it keeps moving more and more flow or molecules into the active surface features where they may interact with the walls that exchange either heat or mass or both.

In one aspect, the invention provides microchannel apparatus, comprising: a microchannel comprising surface features; at least a segment of the microchannel characterized by a feature entrance length of more than 10; wherein the segment is at least 1 cm long; wherein the segment comprises plural similar, repeating surface features; and wherein the similar, repeating surface features comprise at least 1 angle in each similar surface feature. Preferably, the majority of a circumference of the microchannel is populated by surface features; for example, opposing surfaces of a rectangular microchannel.

In another aspect, the invention provides microchannel apparatus, comprising: a microchannel defined by at least 3 microchannel walls; at least a segment of the microchannel characterized by a feature entrance length number of more than 10; wherein the segment is at least 1 cm long; wherein the segment comprises plural similar, repeating surface features; and wherein the similar, repeating surface features comprise at least 1 angle in each similar surface feature.

In a further aspect, the invention provides microchannel apparatus, comprising:
a microchannel comprising a microchannel wall comprising surface features; wherein the surface features comprise sub-patterning that increases the surface area of the microchannel wall; and further comprising a catalyst composition disposed on at least of the surface features that comprise sub-patterning.

In another aspect, the invention provides microchannel apparatus, comprising:
a microchannel comprising a microchannel wall comprising more than 15 similar, repeating surface features. The similar, repeating surface features comprise at least 1 angle in each similar surface feature.

Any of the inventive aspects may be further characterized by any of the features described herein. For example, in preferred embodiments, the microchannel has two, major opposing walls comprising surface features in which the surface feature depth:channel gap is greater than 0.3. In preferred embodiments, microchannels are operated in parallel and are connected via a manifold. The distribution of flow to the parallel microchannels is preferably equally distributed with less than 35% (25%, 10%) difference in mass flowrate per channel.

The inventive apparatus may exhibit superior results for processes involving heterogeneous catalysis or heat transfer at Re above 100.

In another aspect, the invention provides microchannel apparatus, comprising: a microchannel comprising a microchannel wall comprising surface features in a staggered herringbone mixer (SHM) configuration wherein the SHM has spaces between angled surface features; and fill features situated in the spaces.

In a still further aspect, the invention provides a method of fluid processing in a microchannel, comprising: providing microchannel apparatus comprising a microchannel;
wherein the microchannel comprises two opposing microchannel walls and a gap between the two opposing microchannel walls; wherein at least one of the microchannel walls comprises at least 10 similar surface features in series; wherein each of the similar surface features comprises at least one angle and a ratio of surface feature depth:channel gap of at least 0.4; and flowing a fluid through the microchannel at a Re of more than 100.

In some preferred embodiments, there is a catalyst or sorbent disposed on the surface features. In some preferred embodiments, there is a heat sink or heat source contacting the microchannel wall having a series of similar surface features. In many preferred embodiments, the inventive methods are operated at short contact times and/or high Reynold's numbers (Re) and/or high Pe (Peclet numbers).

In another aspect, the invention provides a method of fluid processing in a microchannel, comprising: flowing fluid through a microchannel at a Reynold's number Re of more than 100; wherein the microchannel comprises surface features; and performing a unit operation on the fluid in the surface features. The unit operation can be any of the unit operations discussed herein but not solely mixing (although mixing typically often occurs along with other unit operations).

In another aspect, the invention provides a method of fluid processing in a microchannel, comprising: passing a fluid through a channel inlet into a microchannel;
wherein the microchannel comprises surface features in at least one surface feature section; where more than 30% (more preferably at least 50%, 75%, or 90%) of the inlet mass of fluid enters the volume of the at least one surface feature in the surface feature section; performing a unit operation on the fluid in the surface feature section. The mass of fluid that enters the surface features is determined according to methods and descriptions provided herein.

In a further aspect, the invention provides a method of fluid processing in a microchannel, comprising: providing microchannel apparatus comprising a microchannel; wherein the microchannel comprises surface features; wherein the surface features comprise at least 1 angle in each surface feature; and wherein a heat sink or heat source is in thermal contact with the active surface features. A fluid is passed through the microchannel at a Re of more than 100 resulting in heat transfer to or from the fluid flowing in the microchannel. Preferably, the heat sink or heat source comprises a heat exchanger that preferably comprises microchannels.

In another aspect, the invention provides a method of fluid processing in a microchannel, comprising: providing microchannel apparatus comprising a microchannel; wherein the microchannel comprises a microchannel wall that comprises a section comprising surface features in thermal contact with a heat source or a heat sink; flowing a fluid through the microchannel and exchanging heat through the at least one microchannel wall between the fluid and the heat source or sink; wherein a pressure drop occurs over the section comprising surface features; and wherein the heat transferred in the section divided by the heat transferred under identical conditions in a featureless section ($h_{SF}/h_o$) is at least 1.1 times as great as the pressure drop in the section divided by the pressure under identical conditions in a featureless section ($dP_{SF}/dP_o$). A "featureless section" is not another section in the same device that doesn't have features, but it is a simulated (by experiment or calculation) device identical to the section, except that the features are replaced with walls. The invention also includes apparatus characterized by the same heat transfer improvements as measured by the techniques described herein.

In a further aspect, the invention provides a method of fluid processing in a microchannel, comprising: providing microchannel apparatus comprising a microchannel; wherein the microchannel comprises a first section and a second section; wherein the first section comprises a first series of surface features; wherein the second section comprises a second series of surface features; and passing a fluid through the microchannel such that flow is mixed in the first and second sections, but relaxes to substantially parabolic flow between the sections. In a preferred embodiment, the first series of surface features have different characteristics than the second series (for example, different average feature depths—although any of the characteristics described here could be selected). In some embodiments, a first unit operation occurs in the first section and a different unit operation occurs in the second section.

In another aspect, the invention provides a method of making a laminated microchannel article, comprising: stacking a first sheet with see-through surface features adjacent to a sheet comprising a microchannel such that the see-through surface features are disposed on one side of the microchannel; and stacking a second sheet comprising cavities adjacent to the first sheet such that a cavity on the second sheet is adjacent to at least one see-through feature on the first sheet. The cavity can be a see-through feature. The invention also includes apparatus made by any of the techniques described herein.

In still another aspect, the invention provides a method of washcoating a microchannel, comprising: providing a microchannel comprising plural similar, repeating surface features, wherein the similar, repeating surface features comprise at least 1 angle in each similar surface feature; and applying a washcoat over the plural similar, repeating surface features.

The inventors have discovered improved performance by using relatively deep features. For example, features that have a depth that is at least 20% of the gap distance between opposing microchannel surfaces; in some embodiments at least 30%, and in some embodiments 20 to about 100% of the gap distance between opposing microchannel surfaces. In some embodiments, the depth of surface features are more than 100% of the gap distance and may be as large as 500% of the gap. Another inventive feature of some preferred embodiments, is the aspect ratio of the surface feature run width to channel gap.

Useful applications of the invention include but are not limited to: heterogeneously catalyzed reactions (such as where solid catalysts are disposed on a microchannel wall); homogeneously catalyzed reactions; homogeneous uncatalyzed reactions; distillation; emulsion formation; advanced heat transfer; mixing; gas liquid reactions; adsorption, absorption and other gas-liquid or liquid-liquid separations. The invention may also be useful for other applications that are facilitated by the collision of a molecule with an active wall. As an example, a sensor or detector surface may be preferentially disposed within an active surface feature, such that more of the bulk solutes may collide and thus activate the active surface. This may be particularly useful for a dilute agent in a fluid. This invention may also be useful for the destruction of waste molecules, dilute or concentrated, in a fluid when flowing past an active conversion or separation agent on a surface as disposed in an active surface feature. The invention may also be useful for an enzymatic reaction or a bioreactor, again where it is preferable for a reacting molecule to collide with a catalyst whether bio based such as an enzyme or more conventional heterogeneous catalyst. The invention may be further enhanced if a catalyst is tethered or attached to the surface, but also in part extends above the surface so as to create more surface area. The extended surface or tethered catalyst or tethered active agent such as a sorbent or other surface that interacts chemically or phsyically with a solute molecule may extend a small fraction of the total depth of surface feature above the wall (<10%) or it may extend a substantial fraction of the total depth of surface feature above the wall (10% to 100%). In some inventive processes, the extended surfaces or tethers may extend into the bulk flow path. The tethers may be rigid or unmoving with the shear of the fluid in the surface features or the bulk flow path, or the tethers may be moving with the shear of the fluid. In the case of non-rigid tethers, this secondary movement may create additional spatial or temporal gradients in the fluid flow field or the movement of the tethers themselves. This latter may be further advantageous for further reducing mass transport limitations between the fluid molecules and the active agents disposed on either the active surface feature walls or the tethered extensions attached thereon.

The invention also includes methods for catalytic chemical conversion (for example, homogeneous ethylene formation or heterogeneous steam methane reforming), such method comprising flowing a reactant fluid composition into a microchannel, wherein a catalyst is present in the microchannel or may be alternatively co-fed with the reactant, and reacting the reactant fluid composition into a desired product (or products) in the microchannel. The invention also includes methods of conducting unit operations using any of the apparatus described herein.

The invention includes the prebonded stack of sheets, as well as the bonded device. By bonding, this means joining by any means including: diffusion bonding, brazing, welding, gluing, reactive bonding, and other methods. The bonded device may or may not include a coating (such as a catalyst coating) over the patterned regions and/or within the recesses of a patterned region. The invention further includes chemical processes conducted in any of the apparatus described herein.

In a further aspect, the invention provides a method of chemical processing, comprising: passing a fluid into any of the apparatus described herein. The invention includes apparatus and methods that utilize surface features that enhance mixing. The invention may also be described in terms of mixing fluids as they flow through a microchannel (for example, any of the mixing types in the Examples).

Glossary of Terms Used

A "surface feature" is a projection from, or a recess into, a microchannel wall that modify flow within the microchannel. If the area at the top of the features is the same or exceeds the area at the base of the feature, then the feature may be considered recessed. If the area at the base of the feature exceeds the area at the top of the feature, then it may be considered protruded (except for CRFs discussed below). The surface features have a depth, a width, and a length for non-circular surface features. Surface features may include circles, oblong shapes, squares, rectangles, checks, chevrons, zig-zags, and the like, recessed into the wall of a main channel. The surface features may contain sub features where the major walls of the first recessed features further contain smaller features that may take the form of notches, waves, indents, holes, burrs, checks, scallops, and the like. Some nonlimiting examples of surface feature perimeters are illustrated in FIG. 1d.

A "cavity" is a partial or full feature in a wall or sheet that may be an active surface feature, slots, holes, irregular or regular shapes, or other volume where fluid flow is either diffusive or advective or both in the features.

"Compact recessed features" are recesses in a main channel. Compact recessed features (CRFs) have no flow exit other than the main channel. Each CRF has one or more closed perimeters at the interface with the main gap, the surface enclosed by each perimeter being everywhere orthogonal to the bulk flow direction in the main channel, and the total area enclosed by all of the recessed feature perimeters at the interface with the main channel makes up more than 50% of the wall area for a given wall in the main channel. CRFs have no continuous flow path from one feature to the next without re-entering the main channel. Protrusions are not recessed features or CRFs.

Two features are "similar features" or "like features" if at least 50% (preferably at least 80%) of the perimeter of one feature (the perimeter being the interface between the surface feature and the main channel) can be superimposed within the perimeter of the other feature by translation along the length in the direction of bulk flow in the main channel, with less than 20 degrees (or, more preferably, without) rotation of either feature perimeter, and at least 50% (preferably at least 80%) of the perimeter of the other feature can be superimposed within the perimeter of the one feature by translation along the length in the direction of bulk flow in the main channel, with less than 20 degrees (or, more preferably, without) rotation of either feature perimeter. If the perimeter defining the interface between the surface feature and the main channel is not flat, then the orthogonal (that is, orthogonal to the bulk flow direction in the main channel) projection of each perimeter should be used in determining whether features are like features.

The length and width of a surface feature are defined in the same way as for a microchannel. The depth is the distance which the feature sinks into the microchannel surface; it is the same direction as microchannel height and microchannel gap. In one preferred embodiment, comprising a stacked and bonded device with surface features on the sheet surfaces, the surface feature depth corresponds to the direction of stacking. These dimensions of the surface features refer the maximum dimension of a feature; for example the depth of a rounded groove refers to the maximum depth, that is, the depth at the bottom of the groove.

Depth of feature: the mean (or average) distance from the plane where the surface feature intersects the main channel to the bottom of the surface feature (the bottom being the plane tangent to the surface feature edge which is farthest from and parallel to the plane where the surface feature intersects the main channel).

Width or span of feature: the nominal value of the shortest dimension of the surface feature in the plane where the surface feature intersects the main channel, or distance from surface feature edge to surface feature edge.

Run length of feature leg: the nominal value of the longest dimension of the surface feature leg in the plane where the surface feature intersects the main channel.

(Surface) feature leg: a portion of the feature having no discontinuity or change in sign of in slope along the run length relative to the main channel mean bulk flow direction.

Spacing of repeated features: the average distance between repeated features in the direction perpendicular to the run length of the feature leg Angle of feature: The angle between the direction of the run length of the surface feature leg and the plane orthogonal to the mean bulk flow direction in the main channel. A surface feature preferably has more than one angle. The angle may change from one greater than zero to one less than zero. The angle may change continuously along the feature in either a continuous or discontinuous manner.

Orientation of feature: the orientation of a section of repeated surface features relative to identical features on an adjacent or opposite wall in the main channel.

Flow orientation relative to feature: the direction of the mean bulk flow in the main channel relative to the orientation of a feature recessed in a given wall of the main channel. The designation A is used to designate a mean bulk flow direction in the main channel for which the run length of each leg of a two-legged surface feature tend to converge or come closer together along the main channel mean bulk flow direction. The designation B was used to designate the opposite flow direction relative to the surface feature. For features with more than two-legs, an A orientation would refer to a mean or average or net feature run length that is more converging than diverging with respect to the mean direction of flow. Conversely, a B orientation refers to a mean or average or net feature run length that is more diverging than converging with respect to the mean direction of flow.

"Capillary features" are features associated with a microchannel that are used to hold liquid substances. They are either recessed within a wall of a microchannel or protrude from a wall of the microchannel into the flow path that is adjacent to the microchannel wall. The features create a spacing that is less than 2 mm, more preferably 1 mm or less, still more preferably a spacing of 500 µm or less. The features have at least one dimension that is smaller than any dimension of the microchannel in which they are situated. The capillary features may be at any angle for a slot type structure or an array of holes or any other recessed or protruded structure used to retain a liquid by capillary forces.

A "catalyst material" is a material that catalyzes a desired reaction. Nonlimiting examples of catalyst materials include metals, metal oxides, and acidic sites.

A "catalyst metal" is the preferred form of catalyst material and is a material in metallic form that catalyzes a desired reaction. Particularly preferred catalyst metals are Pd, Rh, Re, Ir, and Pt.

A "chemical unit operation" comprises reactions, separations, heating, cooling, vaporization, condensation, and mixing.

A "contiguous microchannel" is a microchannel enclosed by a microchannel wall or walls without substantial breaks or openings—meaning that openings (if present) amount to no more than 20% (in some embodiments no more than 5%, and in some embodiments without any openings) of the area of the microchannel wall or walls on which the opening(s) are present.

"Interior microchannel" refers to a microchannel that is bounded on all sides by a microchannel wall or walls except for inlets and outlets, and, optionally, connecting holes along the length of a microchannel such as a porous partition or orifices such as connecting orifices between a fuel channel and an oxidant channel.

A "manifold" is a header or footer that connects plural parallel microchannels and is integral with the apparatus.

A "microchannel" is a channel having at least one internal dimension (wall-to-wall, not counting catalyst) of 1 cm or less, preferably 2 mm or less (in some embodiments about 1.0 mm or less) and greater than 100 nm (preferably greater than 1 µm), and in some embodiments 50 to 500 µm. Microchannels are also defined by the presence of at least one inlet that is distinct from at least one outlet. Microchannels are not merely channels through zeolites or mesoporous materials. The length of a microchannel corresponds to the direction of flow through the microchannel. Microchannel height and width are substantially perpendicular to the direction of flow of through the channel. In the case of a laminated device where a microchannel has two major surfaces (for example, surfaces formed by stacked and bonded sheets), the height is the distance from major surface to major surface and width is perpendicular to height. The "depth" of a surface feature is in the same direction as "height" of a microchannel.

"Mass of fluid entering a surface feature" is defined as the amount of mass at the inlet to a surface feature section that enters at least one surface feature in a surface feature section, wherein entering a surface feature means the fluid molecule breaks the plane of the recessed surface feature and moves out of the bulk flow channel. Computational fluid dynamics (CFD) code should be used to evaluate the percentage of mass that enters at least one surface feature in a surface feature section, which allows the evaluation of the fluid flow path lines to be illustrated and traced through the surface feature section. The surface feature section should be discretized with a minimum of 6 volume cells in the depth and length directions to get reasonable flow discretization, with the main straight channel discretized with proportionally sized cells to maintain the cell size continuity in the channel adjacent to the surface features and the spaces between the surface features. The correct hydrodynamic model should be used for the inlet stream velocity and cross-section. The solution should be well converged, with the total sum of all of the inlet mass flow rates compared to the total outlet mass flow rates should be within 0.0001% of each other and with the energy balance of that entering the system must equal that which is leaving should be with in 1% of each other. The CFD code should evenly distribute at least 100 path lines evenly over the cross-section of the channel at the inlet of the channel. The percentage of the path lines that enter at least one surface feature are in turn a representation of the mass percentage that enters at least one surface feature.

Main channel: an open path for bulk flow.

(Main) channel width: the largest dimension of the cross section of a rectangular main channel.

(Main channel) gap: the smallest dimension of the cross section of the main channel.

Main channel mean bulk flow direction: the average direction of the flow along a portion of the main channel for flow traveling from inlet to outlet.

The Reynolds number, Re, is the commonly used ratio of the inertial over the viscous forces seen by flow in a channel. Its definition is the ratio of the mass flux rate (G) times the hydraulic diameter (D) divided by the dynamic viscosity ($\mu$), $$Re = \frac{GD}{\mu} \quad (1)$$
$$= \frac{\rho UD}{\mu}$$

The value of the Reynolds number describes the flow regime of the stream. While the dependence of the regime on Reynolds number is a function of channel cross-section shape and size, the following ranges are typically used for channels: Laminar: Re<2000 to 2200; Transition: 2000-2200<Re<4000 to 5000; Turbulent: Re>4000 to 5000.

"Unit operation" means chemical reaction, vaporization, compression, chemical separation, distillation, condensation, mixing, heating, or cooling. A "unit operation" does not mean merely fluid transport, although transport frequently occurs along with unit operations. In some preferred embodiments, a unit operation is not merely mixing.

DETAILED DESCRIPTION

Figure 1A:
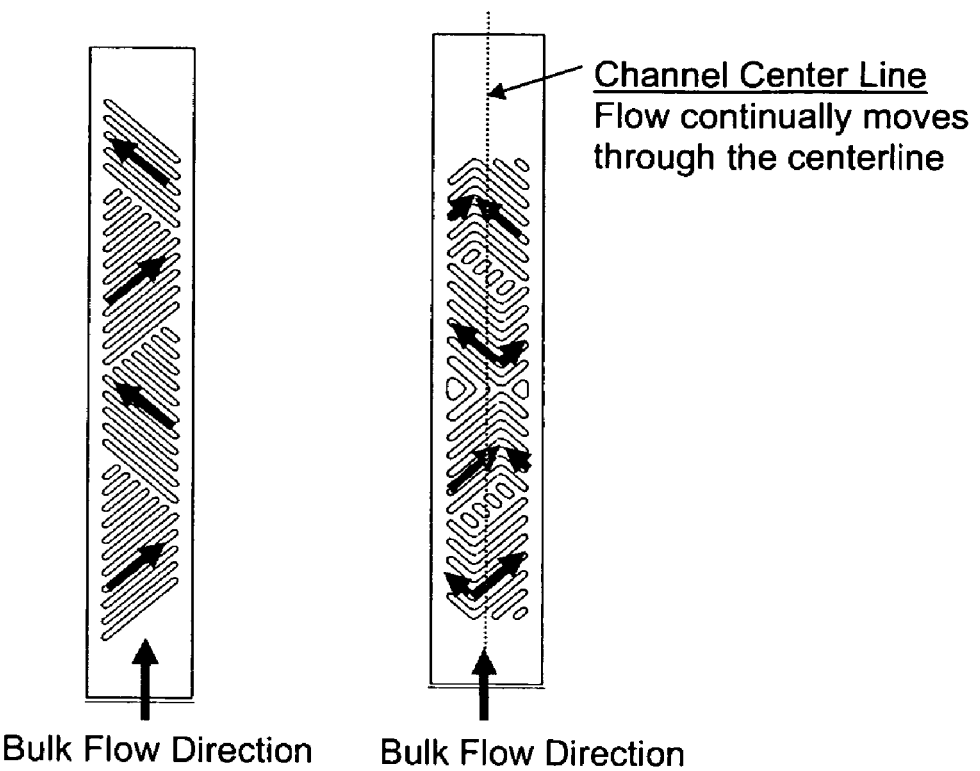
FIG. 1a illustrates a surface feature pattern with alternating series features for shifting flow across a microchannel.

"Surface features" are recesses in (or, in less preferred embodiments, projections from) a microchannel wall that assist with either directing flow in a direction different than the direction of net flow through the microchannel (that is, different than the direction of the length of a microchannel) or create flow rotation. The features increase surface area and create convective flow that brings fluids to a microchannel wall through advection rather than diffusion. Flow patterns may swirl, rotate, tumble and have other irregular and or chaotic patterns—although the flow pattern is not required to be chaotic and in some cases may appear quite regular. The flow patterns are stable with time, although they may also undergo secondary transient rotations. The surface features are preferably at oblique angles—neither parallel nor perpendicular to the direction of net flow past a surface. Surface features may be orthogonal, that is at a 90 degree angle, to the direction of flow, but are preferably angled. The active surface features are further preferably defined by more than one angle along the width of the microchannel at least at one axial location. The two or more sides of the surface features may be physically connected or disconnected. The one or more angles along the width of the microchannel act to preferentially push and pull the fluid out of the straight laminar streamlines. For embodiments in which it is necessary to compare heat transfer to a flat channel, all surface features may be defined as recessed.

"Across the gap mixing" refers to mixing streams within a micro-channel in the direction that is perpendicular to the bulk flow; in channels with a rectangular cross-section this term refers to mixing across the gap between the two major surfaces. This is accomplished by placing the surface features on both major surfaces of the micro-channel. Design principles to achieve this type of mixing, include: (1) Provide a substantially angled component to the direction of the surface feature run length relative to the mean direction of the bulk flow in the main channel. Velocity in the main channel near the upstream end of each surface feature leg will tend to be higher than near the downstream end of each surface feature leg. Coordination between surface feature patterns in the top and bottom walls can act to increase the perpendicular component to the velocity vector and thus have a greater effect of reducing external mass transfer resistance when lateral mixing is not a strong consideration. For example, with surface features recessed into opposing walls, using a "cis" configuration may be preferred over a "trans" active surface feature configuration in preventing the formation of one or more cores of flow in the bulk which are not as easily swept into the active surface features. (2) Provide an adequate number of adjacent features such that the fluid is moved across the entire channel gap. More angles, bends, twists, or otherwise direction changes within an individual surface feature will act to move or mix flow across a channel but may not be preferable for increasing the fraction of residence time that a feature spends within the active surface features. It is preferable to have more than one angle in one or more surface features along the width of a microchannel in at least one axial location, where the features across the width may or may not be physically connected. The alignment of adjacent features or nested angles will also act to pull fluid laterally across the channel. (3) Provide multiple repeated substantially similar or "like" features along the flow length for any given microchannel wall. The repetition of similar features along the flow length maintains the non-straight (i.e. swirling) flow patterns in the main channel as flow proceeds down the channel length.

Multiple features may be included within any given microchannel, including features that recess at different depths into a microchannel wall or walls. Preferably, the spacing between recesses is in the range of 0.05 mm to 10 mm, more preferably in the range of 0.1 to 1 mm. The surface features may be present all throughout the microchannel or for a portion. The portion of area having surface features may be intermittent so as to promote a desired reaction or unit operation in tailored zones. As an example, a 2.5 cm section of a microchannel may have a tightly spaced array of surface features, followed by 10 cm of a flat channel, and then followed still by a 5 cm section of loosely spaced surface features. Loosely spaced refers to surface features with a pitch or feature to feature distance more than 5× the run width of the surface feature.

In some embodiments, the surface features extend substantially over the length of a microchannel (not including any flow distribution or manifolding sections). In some embodiments, a microchannel can have surface features over 50% or less of its length, in some embodiments over 20% or less of its length, and in some embodiments 10 to 100% of the microchannel length. In some embodiments, it may be preferable to include surface features within a manifolding or flow distribution section as well to promote or tailor heat transfer or to tailor flow distribution by modifying the pressure drop in some channels or sections to tailor flow distribution.

Superior mixing and performance in unit operations can be obtained by combining across the width mixing features with across the gap mixing features. To provide total mixing the two design principles can be used in concert with one another. Desirable features include: placing surface features on opposing channel walls; configuring the features on any one face to allow the fluid the move back and forth across the channel width; and aligning the surface feature inlets on one face with the surface feature inlets on the opposite face. That is to say, preferentially coordinating the features between the top and bottom plates such that the pattern on the two faces are substantially "cis" in orientation relative to each other rather than "trans".

In one preferable embodiment, an array of similar surface features with a chevron or check mark pattern are disposed on one wall and a similar array of similar features aligned at either the same angle or a substantially inverted angle (180 degrees transposition) creates a particularly useful pattern for moving flow and molecules inside the active surface features and increasing the time spent within the active surface features disproportionately as the Reynolds number increases.

Figure 1B:
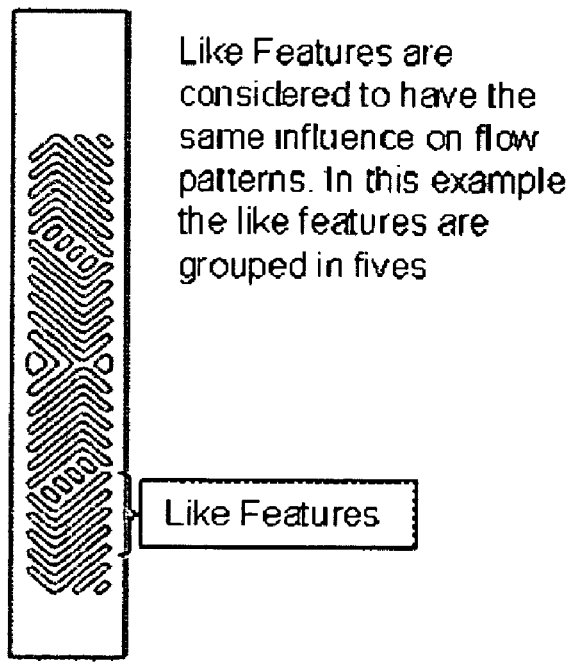
FIG. 1b illustrates a series of like features in a surface feature pattern.

The minimum number of like features preferably placed in series along the channel length depends on the channel gap and surface feature depth. Similar or "like" features are replicates of each other placed adjacent to each other along the channel length. An example is illustrated in FIG. 1b. The flow patterns set up by these features is not considered turbulent flow, especially out in the bulk flow. The flow is better described as "directed laminar" flow.

The surface features may have two or more layers stacked on top of each other or intertwined in a 3-dimensional pattern. The pattern in each discrete layer may be the same or different. Flow may rotate or advect in each layer or only in one layer. Sub-layers (defined as not adjacent to the bulk flow channel) may be used only to create additional surface area to deposit a catalyst, wherein flow rotates in the first level of surface feature and diffuses molecularly into the second or more sublayers to promote reaction. Three-dimensional features may be made via metal casting or other processes where varying patterns can not be broken into discrete planes as if stacked on top of each other. Three-dimensionally varying surface features may be found adjacent to the bulk flow channel where the features have different depths, shapes, and locations accompanied by sub-features with patterns of varying depths, shapes and locations. The inventive structures may be advantageous for chemical reactions requiring additional surface area for catalyst deposition or for chemical separations such as distillation.

Figure 4A:
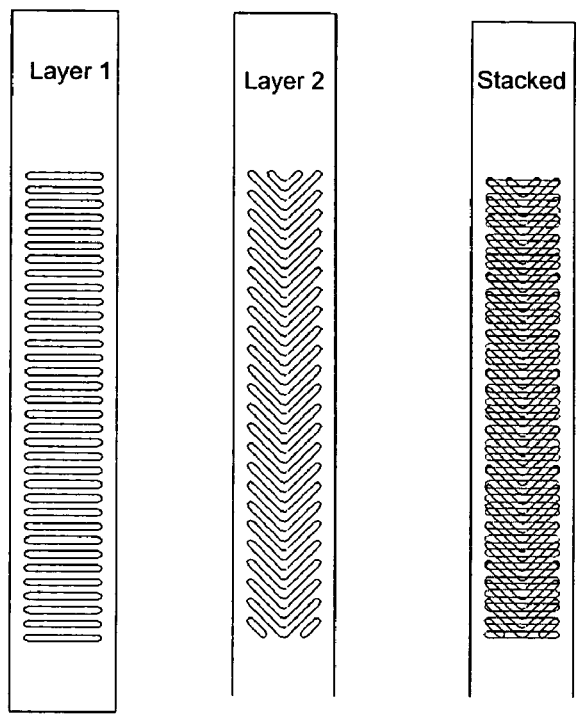
FIG. 4a is a top view of different surface feature patterns which, when stacked in adjacent layers, form a layered surface feature.
Figure 4B:
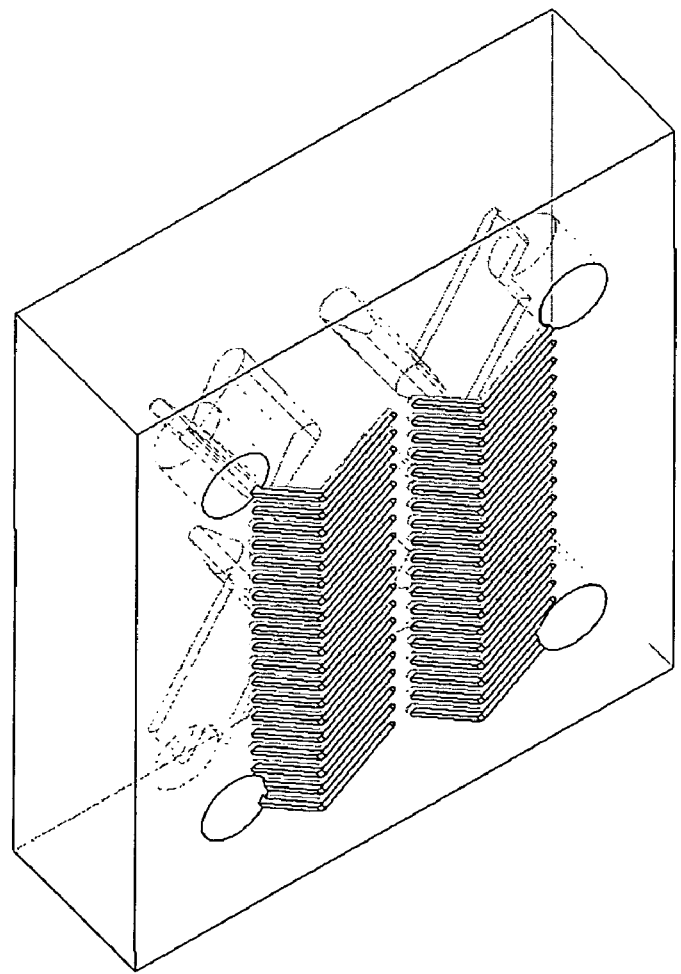
FIG. 4b front view of 3-D surface features where recessed chevrons abut the bulk flow mirochannel and have additional features of different shapes behind them at varying depths and locations.

FIG. 4b illustrates a three dimensional surface feature structure, where recessed chevrons are found at the interface adjacent of the bulk flow microchannel and beneath the chevrons are a series of 3-D structures (pale lines) that connect to the features adjacent to the bulk flow path but are made from structures of assorted shapes, depths, and locations. It may be further advantageous to create sublayer passages that do not directly fall beneath an open surface feature that is adjacent to the bulk flow microchannel but rather connect through one or more tortuous 2-D or 3-D passages. This approach may be advantageous for creating tailored residence time distributions in reactors, where it may be desirable to have a wider versus more narrow residence time distribution.

Figure 2A:
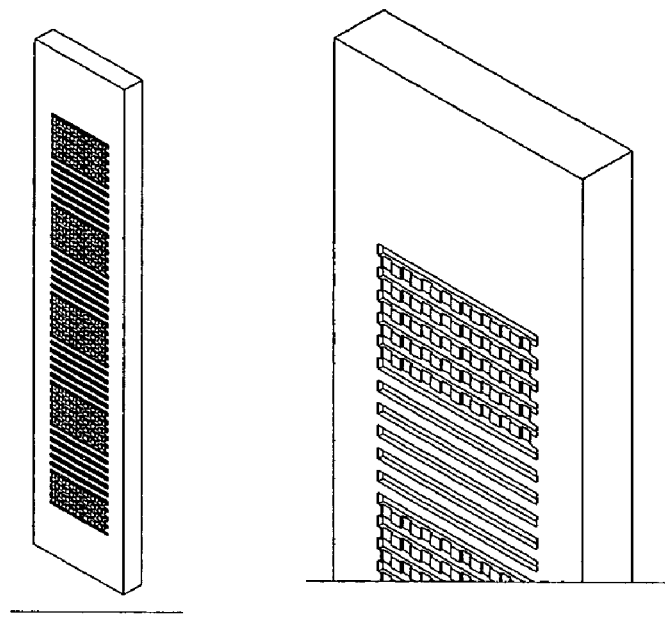
FIGS. 2a-2e illustrate various patterns for capillary/surface features.

FIG. 2a shows surface features with variable patterns (axially) and variable depths (laterally). The pattern of surface features shown in FIG. 2a introduces a spatially varying depth of surface features either within an individual surface feature and or between any two surface features within a surface feature section. This may be particularly advantageous for some applications where changing the depth of the surface feature within a surface feature may create more flow rotation or vorticity such that the external mass transfer resistance between fluids or from a fluid to a catalyst wall is significantly reduced.

Figure 2B:
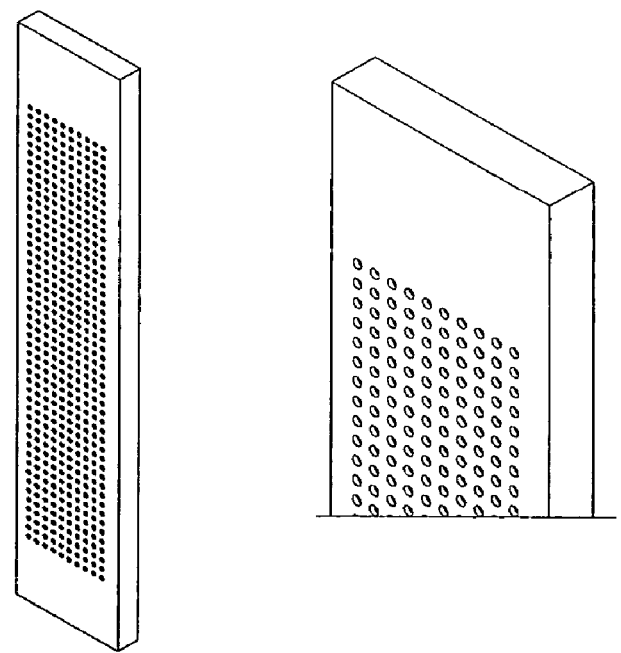
Figure 2C:
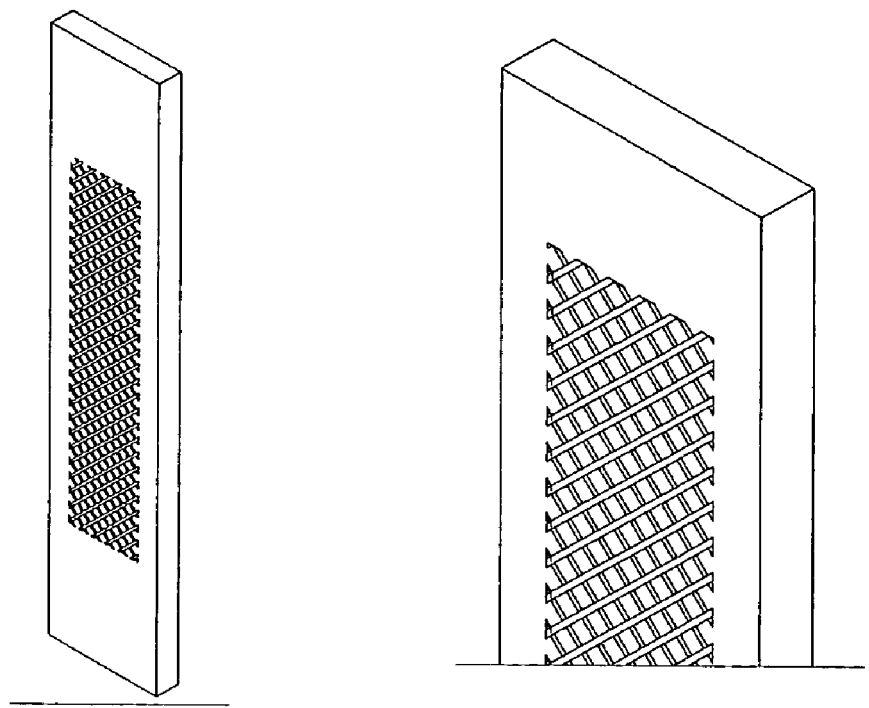

The pattern of FIG. 2b may be particularly advantageous as an underlayer surface pattern that sits beneath at least one or more other surface pattern sheets to increase the available surface area for catalyst or a mass exchange agent. The pattern of FIG. 2c illustrates surface features with cross-hatched features.

Figure 2D:
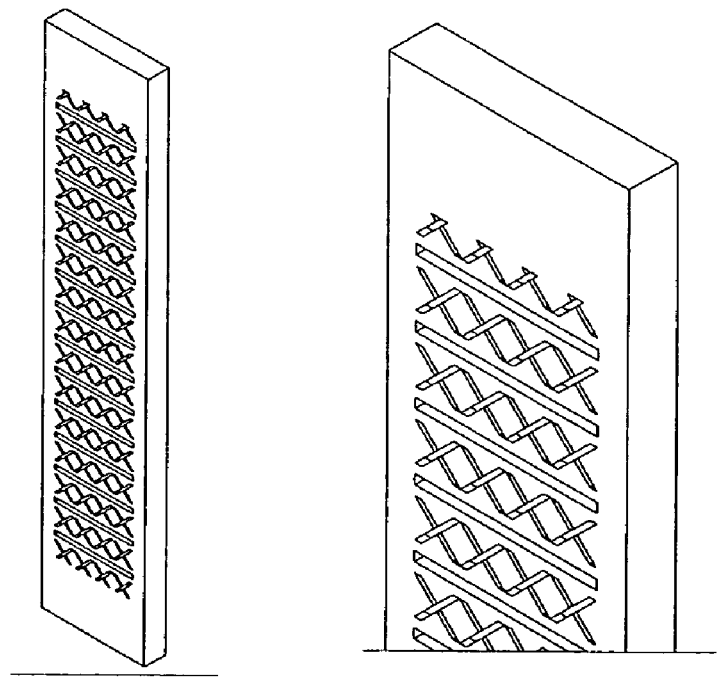

The pattern of FIG. 2d introduces both angled features and a horizontal feature. The feature geometry may vary along the length of the process channel. This design may be particularly advantageous as an underlayer surface pattern sheet that is used to both hold more catalyst or mass exchange agent while also creating more depth to angled features that may preferentially sit adjacent to this sheet. The second and angled sheet is adjacent to the flow path and induces flow rotation. The varying depths of angled features may create more turbulence or apparent turbulence in the flow paths.

Preferred ranges for surface feature depth are less than 2 mm, more preferrably less than 1 mm, and in some embodiments from 0.01 mm to 0.5 mm. A preferred range for the lateral width of the surface feature is sufficient to nearly span the microchannel width (as shown in the herringbone designs), but in some embodiments (such as the fill features) can span 60% or less, and in some embodiments 40% or less, and in some embodiments, about 10% to about 50% of the microchannel width. In preferred embodiments, at least one angle of the surface feature pattern is oriented at an angle of 10°, preferably 30°, or more with respect to microchannel width (90° is parallel to length direction and 0° is parallel to width direction). Lateral width is measured in the same direction as microchannel width.

The lateral width of the surface feature is preferably 0.05 mm to 100 cm, in some embodiments in the range of 0.5 mm to 5 cm, and in some embodiments 1 to 2 cm.

Recessed features on opposite faces of a microchannel can be coordinated for dramatically increased levels of heat and mass transport. A substantially diagonal (relative to length or the direction of flow) flow path recessed into the wall of a microchannel is a basic building block used in the present invention to promote flow patterns which can be coordinated on opposite walls to provide a surprisingly superior mixing relative to the same or similar patterns on only a single wall. Because of the substantially diagonal nature of the recessed flow path, the velocity in the recessed channel contains a significant component parallel or angled to the mean direction of bulk flow in the microchannel, thus inducing significant flow in the recessed channel. However, when the diagonal flow paths in the recessed channel on one major face of a microchannel are properly coordinated with those on the opposite face, flow perpendicular to the mean bulk flow direction within the open microchannel can be very effectively promoted. Perpendicular flow is especially advantageous for reducing the external mass transport or heat transport limitations that are found with laminar flow microchannels. Specifically, the advection rate of flow perpendicular to the bulk flow direction brings fluids to the microchannel wall at a rate that is at least 2×, or 5×, or 10× or more greater than the rate of mass transport from diffusion alone. As such, reactions that are driven by catalysts affixed to the microchannel walls or to a support structure adjacent to a microchannel wall will have a higher surface concentration of reactants and thus a higher overall reaction rate. Heat transfer is also advantaged by perpendicular advection and velocity vectors as this increases the surface heat transfer coefficient and reduces the boundary layer limitation on fluid temperature. This induced perpendicular flow can be promoted in some preferred embodiments by: (1) strategically placing features which tend to pull flow into the recessed channels on one face in a location relative to those on the opposite face which tend to pull flow into the recessed channels on the opposite face (i.e. cis configuration), (2) maintaining the opposing walls sufficiently close together (keeping the microchannel gap sufficiently narrow) to allow interaction between the opposing faces.

In general, if lateral mixing is desired (across the width of the channel), the features on opposite faces should promote flow with a substantially diagonal component in the plane perpendicular to the direction of the mean bulk flow. In such a case, the features should be coordinated to do this. The substantially diagonal features recessed in the wall of the open microchannel have a component of length in the mean bulk flow direction which is preferably equal to or greater than, and more preferably at least two times the component in the lateral direction (the channel width direction).

In some preferred embodiments, mixing is further promoted by creating multiple points throughout the channel where the flow is first split (flow divergence) and then later recombined (flow convergence) with flow in other locations. This can be achieved in the present invention by using substantially diagonal features which alternatively diverge and converge. For example, multiple chevrons or angles can be placed laterally across the channel versus one point or angle or chevron at a fixed axial location in a microchannel. Preferred patterns of divergence and convergence of these features will make use of the three principles outlined above, namely coordination of relative feature location on opposite faces, balance of the number of diverging and converging features, both in the flow direction and in the width dimension (perpendicular to the mean bulk flow and into the microchannel gap between the faces containing recessed features), and having a sufficiently small gap in the open microchannel (see gap dimensions mentioned above). In some preferred embodiments, the number of converging and diverging features is minimized and substantially similar features are repeated.

Figure 1C:
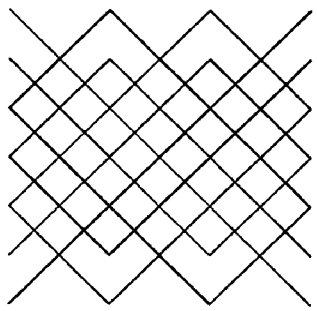
FIG. 1c illustrates some options for patterns formed by opposing surface features.
Figure 1C:
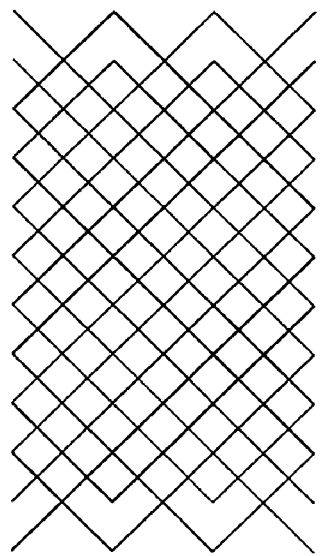
Figure 1C:
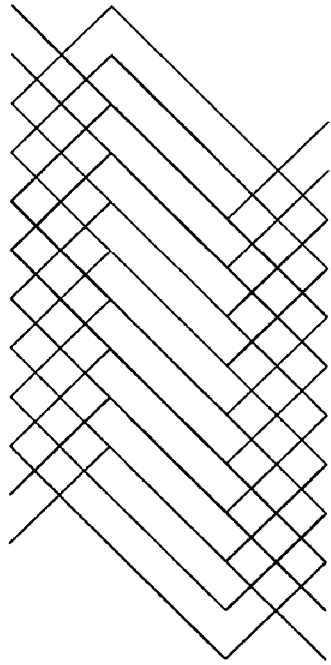
Figure 1C:
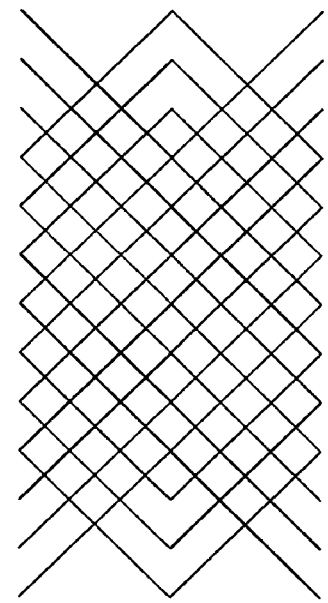
Figure 1D:
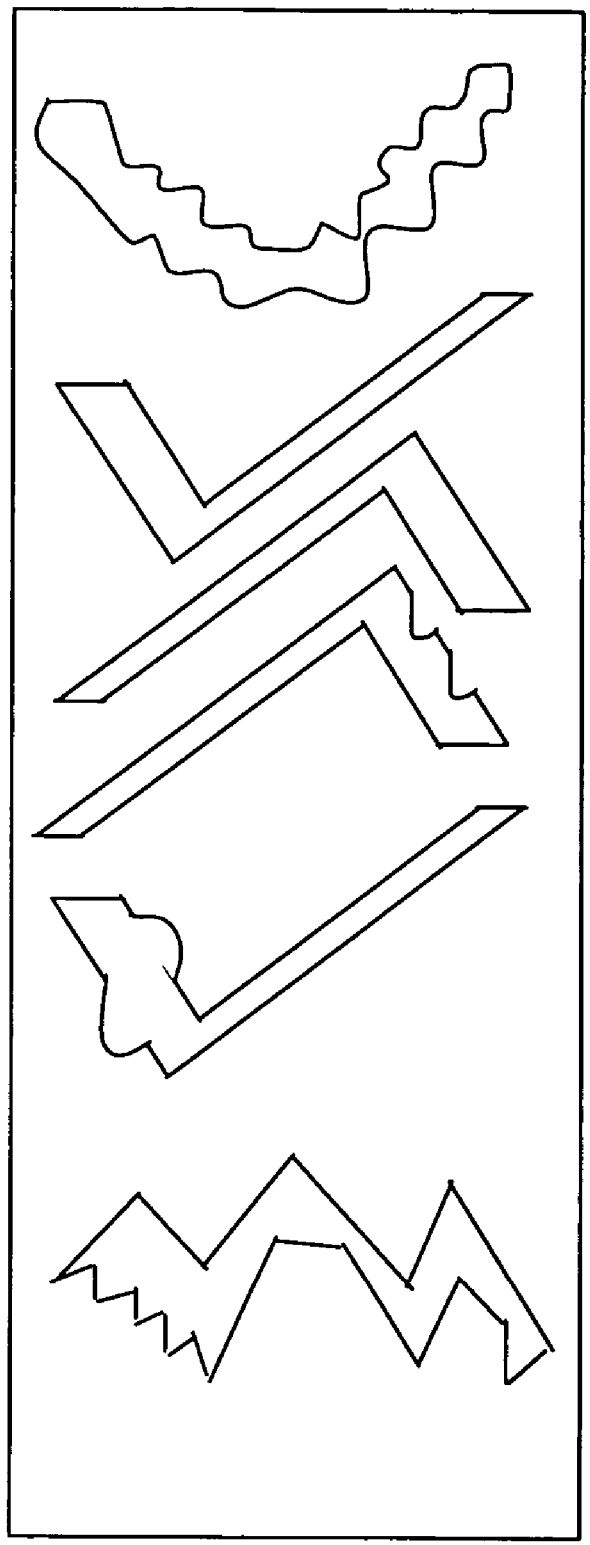
FIG. 1d illustrates some possible shapes for surface features.

FIG. 1c shows some options for the overlap of surface features on opposing walls. Since the features on opposite faces are substantially trans to one another in FIG. 1c, the flow patterns are not expected to be as effective for mixing as for the case where the features on opposite faces are in a cis configuration.

The present invention can utilize patterned surfaces on two sides of a microchannel or only on one side of a microchannel. For example, a surface can be paired (on opposite sides of a microchannel) with a shim of similar structure with diagonal stripes (the stripes are preferably recesses) that are either: aligned, staggered or crossed with respect to the opposing surface. For some cases, pairing creates better mixing than in channels structures only on one major surface, especially as the main channel gap increases beyond 1 mm. In some preferred embodiments, the patterning consists essentially of diagonal recesses that are disposed over substantially the entire width of a microchannel surface. The patterned surface area of a wall can occupy part or the entire length of a microchannel surface; in some embodiments diagonal recesses are disposed over at least 10%, 20%, 50%, or at least 80% of the length of a microchannel surface. In some embodiments, the features comprise diagonal features (preferably recesses (including CRFs) that comprise one or more angles relative to flow direction. In some preferred embodiments, the features have two or more angles on at least one wall relative to the direction of flow. The angles may be connected or disconnected at the apex or point. The different angles across the width of at least one wall of the microchannel at at least one axial location acts to push and pull the fluid in different directions and improves lateral and transverse flow relative to the otherwise straight laminar streamlines. As the flow lateral and transverse flow is increased it preferably enters the active surface features with an increased propensity as Reynolds number increases.

In another aspect, a patterned surface comprises multiple patterns stacked on top of each other. In one example, a pattern or array of holes are placed adjacent to a heat transfer wall and a second pattern, such as a diagonal or chevron array of features stacked on top and adjacent to an open channel for flow. A sheet adjacent to an open gap has patterning through the thickness of the sheet such that flow can pass through the sheet into underlying patterning. Flow may be through advection or diffusion. As an example, a first sheet with an array of through holes can be placed over a heat transfer wall, and a second sheet with an array of diagonal through slots or chevrons disposed on the first sheet. This preferred embodiment creates more surface area for adhering a catalyst or other active agent including an adsorbent, wick, etc. In some embodiments, the pattern is repeated on at least one other wall of the microchannel. The patterns can be preferentially offset on opposing walls. The innermost patterned surfaces (those surfaces bounding a flow channel) may contain a pattern such as a diagonal array. The diagonal arrays may be oriented both with the direction of flow (cis orientation) or one side oriented with the direction of flow and the opposing side oriented against the direction of flow (trans orientation). By varying surface features on opposing walls, different flow fields and degree of vorticity are created in the fluid that travels down the center and open gap.

The gap between microchannel walls (that is, the unobstructed bulk flow path) is preferably 10 mm or less, more preferably 5 mm or less, in some embodiments in the range of 0.05 to 2 mm. The surface features may be repeating identical shapes or nonidentical. Nonidentical features change orientation and/or shape and/or size along the length of microchannel. As an example, a pattern may include a chevron (or a check shape) that is aligned with the direction of flow then aligned against the direction of flow and then aligned or pointed to one side of a microchannel and then the other. The features may be randomly placed, or may have small groupings of 2 or 5 or 10 or more of similar features before switching to a new feature. It is preferable to have similar features aligned continuously or for many features in a row on at least one wall of the main channel, where at least 10 or 20 or more similar features are in series along the length of one or more walls of the main channel. Similar features essentially maintain the overall bulk flow direction as defined as a net positive velocity vector in the x or y direction (flow between the top and bottom of a surface feature and flow from side to side of a microchannel) rather than the net velocity in either the x or y coordinate moving negative along the channel length as would be the case for a back and forth motion in the flow in the main flow channel. As a result, similar features have no or modest changes in the location where the second angle of the at least two angle active surface feature groove begins across the width of the microchannel. Chevrons at the shift in a staggered herringbone mixer are not similar. Variations in the feature span or run width may change from feature to feature, but preferably by less than 50% from feature to feature. More preferably by less than 30% and more preferably still by less than 15%. It should be further noted that a feature with discontinuous legs with at least two or more angles is still considered a feature with more than one angle. As an example, consider a simple chevron where two legs of different angles are connected at an apex at the top of the grooved feature. The apex of the grooved chevron may be blocked such that the microchannel contains two net single angle features along the width of at least one wall of the microchannel. The resulting performance for this disconnected feature set is substantially similar to the connected feature set if the distance separating the two disconnected legs is less than 20% of the width of the microchannel. In essence, the inventive flow characteristics described in this invention are created when at least one wall of a microchannel has at least two angled features along the width of the microchannel, independent of whether the features are physically connected or not. Further, the inventive process is advantaged when substantially similar connected or disconnected features are repeated with modest or minimal variation in the oblique angle for at least 15 features in a row.

Preferably, the aspect ratio of the feature run width (the internal wall to wall distance in a recess; for a rectangular feature this is straightforward, for a cylindrical feature it would be the diameter, for a feature that narrows as a function of depth it is the maximum wall-to-wall distance; for a variable feature it is the average, maximum wall-to-wall distance) to channel gap (typically the minimum distance between surface features or the minimum distance between a surface feature and an opposing microchannel wall) is on the order of 0.25 to 10, where the run width of the surface feature is preferably at least 25% of the channel gap up to 10 times the channel gap. More preferably, the aspect ratio is between 0.5 and 1 to create sufficient flow disturbances. If the features are too narrow, the bulk flow glances over the top and receives minimal perturbations. If the surface feature run width is too wide, then the bulk flow will easily expand to fill the new channel gap and will receive minimal flow perturbations. Flow perturbations are defined as flow velocity vectors that do not follow the traditional laminar parabolic profile and have a perpendicular or transverse velocity vectors. It may also be preferable for the run width of the active surface feature to be less than the main channel gap when used in catalytic reactors where it is desirable to fill and drain the active surface features and retain the solution catalyst thereon. The capillary forces exerted by the fluid in the active surface feature will act to retain the fluid when draining such that it may be dried and calcined in place. If the main channel gap is less than the run width of the active surface feature it may act to pull the fluid out of the active surface feature during draining. For some catalytic reactor examples, such as those where the catalyst is deposited by reactive means such as electroless plating, this subsequent draining of the features while draining the channels may not be a problem.

Also surprisingly, the features when added to a flow stream with a Reynolds number greater than 2200 outperform a flat channel also operated in a turbulent regime. Specifically, a laminar flow with surface features (Re<2200) or a turbulent flow with surface features (Re>2200) gives improved mixing quality and or heat transfer over a flat channel with equal Reynolds number but in the turbulent regime. The surface features add a net radial or transverse component of velocity that is stronger than the radial or transverse component of velocity found from random eddies in a conventional turbulent flow channel. In fact, the design of the surface features may be made such that the relative ratio of transverse to perpendicular velocity may be tailored depending on the application. For those applications requiring good lateral mixing, including chemical reactions, an accentuation of perpendicular velocity vectors is particulary advantageous as this is the primary means of bringing fresh reactants to the surface for reaction.

Preferably, the aspect ratio of the feature depth (the internal recess or groove or surface feature depth as defined between the floor of the groove and the bulk flow channel gap or opening) to the channel gap (the minimum distance between microchannel walls at a location near (such as within 1 cm) the surface feature) is 0.25 to 10, where the feature depth of the surface feature is preferably at least 25% of the channel gap up to 10 times the channel gap. More preferably, the aspect ratio is between 0.5 and 3 to create sufficient flow disturbances. If the features are too shallow, the bulk flow glances over the top and receives minimal perturbations. If the surface feature depth is too deep, then the bulk flow will not easily flow convectively into the deep features and the fraction of bulk flow that enters the active surface features will be small.

In some embodiments with surface features in more than one wall, the features on one wall are in the same (or similar) pattern as found on a second wall, but rotated about the centerline of the main channel mean bulk flow direction (or length). In other embodiments with features on opposite walls, the features in one wall are approximately mirror images of the features on the opposite wall. In other embodiments with surface features in more than one wall, the features on one wall are the same (or similar) pattern as found on a second wall, but rotated about an axis which is orthogonal to the main channel mean bulk flow direction (in other words the features are flipped 180 degrees relative to the main channel mean bulk flow direction and rotated about the centerline of the main channel mean bulk flow). The features on opposing or adjacent walls may or may not be aligned directly with one another, but are preferably repeated continuously along the wall for some length. In alternate embodiments, surface features may be found on three or more surfaces of the microchannel. For the case of microchannel geometries with three or fewer sides, such as triangular, oval, elliptical, circular, and the like, the surface features may cover at least 20% up to 100% of the perimeter of the microchannel.

Each surface feature leg may be at an oblique angle relative to the bulk flow direction. The feature span length or span or opening is defined normal to the feature orientation. As an example, one surface feature is a diagonal depression at a 45 degree angle relative to a plane orthogonal to the mean direction of bulk flow in the main channel with a 0.38 mm opening or span or feature span length and a feature run length of 5.59 mm. The run length describes the distance from one end to the other end of the feature in the longest direction, whereas the span or feature span length is in the shortest direction (that is not depth). The feature depth is the distance from the main channel. For features with a nonuniform width (span), the span is the average span averaged over the run length.

In some preferred embodiments, three or more patterned sheets (at least 2 with through patterns—such as holes or slots) are stacked on top of each other. Two or more of the patterns may be identical, or three or more of the patterned surfaces may be distinct. Stacked patterns with varying geometries may create an advantageous flow regime, whereby the fluid approaches plug flow and does so in a fairly short distance. The distance to establish the flow regime may be less than 100 feature span lengths, or more preferably less than 50 feature span lengths, and more preferably still less than 20 feature span lengths. The surface feature may be at an oblique angle relative to the bulk flow direction. The feature span length or span is defined normal to the feature orientation. The run length describes the distance from one end to the other end of the feature in the longest direction, wheras the span or feature span length is in the shortest direction (that is not depth). The feature depth is the distance way from the main channel. For features with a nonuniform width (span), the span is the average span averaged over the run length.

The invention includes apparatus in which at least one section of the apparatus comprises surface features over more than 20% (preferably at least 40%, more preferably at least 70%) of a channel's surface (measured in cross-section perpendicular to length; i.e., perpendicular to the direction of net flow through the channel) in any channel segment, and preferably for a continuous stretch of at least 1 cm, in some embodiments surface features extend over a length of at least 5 cm. In the case of an enclosed channel, the surface % is the portion of a cross-section covered with surface features as compared to an enclosed channel that extends uniformly from either the base or the top of the surface feature or a constant value in-between. This later is defined as a flat channel. For example, if a channel had patterned top and bottom surfaces that were each 0.9 cm across (wide) and unpatterned side walls that were 0.1 cm high, then 90% of the channel's surface would comprise surface features.

In some embodiments, a device may contain essentially flat channels in a flow distribution section, where flow is internally manifolded into individual channels. The device may contain a heat transfer section that either may or may not have surface feature sections to enhance heat transfer. The device may also have a reaction section, where all or a part of the reaction section contains surface features. The surface features are best used in a cluster, where 5 or 10 or 20 or more similar features are continuously aligned (active surface feature groove followed by a ridge followed by an active surface feature and so on) to conduct a unit operation or to mix a stream comprising at least two fluids. The linear distance or distance along the ridges between surface features is preferably maintained between 0.01× the surface feature span or run width and 10× the surface feature span or run width. A preferred range for the distance between adjacent surface features is 0.2× to 3× the opening or span or run width of the active surface feature. As this distance increases, the otherwise laminar flow stream will relax to a conventional parabolic flow path and not readily induce fluid into the active surface features.

Preferably, the channel is enclosed on all sides, and in some embodiments the channel has a generally square or rectangular cross-section (in the case of rectangular channel, patterning is preferably disposed on both major faces). For a generally square or rectangular channel, the channel may be enclosed on only 2 or 3 sides and only the 2 or 3 walled sides are used in the above described calculation of % surface features.

Patterns

Each of the surface feature patterns may be repeated along one face of the main channel, with variable or regular spacing between the features in the main channel bulk flow direction. Some embodiments have only a single leg to each feature, while other embodiments have multiple legs (2, 3, or more).

For a wide-width main channel, multiple features or columns of repeated features may be placed adjacent to one another across the width of the main channel. For each of the surface feature patterns, the feature depth, width, span, and spacing could be variable or constant as the pattern is repeated along the bulk flow direction in the main channel, although constant or regularly repeated dimensions are preferred. Also, surface feature geometries having an apex connecting two legs at different angles may have alternate embodiments in which the feature legs are not connected at the apex.

Figure 2E:
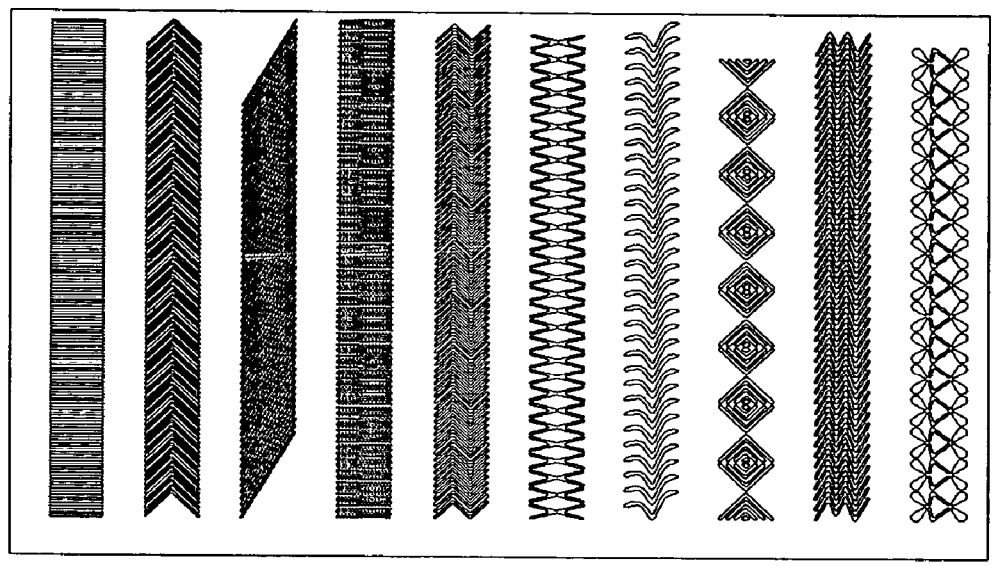

FIG. 2e shows a number of different patterns that may be used for surface features. These patterns are not intended to limit the invention, only to illustrate a few possibilities. As with any surface features, the patterns may be used in different axial or lateral sections of a microchannel.

In some embodiments (involving washcoating a catalyst composition onto a microchannel) it is desired to hold up liquid in the surface features in a gravitational field (i.e. in applications such as applying uniform coatings to the walls of microchannels). For such embodiments the vertical component (relative to gravity) of the run length of each surface feature leg should be preferably less than 4 mm and more preferably less than 2 mm to prevent the liquid in the feature from draining out. For these embodiments, it is also preferred for the active surface feature run width, span or opening to be less than the open channel gap of the microchannel (where draining and the main fluid flow occurs during the unit operation). If the run width is greater than the channel gap then the features may not hold the fluid during draining.

Figure 3A:
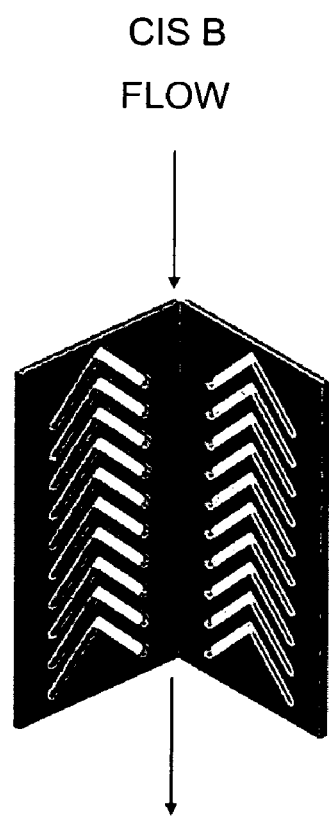
FIGS. 3a-3k illustrate various patterns for surface features.

The surface feature geometry SFG-0 (see FIG. 3a) is described by an array of chevrons or v-shaped recesses that occur along the length of the unit operation process microchannel. The chevrons may be either regularly or irregularly spaced with equal or varying distance between successive features. Regular (or equal) spacing of the features may be preferred since the disruptions to the bulk flow in the main channel effected by the presence of each feature better reinforces the disruptions effected by the other features. A one-sided feature would have features on only one side of the microchannel. A two-sided feature would have features on two sides of a microchannel (either on opposite walls or adjacent walls). In some two-sided orientation embodiments, feature orientation may be either in the cis orientation or the trans orientation. In the cis orientation with features on opposite walls, shown in FIG. 3a, the features are a mirror image on both channel walls. Trans refers to an alignment of a two or more sided mirochannel with surface features where the features on opposite walls are not aligned, but rather a second wall is first taken as a mirror image and then rotated 180 degrees (so that the top view of the pattern appears upside down relative to the first wall) to create offsetting features. It is noted that the second and opposing wall may not be a perfectly rotated mirror image, as filler features may be added to create more net area of the microchannel that contains surface features, and since the features on opposite walls may be somewhat offset from one another along the direction of bulk flow. Flow orientation relative to the features on a given wall may be either cis A (flow direction from bottom to top of FIG. 3a) or cis B (for example, flow direction from top to bottom in FIG. 3a). Typically, the features are on opposing walls, but they could be on adjacent walls.

Cis A refers to an alignment of a two or more sided microchannel with surface features where the features on both top and bottom are aligned in the same direction with respect to flow, and the surface feature legs are converging along the flow direction.

Cis B refers to an alignment of a two or more sided microchannel with surface features where the features on both top and bottom are aligned in the same direction with respect to flow, and the surface feature legs are diverging along the flow direction.

Fanelli refers to a discontinuity or small disconnection of the legs of the surface features that are otherwise connected. The discontinuity is less than 20% of the microchannel width, and preferably less than 10% of the microchannel width. FIG. 3h shows a Fanelli for a SFG-0 feature pattern, where the apex is removed to help alleviate either dead spots or reduced velocity regions in the main channel flow path that result from a change in angle. The disconnected location of a Fanelli between two surface features may be also dislocated along the length direction of the channel, where half of a v starts and stops at two axial locations along the channel lenght and the other half of a v starts and stops at an off set position either slightly above or below the start and stop point of the first half of the v.

Figure 3B:
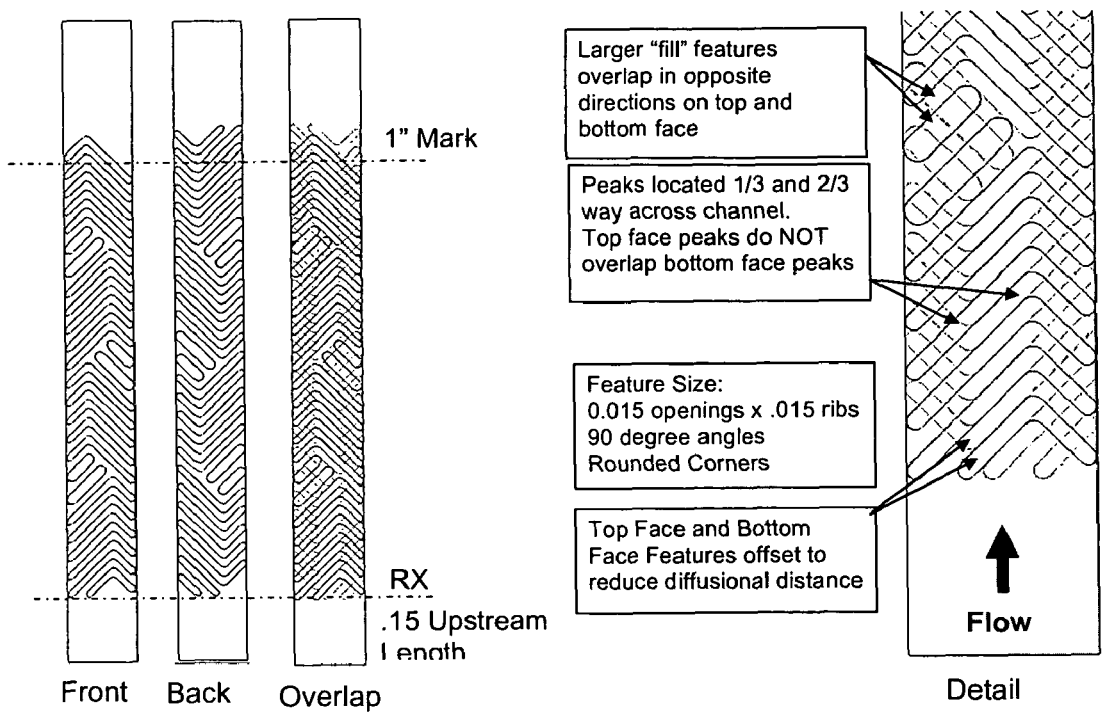

Surface feature geometry 1 (SFG1) is represented in FIG. 3b and contains features that alternate in orientation or angle along each microchannel wall. For this geometry, five or more asymmetric chevrons (where one feature leg is longer than a second feature leg) are placed with the apex of the feature placed one-third of the microchannel width, the features are then followed by two filler features (noting that fewer or more filler features could be used), and then followed by 5 or more asymmetric features where the apex of the chevron is roughly two-thirds along the width of the microchannel. This pattern is repeated several times. As shown, the pattern on the opposing microchannel wall is in the trans-orientation, where the features are not mirror images.

Figure 3C:

SFG-2 is a design where each angle continuously changes along the feature run length, as shown in FIG. 3c (top down view), where the flow in the main channel adjacent to the features is from left to right or from right to left. The feature could be advantageous in minimizing flow disturbance at the leading edge of each feature since the shape is more aerodynamic. The substantially continuously changing angle could also change from a positive to a negative value along the feature run length.

Figure 3D:
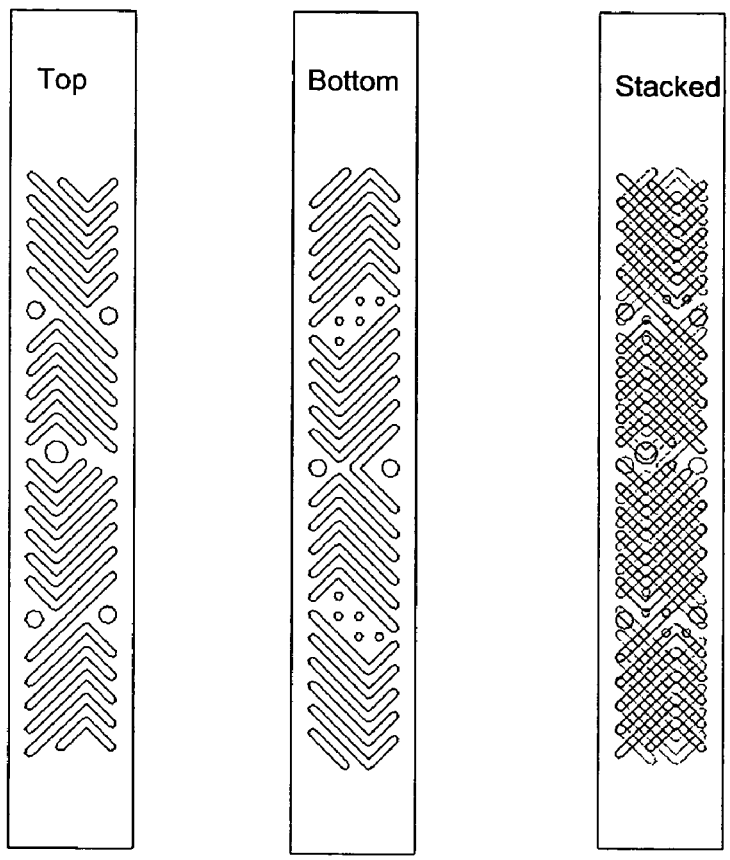

A top view of the SFG-3 surface feature pattern is shown in FIG. 3d, including a view of both top and bottom faces, and how the two overlap when seen from above. This pattern can be repeated as many times as necessary to fill the desired length. The main characteristic of SFG-3 is the repetition of the "checkmark" shape of SFG-5

Figure 3E:
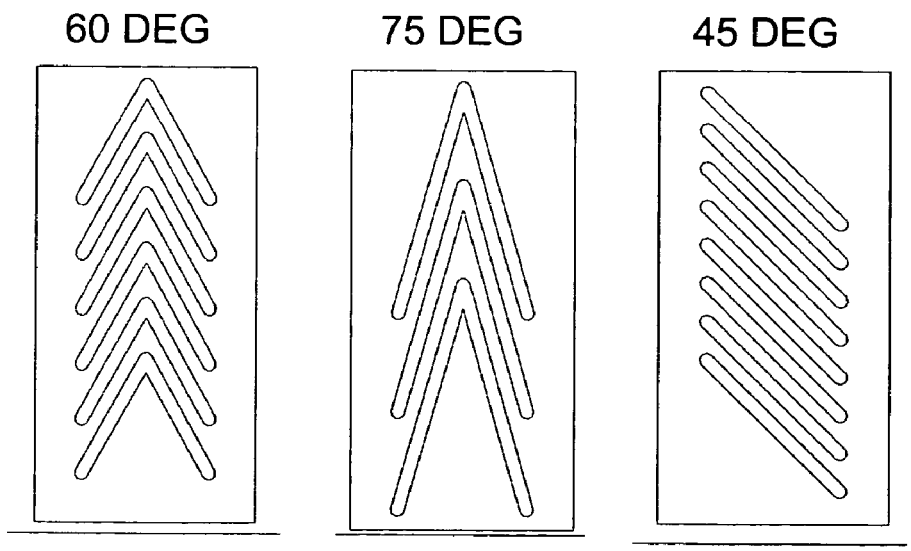

The feature pattern SFG-4 is a simple diagonal slot with only one feature leg per surface feature (such as shown in the right hand side of FIG. 3e). The pattern SFG4 is substantially similar to many single angle diagonal features described in the prior art and is particulary ineffective for mixing and unit operations, especially for one wall only patterns or two-wall patterns with a trans orientation. Flow in this pattern has a decreasing fraction of residence time spent within the features as the Reynolds number increases.

Surface feature geometry 5 is represented by a series of checks, where the apex of the check is such that the run length of one leg of the feature is roughly half of the run length of the other leg. Groups of 4 or more of these "check" shaped features can be arranged in many different combinations, including the three shown in FIG. 3f. These groups of checks may have different orientations relative to one another, or all have the same orientation, forming a continuous pattern of checks along the surface. Each combination or variety of SFG-5 pattern will yield different mixing characteristics.

Figure 3F:
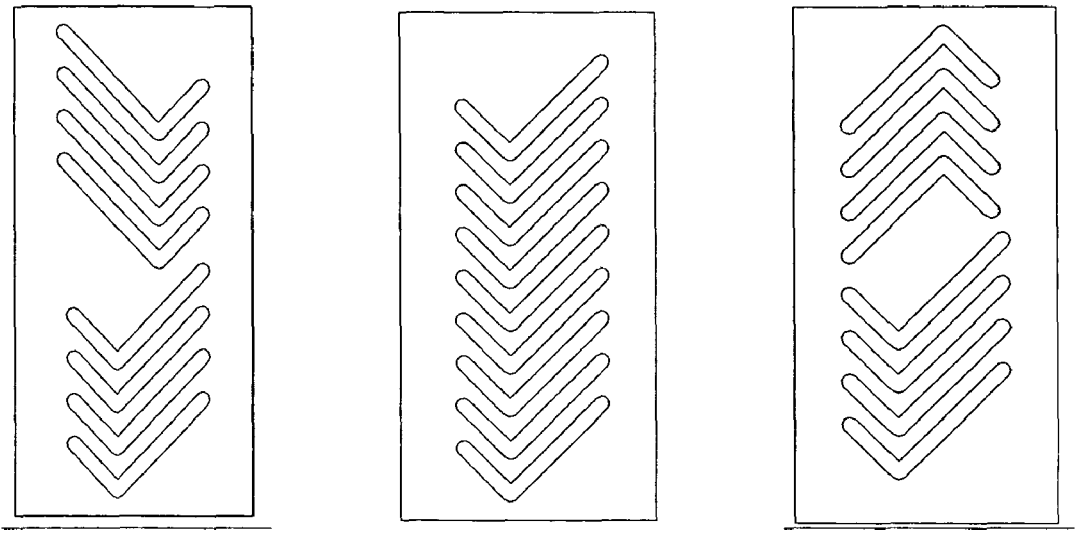

FIG. 3*f* illustrates three different alternative layouts for SFG-5 surface feature geometry patterns.

Figure 3G:
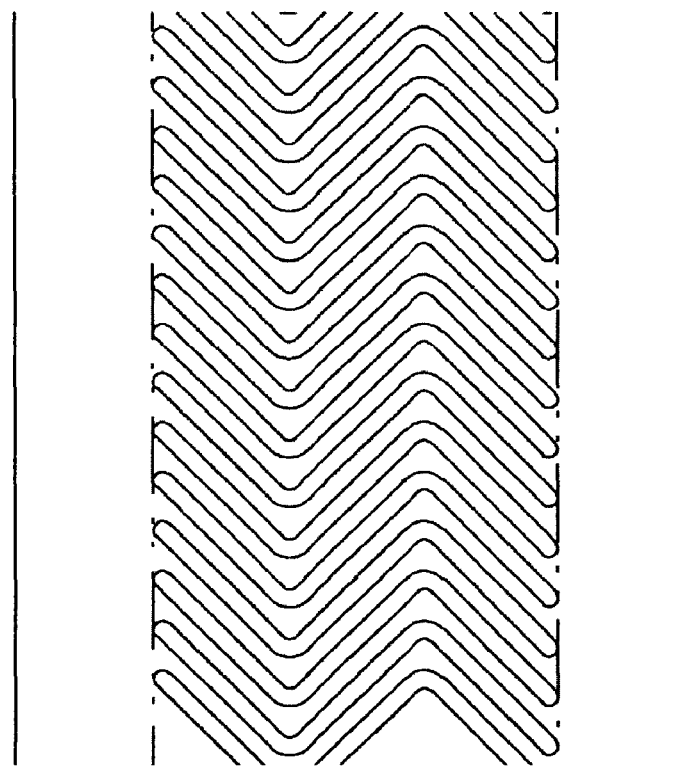
Figure 3H:
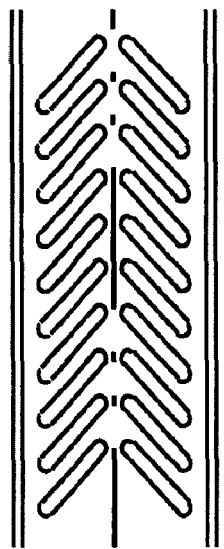

Surface features preferably have at least one change in the angle of orientation. Surface feature geometry 6 (SFG 6) contains three surface feature legs and has two changes in the angle of orientation from positive to negative with respect to the direction of flow, as shown in FIG. 3*g*. This imparts aspects of both an "A" and a "B" type flow direction to the flow in the main channel, as two of the feature legs are convergent with respect to each other along the bulk flow direction and two of the feature legs are divergent with respect to each other along the bulk flow direction.

Figure 3J:
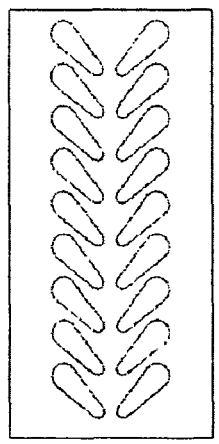
Figure 3I:
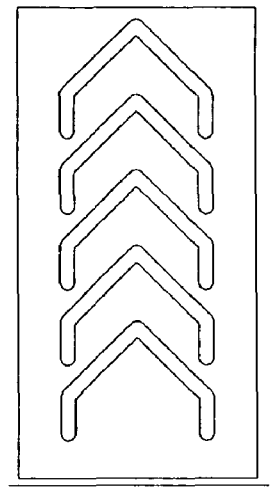

"House" refers to an entrance leg to a surface feature where one or more legs runs parallel with the main channel bulk flow direction before turning at an oblique angle to the direction of flow (see FIG. 3*i*). The angle may optionally be more rounded than that shown in the figure below. The house may also be preferentially at an angle other than 90 degrees such that it improves the advection of flow into the active surface features.

A sharks tooth pattern represents a single legged surface feature with a varying span from one end to the other (see, for example, FIG. 3*j*). The leg may be at any angle relative to the main channel bulk flow direction, and multiple teeth at different angles may populate a microchannel wall.

FIG. 3*e* illustrates surface features with a 60 degree angle for SFG-0, a 75 degree angle for SFG-0, and a 45 degree angle for the SFG-4 pattern, where the angle is defined relative to a horizontal plane that bisects the microchannel cross section orthogonal to the main flow direction.

Figure 3K:
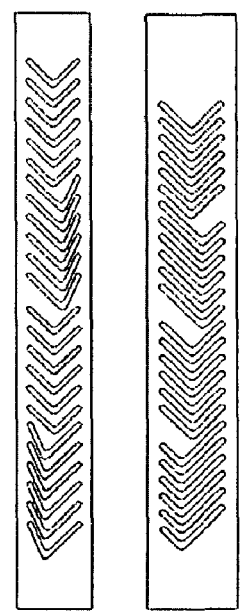

Other embodiments of multiple-legged surface feature geometries have different angles and or lengths for each leg, or for some of the legs, or groupings of 5 or more identical surface features as shown in FIG. 3*k*. Repetition of groupings of surface features also provides potential advantages during fabrication. For example, when stamping features from thin sheets, stamping tools can be made to stamp multiple features at once.

Layered surface features: Layered surface features are formed in one or more wall of a main channel. The layered surface feature wall is formed by stacking adjacent layers with different surface feature geometries in them (see FIG. 4*a*), and aligning the columns of features such that the two stacked together make a more complex three dimensional feature. For layered features, the surface features in all layers except the layer farthest from the main channel must be through features. Alternately, the identical surface features made as through features in a thin sheet may be made deeper by stacking sheets of identical surface features directly on top of one other and aligning the features in each sheet.

Microchannel Apparatus

Microchannel reactors are characterized by the presence of at least one reaction channel having at least one dimension (wall-to-wall, not counting catalyst) of 1 cm or less, preferably 2 mm or less (in some embodiments about 1.0 mm or less) and greater than 100 nm (preferably greater than 1 µm), and in some embodiments 50 to 500 µm. A catalytic reaction channel is a channel containing a catalyst, where the catalyst may be heterogeneous or homogeneous. A homogeneous catalyst may be co-flowing with the reactants. Microchannel apparatus is similarly characterized, except that a catalyst-containing reaction channel is not required. The gap (or height) of a microchannel is preferably about 2 mm or less, and more preferably 1 mm or less. The length of a reaction channel is typically longer. Preferably, the length is greater than 1 cm, in some embodiments greater than 50 cm, in some embodiments greater than 20 cm, and in some embodiments in the range of 1 to 100 cm. The sides of a microchannel are defined by reaction channel walls. These walls are preferably made of a hard material such as a ceramic, an iron based alloy such as steel, or a Ni-, Co- or Fe-based superalloy such as monel. They also may be made from plastic, glass, or other metal such as copper, aluminum and the like. The choice of material for the walls of the reaction channel may depend on the reaction for which the reactor is intended. In some embodiments, reaction chamber walls are comprised of a stainless steel or Inconel® which is durable and has good thermal conductivity. The alloys should be low in sulfer, and in some embodiments are subjected to a desulfurization treatment prior to formation of an aluminide. Typically, reaction channel walls are formed of the material that provides the primary structural support for the microchannel apparatus. Microchannel apparatus can be made by known methods, and in some preferred embodiments are made by laminating interleaved plates (also known as "shims"), and preferably where shims designed for reaction channels are interleaved with shims designed for heat exchange. Some microchannel apparatus includes at least 10 layers laminated in a device, where each of these layers contain at least 10 channels; the device may contain other layers with less channels.

Microchannel apparatus (such as microchannel reactors) preferably include microchannels (such as a plurality of microchannel reaction channels) and a plurality of adjacent heat exchange microchannels. The plurality of microchannels may contain, for example, 2, 10, 100, 1000 or more channels capable of operating in parallel. In preferred embodiments, the microchannels are arranged in parallel arrays of planar microchannels, for example, at least 3 arrays of planar microchannels. In some preferred embodiments, multiple microchannel inlets are connected to a common header and/or multiple microchannel outlets are connected to a common footer. During operation, the heat exchange microchannels (if present) contain flowing heating and/or cooling fluids. Non-limiting examples of this type of known reactor usable in the present invention include those of the microcomponent sheet architecture variety (for example, a laminate with microchannels) exemplified in U.S. Pat. Nos. 6,200,536 and 6,219,973 (both of which are incorporated by reference). Performance advantages in the use of this type of reactor architecture for the purposes of the present invention include their relatively large heat and mass transfer rates, and the substantial absence of any explosive limits. Pressure drops can be low, allowing high throughput and the catalyst can be fixed in a very accessible form within the channels eliminating the need for separation. In some embodiments, a reaction microchannel (or microchannels) contains a bulk flow path. The term "bulk flow path" refers to an open path (contiguous bulk flow region) within the reaction chamber. A contiguous bulk flow region allows rapid fluid flow through the reaction chamber without large pressure drops. Bulk flow regions within each reaction channel preferably have a cross-sectional area of $5 \times 10^{-8}$ to $1 \times 10^{-2}$ m², more preferably $5 \times 10^{-7}$ to $1 \times 10^{-4}$ m². The bulk flow regions preferably comprise at least 5%, more preferably at least 50% and in some embodiments, 30-99% of either 1) the interior volume of a microchannel, or 2) a cross-section of a microchannel.

In many preferred embodiments, the microchannel apparatus contains multiple microchannels, preferably groups of at least 5, more preferably at least 10, parallel channels that are connected in a common manifold that is integral to the device (not a subsequently-attached tube) where the common manifold includes a feature or features that tend to equalize flow through the channels connected to the manifold.

Examples of such manifolds are described in U.S. patent application Ser. No. 10/695,400, filed Oct. 27, 2003 which is incorporated herein. In this context, "parallel" does not necessarily mean straight, rather that the channels conform to each other. In some preferred embodiments, a microchannel device includes at least three groups of parallel microchannels wherein the channel within each group is connected to a common manifold (for example, 4 groups of microchannels and 4 manifolds) and preferably where each common manifold includes a feature or features that tend to equalize flow through the channels connected to the manifold.

Heat exchange fluids may flow through heat transfer microchannels adjacent to process channels (such as reaction microchannels), and can be gases or liquids and may include steam, oil, or any other known heat exchange fluids—the system can be optimized to have a phase change in the heat exchanger. In some preferred embodiments, multiple heat exchange layers are interleaved with multiple reaction microchannels. For example, at least 10 heat exchangers interleaved with at least 10 reaction microchannels and preferably there are 10 layers of heat exchange microchannel arrays interfaced with at least 10 layers of reaction microchannels. Each of these layers may contain simple, straight channels or channels within a layer may have more complex geometries. In preferred embodiments, one or more interior walls of a heat exchange channel, or channels, has surface features.

In some embodiments, the inventive apparatus (or method) includes a catalyst material. The catalyst may define at least a portion of at least one wall of a bulk flow path. In some preferred embodiments, the surface of the catalyst defines at least one wall of a bulk flow path through which passes a fluid stream. During a hetereogeneous catalysis process, a reactant composition can flow through a microchannel, past and in contact with the catalyst.

In some preferred configurations, a catalyst includes an underlying large pore support. Examples of preferred large pore supports include commercially available metal foams and metal felts. A large pore support has a porosity of at least 5%, more preferably 30 to 99%, and still more preferably 70 to 98%. Preferably, the support has a volumetric average pore size, as measured by BET, of 0.1 $\mu$m or greater, more preferably between 1 and 500 $\mu$m. Preferred forms of porous supports are foams and felts and these are preferably made of a thermally stable and conductive material, preferably a metal such as stainless steel or FeCrAlY alloy. These porous supports can be thin, such as between 0.1 and 1 mm. Foams are continuous structures with continuous walls defining pores throughout the structure. Felts are nonwoven fibers with interstitial spaces between fibers and includes tangled strands like steel wool. The porous supports may be stacked between a heat transfer wall and a sheet with through surface features. Alternatively, the porous supports may be etched, cut or otherwise have active surface feature grooves placed within the sheets. The sheets may be stacked with non-porous sheets that serve as walls to form an assembly. In this embodiment, the porosity of the active surface feature itself increases the number of sites for chemical reaction where the reactants may diffuse from the groove formed within the porous sheet to the internal and smaller pores present within the porous sheet. An active catalyst layer or layers may be disposed upon the porous sheet. The through surface features bring molecules via both advection and diffusion into the recessed grooves where they can continue to diffuse within the porous supports where a catalyst is disposed therein or thereon. As the molecules spend disproportionately more time in the features as the Reynolds time is increased, there is more time for the reactants to collide with and react with the catalyst surfaces. As the reactants spend time within the surface feature grooves and the porous catalyst layer they are not being convectively moved downstream with the bulk flow and thus away from the active catalyst.

A catalyst with a large pores (and including the alumina-supported catalytically active sites) preferably has a pore volume of 5 to 98%, more preferably 30 to 95% of the total porous material's volume. Preferably, at least 20% (more preferably at least 50%) of the material's pore volume is composed of pores in the size (diameter) range of 0.1 to 300 microns, more preferably 0.3 to 200 microns, and still more preferably 1 to 100 microns. Pore volume and pore size distribution are measured by mercury porisimetry (assuming cylindrical geometry of the pores) and nitrogen adsorption. As is known, mercury porisimetry and nitrogen adsorption are complementary techniques with mercury porisimetry being more accurate for measuring large pore sizes (larger than 30 nm) and nitrogen adsorption more accurate for small pores (less than 50 mm). A catalyst, such as a catalyst metal disposed on an oxide layer can be deposited on the large pore support.

In some embodiments, the height and width of a microchannel defines a cross-sectional area, and this cross-sectional area comprises a porous catalyst material and an open area, where a porous catalyst material occupies 5% to 99% of the cross-sectional area and where the open area occupies 5% to 99% of the cross-sectional area. In another alternative, catalyst can be provided as a coating (such as a washcoat) of material within a microchannel reaction channel or channels. The use of a flow-by catalyst configuration can create an advantageous capacity/pressure drop relationship. In a flow-by catalyst configuration, fluid preferably flows in a gap adjacent to a porous insert or past a wall coating of catalyst that contacts the microchannel wall (preferably the microchannel wall that contacts the catalyst is in direct thermal contact with a heat exchanger (preferably a microchannel heat exchanger), and in some embodiments a heat exchange stream contacts the opposite side of the wall that contacts the catalyst).

In some embodiments, a microchannel contains a porous flow-by catalyst that has a thickness (>25 microns) greater than a wall washcoat (<25 microns). In some embodiments, the thickness of the porous flowby catalyst may exceed 25 microns as can the thickness of the catalyst washcoat. In all cases it is preferred for the washcoat thickness to be less than the thickness of the flow-by catalyst structure. A porous catalyst may have surface features (preferably recessed features) that perturb both the bulk flow path in the open flow channel to reduce external mass transport resistance and promote advection within the surface features which aids bringing fresh reactant to the porous catalyst structure and removing product. The recessed surface features may be recessed all the way through or part of the way through the thickness of the thick porous catalyst structure. The porous catalyst may be any length; for example, a continuous porous catalyst (with surface features) or discontinuous porous catalyst (separated by surface features) may extend over a length of at least 1 cm, 3 cm or more.

Surface features could be formed in a large pore catalyst such as a catalyst foam or catalyst felt. A structured surface could be provided by inserting, into a microchannel, a catalyst insert having surface features. The insert could be formed of a large pore catalyst (such as a foam or felt) or by inserting a surface-featured metal support followed by coating a catalyst onto the surface of the support.

Washcoats are coatings that are applied to a channel wall by exposing a channel wall to a liquid based coating composition. The coating composition may contain a suspension of particles (typically a metal oxide or mixture of metal oxide and metal particles) or a sol. A catalyst coating that had been formed by washcoating may be called a washcoat.

A microchannel appratus may also contain multiple sections of active surface features along the length of the reactor. A first section may be used to imrove heat transfer while a second section may be used for a chemical reaction. Alternatively, there may be two or more sections within a unit operation where either reactions are mass exchange such as a separation are occuring. It may be advantageous to have two or more chemical reactions in series in distinct surface feature sections. In one embodiment two distinct reactions may be preferred for the case of a series reaction or to add a new reactant to continue the reaction or to just continue the reaction with a new heat transfer fluid or continue a reaction while controlling or tailoring the wall temperature between or in the surface feature section or otherwise control the mechanical strain of the metal. Another motivation to have two or more active surface feature sections in series in a microchannel apparatus may make use of a channel that contains a bend or a U-flow where the flow travels essentially in one direction before bending and traveling back down a second channel. An active surface feature section may be made in both the forward and back path, especially useful in a catalytic combustion application where low emissions are desirable.

Capillary Features in Microchannel Walls

Surface features can also act as capillary features that are useful to enable selective retention of a liquid on or near the microchannel wall. The features may be of any shape (rectangular, circular, trapezoidal, other) as long as they provide at least one critical dimension less than a defined parameter based on the fluid properties such that capillary forces are stronger than gravitational forces to prevent draining or slip along the microchannel walls.

Capillary features may be placed along the length of the microchannel at the desired location to create a uniform or tailored intrachannel distribution of a coating composition.

To promote good channel-to-channel uniformity, the same profile of capillary features are placed along every parallel microchannel in an array of microchannels. The features are preferentially aligned partly or fully normal to the direction of gravity to minimize draining with the direction of gravity. The features may be aligned at an angle with respect to the direction of gravity during draining. The features may be oriented parallel to the direction of gravity if they are short and discontinuous. On a microchannel wall, there are preferably three, five, ten, or more features in a group.

In one embodiment a tailored profile may leave more capillary features and thus more catalyst solution near the front of a reactor section where the demand for catalyst is higher. In another embodiment for the case of an exothermic reaction, such as a selective oxidation, the amount of catalyst placed or retained near the front of the reactor may be reduced to in turn reduce the amount of heat released and thus unwanted temperature rise. In a third embodiment, the location and size of capillary features may be tailored on the edge channels of a microchannel device such that the heat release is reduced near the device edge. For example, in a layer of a microchannel device, there may be a higher concentration of capillary features near the center of the layer than near an edge so that more coating is applied near the center of the device. Thus, on a layer comprising an array of microchannels with at least one central microchannel and two edge microchannels, in some embodiments the at least one central channel can have a higher concentration of capillary features than the concentration in either of the two edge channels; this can be reversed if greater catalyst concentration is desired along the edge. This may create an advantaged mechanical design wherein the local edge temperature is reduced near an area of high thermal strain. The capillary features may be used to control or tailor the process performance as measured in conversion and selectivity for a given capacity or flow rate per unit volume. The features may also be used to minimize mechanical strains in high strain regions of the apparatus by reducing the local heat release and thus reduce the resulting temperature gradient.

To retain a liquid (either catalyst precursor or other). The fluid is filled within a microchannel or an array of parallel microchannels and then drained while leaving behind fluid within the capillary features on the wall. The fluid may then be dried to leave behind active agent on the walls. The fluid may be aqueous based or comprising a solution or a slurry or a suspension of solid particles or liquid droplets, including nanoparticles, or it may be a polymeric solution, or any liquid coating composition.

Methods of Making Surface Features

Surface features can be made, for example, by laser etching; Electrical Discharge Machining (EDM) which uses a small diameter wire to make the intended feature by burning away a conductive base material; or stacking a sheet with through holes onto another sheet and then bonding the sheets together. The surface features may be partially etched within a sheet or be formed in a sheet as through features, which sheet is then placed adjacent to a solid wall. Alternatively, the surface features may be created by stacking two or more sheets with through features adjacent to a solid or etched sheet. The pattern and/or size and/or shape of the features may be different on the two or more stacked sheets of through features. Surface features may also be made by three-dimensional patterning processes, such as an SLS process where metal powder is selectively sintered to create intricate 3-D structures.

The surface features could be formed as through slots or holes in a thin metal shim that is stacked adjacent to a wall shim prior to diffusion bonding. The resulting structure would be similar to recessed features in a microchannel wall.

Surface features may be used to tailor mixing and/or the application of a catalyst or any other washcoating solution along the length of a microchannel wall. A greater concentration of surface features can be placed near a microchannel inlet (such as an inlet from a header) or, alternatively, relatively more can be disposed near a microchannel outlet. Thus, in some embodiments, a reaction microchannel, with one inlet and one outlet, has a greater density of capillary features near the inlet than near the outlet; or, conversely, has greater density of capillary features near the outlet than near the inlet.

Catalyst Coatings

Microchannels containing surface features can be coated with catalyst or other material such as sorbent. Catalysts can be applied onto the interior of a microchannel using techniques that are known in the art such as wash coating. Techniques such as CVD or electroless plating may also be utilized. In some embodiments, impregnation with aqueous salts is preferred. Pt, Rh, and/or Pd are preferrred in some embodiments. Typically this is followed by heat treatment and activation steps as are known in the art. Salts which form solutions of pH>0 are preferred. Other coatings may include sol or slurry based solutions that contain a catalyst precursor and/or support. Coatings could also include reactive methods of application to the wall such as electroless plating or other surface fluid reactions.

Coatings could also be applied onto microchannel walls by filling channels to the desired height with a liquid coating composition and removing volatile components (typically solvent) under reduced pressure. Care may need to be exercised to avoid bubbling defects.

Figure 5:
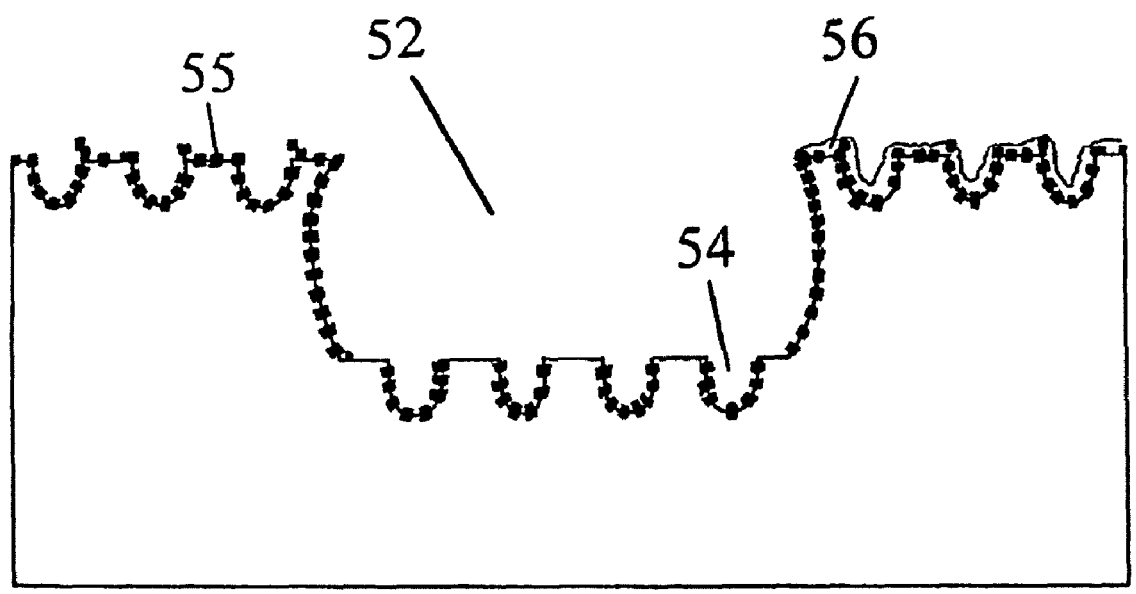
FIG. 5 illustrates subpatterning on surface features for increasing surface area.

Materials, such as metals, can be printed onto a microchannel wall (either flat or featured) by printing, preferably by techniques similar to ink jet printing. A printed metal pattern could also be used as a seeding material (catalyst) for the formation of electrolessly-deposited metal (preferably a patterned, electoless coating). Additionally or alternatively, selective etching and/or selective deposition techniques developed in the electronics industry can be used to provide subpatterning in surface features 52. See FIG. 5. This subpatterning is especially useful to enhance surface area for deposition of a catalyst, and/or direct selective deposition of a catalyst for enhanced reaction control. For example, plural sub-wells 54 can be formed at the bottom of a surface feature and/or the top of a surface feature, and catalyst 56 can be deposited (for example by washcoating) over the plural sub-wells. Optionally, areas 55 of a thermally conductive material can be deposited over the surface features and/or sub-wells for further enhanced surface area.

Reactions

In some aspects, the invention provides a method of conducting a reaction, comprising: flowing at least one reactant into a microchannel, and reacting the at least one reactant in the presence of a catalyst within the microchannel to form at least one product. In some embodiments, the reaction consists essentially of a reaction selected from: acetylation, addition reactions, alkylation, dealkylation, hydrodealkylation, reductive alkylation, amination, ammoxidation, ammonia synthesis, aromatization, arylation, autothermal reforming, carbonylation, decarbonylation, reductive carbonylation, carboxylation, reductive carboxylation, reductive coupling, condensation, cracking, hydrocracking, cyclization, cycloo-ligomerization, dehalogenation, dimerization, epoxidation, esterification, exchange, Fischer-Tropsch, halogenation, hydrohalogenation, homologation, hydration, dehydration, hydrogenation, dehydrogenation, hydrocarboxylation, hydroformylation, hydrogenolysis, hydrometallation, hydrosilation, hydrolysis, hydrotreating (HDS/HDN), isomerization, methylation, demethylation, metathesis, nitration, polymerization, reduction, reformation, reverse water gas shift, Sabatier, sulfonation, telomerization, transesterification, trimerization, and water gas shift. Combustion is another preferred reaction. Hydrocarbon steam reforming is especially preferred (such as methane, ethane or propane steam reforming among others).

EXAMPLES

Steam Methane Reforming Reactions in Microreactors with Wall Surface Features

The effect of surface features on the reactor performance was explored for the methane steam reforming reaction. The intent of the features was to increase the conversion per length, especially at low catalyst activity. The surface features increase the available surface area for catalyst, they allow a solution derived catalyst to be washcoated uniformly, and they reduce external mass transport limitations in the bulk microchannel and thus allow the reactor to operate closer to the intrinsic potential of the catalyst activity.

In this example, the surface features have rectangular cross section shape; are on either one or both sides of the microchannel; the depth of the surface features are of the same order as the main flow channel gap; and the surface features are placed at a specified angle relative to the main flow direction Part of the dimensions defining the problems are kept the same for all the examples
  Channel gap: 0.0125"
  Channel width: 0.18"
  Depth of the grooves: 0.010" (0.005" and 0.015" also evaluated) placed on both sides of the microchannel
  Run Width or span of the grooves: 0.015"
  Distance between adjacent grooves (edge to edge distance): 0.015"
  5 grooves placed in series (length approximately 0.15")
The per channel flowrate for all computations was 0.238 kg/hr of a mixture of 3:1 steam to methane at 25 atm.

SMR Kinetics

Methane steam reforming (SMR) reaction in a microchannel reactor is the focus of this example.

$$CH_4 + H_2O \leftrightarrow CO + 3H_2$$

Also, the water gas shift (WGS) reaction, which is modestly exothermic, was also considered because of the importance of $CO_2$ formation on the SMR catalyst.

$$CO + H_2O \leftrightarrow H_2 + CO_2$$

The following kinetics were assumed for all the CFD simulation results reported in this example (where the subscript "1" refers to the SMR reaction and the subscript "2" refers to the WGS reaction). The following rate expressions for the reaction kinetics are used throughout this example, $$r_1 = k_1 P_{CH4}^{1.6}\left(1 - \frac{P_{CO} P_{H2}^3}{K_1 P_{CH4} P_{H2O}}\right)$$

$$r_2 = k_2(P_{CO} P_{H2O} - P_{H2} P_{CO2}/K_2)$$

The reaction rates are in kmol/m2-cat.sec, and the pressures $P_i$ in the above equations are in bar. The reaction rate constants follow the Arrhenius form as follows:

$$k_1 = A_1 \exp(-E_1/RT)$$

$$k_2 = A_2 \exp(-E_2/RT)$$

The activation energy for the SMR reaction was assumed to be $E_1 = 1.7E8$ J/Kmol; and for the WGS reaction, $E_2 = 6.713E+7$ J/Kmol. The pre-exponential factors were assumed to be $A_1 = 2.126E+04$ and $A_2 = 1.222$.

In these reaction rate expressions, the reverse reactions are taken into account through the respective chemical equilibrium constants $$K_1 = \exp(-26830/T + 30.114)$$

$$K_1 = \exp(4400/T - 4.036)$$

The parameters in the kinetics are results of best fitting of the model predictions using experimental data for an SMR catalyst based on a 5 wt % Rh dispersed on a MgO stabilized alumina. It should be pointed out that, this set of kinetics is not necessarily typical for all SMR catalysts, but is illustrative of the comparative impact of reactor geometry and design on performance.

This set of kinetics is referred as the baseline kinetics. The impact of reduced activity from this baseline level is also evaluated Boundary Conditions The following conditions were imposed on the boundaries.
  Inlet: total mass flow rate F=6.48E-5 kg/s; 3 to 1 molar ratio of steam to methane; Temperature is same as that of the wall.

Outlet: pressure. 345 psia (2.38 MPa) was assumed for all cases unless specified otherwise.

Wall: no slip velocity; constant temperature.

Imposing mass flow rate at the inlet of the reactor section is easy to implement, but this might cause some concerns if the inlet is located right at the leading edge of the catalyst structure because of a known entrance length effect where flow full develops into a laminar flow profile. To avoid this effect in the calculations, a microchannel inlet is placed a certain length upstream of the catalyst structure. No reaction was modeled in this entrance section. The actual length of this entrance is a matter of numerical experiment to make sure that the laminar flow is indeed fully developed when reaching the catalyst structure. In general, an entrance length twenty times of that of the flow gap is sufficient for fully developed laminar flow.

The methane conversion rate is used to compare the reactor performance of different configurations. Also, for the purpose of comparison, a baseline case is modeled which is a straight channel of the same dimensions as those for the cases with surface features in terms of channel length, channel width and gap size. The reactor performance with surface features is quantitatively measured using the following enhancement factor, $$E\_factor = \frac{(x_{withSF} - x_{baseline})}{x_{baseline}};$$

X in the above equation is the methane conversion rate. It is calculated based on the mass flow rate of methane flowing in and out of the reactor. Although, a uniform methane concentration at the inlet of the reactor is assumed, it is not the case at the outlet of the reactor. In general, methane concentration is not completely uniform over the channel cross-section at the outlet. The total flow rate of methane at the outlet is integrated over the outlet area to calculate the average conversion.

A) Surface Grooves Placed at a 90 Degree Angle to the Flow Direction or Substantially Horizontal to the Flow Direction The modeling results show that there is no convective mixing between the fluid within the grooves and the fluid in the main channel. For the trajectories of fluid particles released inside the grooves, they form closed circle confined to the groves in which they are released. The fluid rolls or rotates only within the surface feature. Under the reactive environment, the chemical reactions take place on the surface of the grooves which lead to concentration gradients of the species. Mass diffusion occurs across the interface of the grooves and the main flow channel. Within each groove, the pressure difference is so small that no transverse fluid movement is observed. The E-factor was computed, as shown in Table 1.

TABLE 1

| C. | T Methane conversion baseline | T Methane conversion case A | E_factor case A |
|---|---|---|---|
| 850 | 24.2% | 22.7% | −6.1% |
| 700 | 5.4% | 6.3% | 17.8% |

For this geometry, a surprising result was noted in that if the kinetics were sufficiently fast (at the higher temperature), the surface features may actually have a deleterious effect (a negative enhancement feature). If the kinetics are sufficiently fast and the only flow rotation is within the surface feature, then moving or translating the respective catalyst area from the wall of the bulk flow channel (or empty channel) to a farther distance (end or bottom or valley of the surface feature) adds more mass transfer resistance and inhibits performance. When the kinetics are slow, as seen by the lower temperature results, the longer mass transfer distance from wall to surface feature valley is more than offset by the added surface area of the surface feature and the increase in reaction time for molecules within the surface feature. This pattern did not use advection to bring the reactants into the active surface features.

B) Surface Grooves at an Oblique Angle with the Flow Direction—on both Opposite Walls of the Channel—Symmetry—Converging Flows within the Grooves In this example, SFG0 (V-shaped, or chevron) surface features (or grooves) were simulated via CFD on opposing walls of a main channel in the "cis A" configuration. The SFG0 pattern consists of a repeated similar chevron pattern and acts to bring more fluid into the active surface features than the horizontal groove pattern. As such, the effectiveness factor is always positive thus the features always act to bring more reactants within the active surface features.

Three angles were evaluated, 30, 45 and 60 degrees. The positive angle means that the apex of the V-shaped grooves point to the downstream of the flow (or are pointed with the flow direction), and the flows within the two branches of the V-shape grooves converge at the middle of the main flow channel.

Imaginary massless fluid particles released near the side walls of the flow channel enter the grooves and move transversely toward the center of the channel. The flow of the fluid within each leg (or branch) of the groove is driven by the pressure difference, its maximum is observed near the side walls of the main flow channel—the most upstream location for this particular groove. A secondary flow pattern inside the grooves is driven by the momentum exchange at the interface between the sweeping flow in the main channel and the flow inside the grooves. By superposing the secondary flow onto the dominating transverse flow inside the grooves a spiraling flow pattern is seen. This flow pattern benefits the degree of the chemical conversion taking placing on the walls of the grooves due to the longer effective reaction time. The flows in two connecting branches of the groove converge at the center of the channel where a strong lifting flow is formed into the main flow channel. This lifting flow occurs over a section of the groove and reaches its maximum strength near the center of the channel width. This strong lifting flow near the center of the channel prevents the fluid in the main flow channel from being sucked into the grooves.

The modeling results show that the methane concentration distribution is symmetric referring to the middle plane. But a certain level of un-even distribution of methane in the transverse direction is observed. This will lead to an un-even reaction rate distribution which in turn will cause un-even heat load. However, this un-even heat load will be relieved effectively considering the heat conduction along the transverse direction within the channel walls. Similarly, an un-even product (H2) distribution in the transverse direction is observed.

Again, the larger enhancement factor at lower temperature is observed indicating that the groove features effectively speed up the otherwise slow reaction rates.

TABLE 2

| | T | | |
|---|---|---|---|
| | Methane conversion | | E_factor |
| C. | baseline | Case B (45 deg angle) | Case B (45 deg angle) |
| 850 | 24.2% | 27.2% | 12.4% |
| 700 | 5.4% | 7.6% | 41.8% |

In the Table below we see that the initial reactor performance for this geometry can be ranked for the angles tested from best to worst as: 60 degrees>45 degrees>30 degrees.

TABLE

| Impact of the angle | | | |
|---|---|---|---|
| | T E_factor | | |
| C. | 30 degree | 45 degree | 60 degree |
| 700 | 27.8% | 41.8% | 59.7% |

C) Surface Grooves at an Oblique Angle with the Flow Direction—on both Opposite Walls of the Channel—Symmetry—Diverging Flows within the Grooves Simulations were also run with the v-shape grooves pointing in the opposite direction—that is against the flow direction or in the cis-B orientation, and, surprisingly, the same enhancement factor was measured as the case with the v-shape grooves pointing with the flow direction. The flow patterns were quite different for the grooves of opposite orientations. For the v-shape features pointed toward the direction of flow, the flow inside thet grooves rolled toward the center of the channel or point of the v. For the v-shape features pointed against the direction of flow, the flow rolled toward the sides of the channel. Inside a given groove the pressure is at the highest level at the point of V. For both cases, the total increase in surface area or available surface sites for reaction remains constant thus suggesting equal performance. The narrow microchannel gap (0.0125") gave little external mass transport resistance for the flat channel and thus transverse and perpendicular flow effects had little effect. It is expected that transverse and perpendicular flow effects will be more significant as the reaction channel gap increases.

TABLE 4

| | T | | |
|---|---|---|---|
| | Methane conversion | | E_factor |
| C. | baseline | Case C (−45 degree) | Case C (−45 angle) |
| 850 | 24.2% | 27.1% | 12.3% |
| 700 | 5.4% | 7.6% | 41.8% |

Again, the concentration distribution is symmetric referring to the middle plane, except an un-even distribution of methane in the transverse direction is observed (opposite to that observed in case B) where the methane concentration is locally high at the center of the channel width. This could lead to an un-even reaction rate distribution which in turn could cause an un-even heat load. However, this un-even heat load should be relieved effectively considering the heat conduction along the transverse direction within the channel walls.

D) Surface Grooves at an Oblique Angle with the Flow Direction—on both Opposite Walls of the Channel but with Different Orientation In examples B and C, mirror image surface features in terms of shape and orientation were present on opposite walls of the channel. In this example, grooves of type B are imposed on one wall, and grooves of type C are imposed on the opposite wall (opposing angles). This orientation is also referred to as a trans configuration. The plane of symmetry at the middle of the channel is lost.

The dominant flows within the surface features on the opposite walls point to opposite directions transverse-wise. On one side, the flow turns from the edge close to the center of the main flow channel to the farther edge. While on the opposite side, the flow turns from the edge farther away from the center of the main flow channel to the edge close to the center of the flow channel. These flow patterns within the surface grooves lead to no dominant transverse flow direction in the main flow channel. This is quite distinct from the presence of dominant flow directions in case B (the flow points to the side from the center) and C (the flow points to the center from the sides of the flow channel).

Again, un-even distribution of methane in the transverse direction is observed but at a lesser degee of non-uniformity. Different from the case B and C, the methane concentration distribution along the transverse direction is not monotonic. On one side, the concentration at the center is higher than that near the side wall of the channel. On the other side, the concentration near the side walls of the channel is higher than that near the center of the flow channel. The grooves of opposite orientations at opposite walls act to average the concentration distribution and flow field. The surface features layout with non-perfect symmetry, imperfect symmetry, or asymetric features on the opposite walls offer better initial reactor performance compared to the symmetric layout as shown in case B and C.

TABLE 5

| | T | | |
|---|---|---|---|
| | Methane conversion | | E_factor |
| C. | baseline | Case G (asymmetric) | Case G (asymmetric) |
| 700 | 5.4% | 7.9% | 46.3% |

These results show nearly equal performance to the case with equal surface features on both sides of the wall. There is a slight additional enhancement from having both features coordinated in a push-pull manner to improve the perpendicular flow—thus a slight reduction in the external mass transport. However, if a longer section of this surface feature pattern were simulated, one or more core flows might develop within which little interaction with the active surface features would occur.

For the case of a reactor channel with a larger gap, the importance of the perpendicular flow velocity will become more pronounced. As the gap increases, the contribution to external mass transfer in a flat channel with a laminar flow profile fluid becomes more significant as the increase in diffusion time increases with the square of the diffusion distance (or half gap). The use of surface features to create perpendicular flow will increase the initial enhancement factor. For gas-phase reactions, the importance of surface features as it relates to gap size will also be dependent upon how fast the reactions are progressing relative to the time spent in the reaction channel and the time required for diffusion. As an example, an SMR reaction operated near 1 ms contact time would have an external mass transport effect even at 25 to 50 microns (micron=one thousandth inch) gap. An SMR reaction operated near 10 ms contact time would likely not have an external mass transfer resistance until the gap approaches 500 microns. A liquid phase reaction would have significant mass transfer limitations even for fluid gaps below 500 microns. The inventive features are expected to be advantageous for liquid phase reactions in addition to gas phase reactions, as liquid phase reactions are more likely to exhibit external mass transport limitations.

Figure 6:
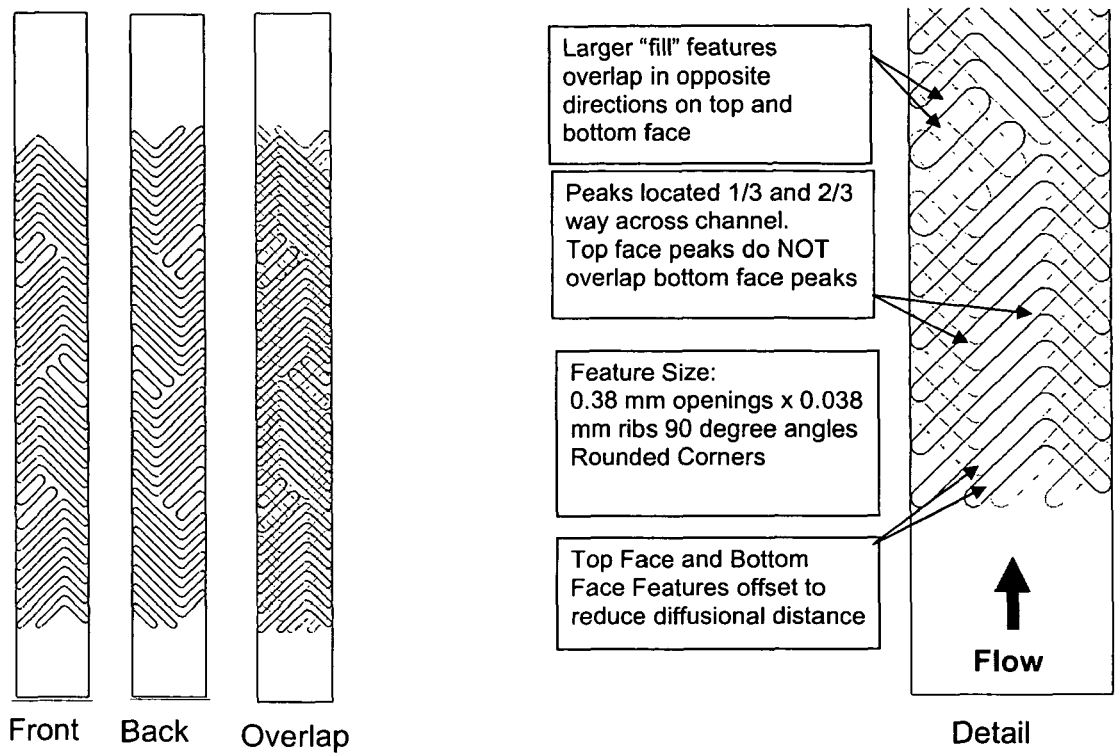
FIG. 6 shows a surface feature pattern that was analyzed in the Examples.

E) Surface Grooves at an Oblique Angle with the Flow Direction—Asymmetric Pattern on Single Side—Different Orientation on Opposite Walls of the Channel A wide range of design parameters are examined in term of the reactor performance enhancement. Among them are:
Surface feature depth
Catalyst activity level
Main channel gap size
Process flow rate The analyzed design is illustrated in FIG. 6; dark lines show recesses on the top surface and lighter lines show recesses on the bottom surface.

TABLE

Reactor enhancement for different depth of the features at 700 C. and 25 atm for SMR kinetics (equilibrium conversion ~44%)

| full activity | Methane conversion | E_factor | dP, psi | relative increase in dP |
|---|---|---|---|---|
| Baseline | 41.4% | | 0.0517 | |
| 0.005" SF | 42.8% | 3.4% | 0.0634 | 22.6% |
| 0.01" SF | 43.7% | 5.7% | 0.0832 | 60.8% |
| 0.015" SF | 44.2% | 6.8% | 0.0957 | 85.0% |

In all these simulations, full SMR catalyst activity specified at the beginning of this section is applied. As shown in the above Table, a small enhancement in term of methane conversion is seen. It should be pointed out that the methane conversion achieved for all the cases approaches the equilibrium conversion at the temperature of 700 C. The pressure drop from the inlet to the outlet of the reactor increases as the depth of the surface features increases. This reflects more momentum loss in the surface features of larger depth. However, the pressure drop increases at a slower rate as the surface features are deeper.

TABLE

Reactor enhancement for different depth of the features (lower catalyst activity level - 20%)

| 20% activity | Methane conversion | E_factor | dP, psi | relative increase in dP |
|---|---|---|---|---|
| Baseline | 19.8% | | 0.0459 | |
| 0.005" SF | 22.6% | 14.0% | 0.0571 | 24.4% |
| 0.01" SF | 25.1% | 26.6% | 0.0755 | 64.6% |
| 0.015" SF | 27.3% | 37.5% | 0.0872 | 90.1% |

A much higher degree of enhancement is seen as the catalyst activity is reduced. For the cases summarized in the above Table, the baseline kinetics as described previously were reduced to 20% of the original baseline. Surprisingly, the deeper features gave better performance. The deeper features have both more surface area but also more distance from the bulk flow path to the reactor wall. The extra surface area outweighs a mass transport issue because of the perpendicular flow velocity both in the bulk channel and within the surface features themselves.

Activity level is defined as a percentage reduction in the pre-exponential factor used for the previously described kinetic expression. In general, the impact of active surface features is more pronounced as the rate of reaction or kinetics are slower. This is a result of the increased time spent within an active surface feature becoming more important as the catalyst activity is reduced.

TABLE

Impact of activity level on the rector performance with 0.01" deep features at 700 C. and 25 atm for methane reforming

| Activity Level | | Methane conversion | E_factor |
|---|---|---|---|
| 100% | Baseline | 41.4% | |
| (Full) | With SF | 42.8% | 3.4% |
| 75% | Baseline | 38.9% | |
| | With SF | 43.2% | 11.0% |
| 50% | Baseline | 33.8% | |
| | With SF | 40.4% | 19.5% |
| 20% | Baseline | 19.8% | |
| | With SF | 22.6% | 14.0% |

The relative enhancement afforded by the surface features goes through an optimum with catalyst activity. If the kinetics are very fast and the microchannel gap small (<0.015" for a gas phase reaction run less than 10 ms contact time), then the added transverse and perpendicular flow within the channel offers little added advantage and most of the impact arises from the increase in surface area. If the kinetics are too slow then the short contact time environment of the microchannel dominates in that the reactants are swept out of the reactor before appreciable conversion occurs.

TABLE

Impact of the process flow rate on the reactor performance with 0.015" deep features at 700 C. and 25 atm for methane reforming

| 20% activity | | Methane conversion | E_factor |
|---|---|---|---|
| | Baseline | 19.8% | |
| | 0.015: SF | 27.3% | 37.5% |
| 20% more flow | Baseline | 17.2% | |
| | 0.015: SF | 24.2% | 40.3% |
| 20% less flow | Baseline | 23.3% | |
| | 0.015: SF | 31.1% | 33.4% |

At the 20% of baseline activity level for the SMR reaction rate, the methane conversions for all the cases considered are far away from the equilibrium value at 700 C (~44%). As shown in the Table, the deepest features were found to give the highest enhancement. A further increase in enhancement was surprisingly seen when the flowrate was increased over the baseline flowrate. The enhancement was less as the flowrate decreased. For the latter case, the lower velocity from the lower flowrate decreased the flow rotation for this fixed geometry and thus slightly reduced the enhancement factor. As the flowrate increases so does the overall velocity and thus the imparted transverse and perpendicular velocity created by the surface features. As the kinetics are slower than the baseline case, the effect of surface features becomes more important—in part becuase the baseline kinetics for this study were very fast.

The higher flowrate also corresponds to a higher Reynolds number. As the Reynolds number is increased the molecules spend a larger fraction of time within the active surface features and as such they have more time at or near the catalyst for the reaction to occur.

TABLE

Impact of the channel gap size on the reactor performance (gap size: 0.04"), 700 C., 25 atm, SMR reaction, 0.01" deep surface features

| 20% activity | | conversion | E_factor |
|---|---|---|---|
| Base flow rate | Baseline | 7.6% | |
| | 0.010: SF | 10.1% | 31.9% |
| 50% more flow | Baseline | 5.4% | |
| | 0.010: SF | 7.2% | 34.8% |
| 50% less flow | Baseline | 13.6% | |
| | 0.010: SF | 17.2% | 25.9% |

For the cases shown in this table, a much larger gap was modeled. A much larger gap was used and as expected a larger enhancement factor was seen. The comparable case for the 20% baseline activity and base flowrate for 0.01" deep surface features was an enhancement factor of 26.6% for a 0.0125" gap versus 31.9% for the 0.04" gap. The trend with a higher enhancement factor for a higher flow case is also seen for the large gap case.

Example

Heat Transfer Enhancement Using Surface Features

Surface features induce rotating or helical flowpaths which improve the heat transfer from the wall to the bulk of the fluid or vice versa. The improvement in heat transfer introduced by surface features was estimated using computational fluid dynamics. The tool used was Fluent V 6.1.22.

The CFD models were built for two micro-channels differing in the smallest dimension. One channel had a gap of 0.0125" while the other had a gap of 0.040". For each gap size, two models were built: 1) without surface features and 2) with surface features to estimate the heat transfer enhancement respectively.

The CFD models were built using Gambit V2.2.30. The details of the channel dimensions and surface features are shown in FIG. 1-3. The main channel dimension is 4.06 mm wide, 1.02 mm gap and 36.83 mm long. The length of the main channel between initial 3.81 mm and final 5.08 mm of the main channel length had surface features as shown in FIG. 6. The surface feature pattern is similar to the one proposed in the SHM but not in the dimensions or number of microchannel walls containing features nor the use of fill features as used in this example. The surface features are 0.38 mm open separated by 0.38 mm wall and are 0.25 mm deep and used on both sides of the microchannel.

The mesh for the computational fluid analysis was developed in Gambit. The total number of cells was 131106, total number of faces was 542409 and total number of nodes was 177006. The mesh was generated to keep it a regular mesh as much as possible.

Two fluids were considered for determining mixing efficiency of the surface features. The properties and operating conditions of the fluids is given below:
1) Gas
   a. Outlet pressure=345 psi
   b. Inlet temperature=300 K
   c. Viscosity=$1.28 \times 10^{-5}$ kg/m/s
   d. Thermal conductivity=0.087 W/m/K
   e. Specific heat=2768.03 J/kg/K
   f. Density=Using ideal gas law
   g. Molecular weight=17.49 g/mol
   h. Molecular diffusivity=$1 \times 10^{-5}$ m²/s
2) Liquid Water
   a. Outlet pressure=14.7 psi
   b. Operating temperature=300 K
   c. Viscosity=$1.0 \times 10^{-3}$ kg/m/s
   d. Thermal conductivity=0.6 W/m/K
   e. Specific heat=4182 J/kg/K
   f. Density=998.2 kg/m³
   g. Molecular weight=18.01 g/mol
   h. Molecular diffusivity=$1 \times 10^{-9}$ m²/s Case 1: 0.0125 Inch Channel Gap
Using liquid water as the fluid:
Boundary Conditions
   Operating pressure=14.7 psi
   Outlet pressure=0 psig
   Inlet velocity=1.54 m/s
   Inlet temperature=300 K
   Wall temperature=350 K The Reynolds number of the fluid in the channel was 1000. The Reynolds number was calculated as $$Re = \frac{\rho v D}{\mu}$$

where $\rho$=density of fluid, kg/m³
   v=Velocity of fluid, m/s
   D=Hydraulic diameter of channel, m
   $\mu$=Viscosity of fluid, kg/m/s The overall heat transfer coefficient was estimated as $$HTC_{overall} = \frac{Q_{wall}}{A_{flat}(LMTD)}$$

where
   $HTC_{overall}$=Overall heat transfer coefficient (W/m²/K)
   $Q_{wall}$=Heat transferred from wall (W)
   $A_{flat}$=Heat transfer area based on smooth (or no surface feature) geometry, m²
   LMTD=Log mean temperature difference Model Chosen K-Omega model (SST type) was chosen for CFD analysis. The values of model constants were default values provided by Fluent 6.0. Full multi-component diffusion species transport model was chosen. The diffusivity was 1E-5 m²/s.

Results

Figure 7:
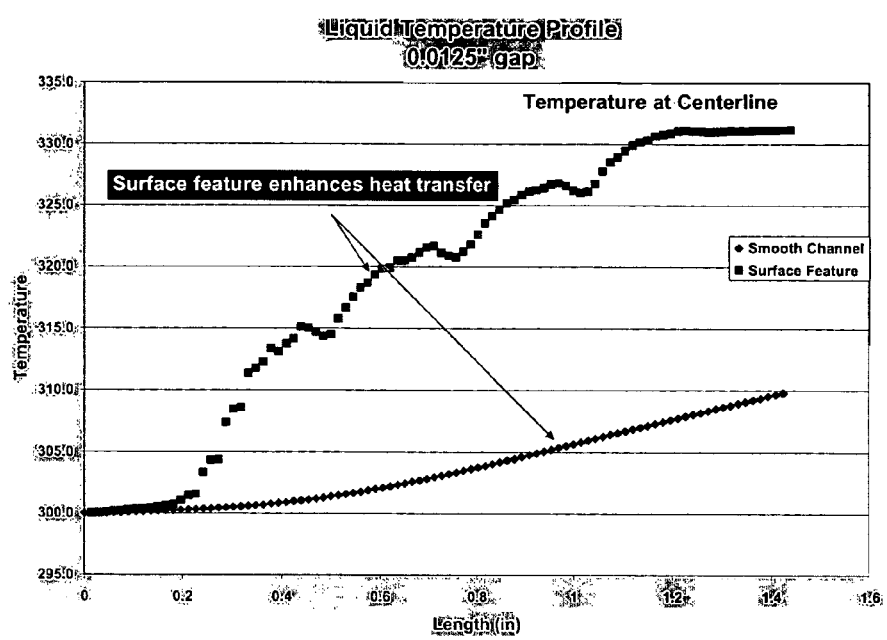
FIG. 7 illustrates the heat transfer enhancement resulting from the surface feature pattern of FIG. 6.

FIG. 7 shows the comparison of temperature profile between the flat channel (no surface feature) and channel with surface feature geometries. The temperature profile was plotted at the center of the channel along the flow direction. All temperatures are in degrees Kelvin. Heat transferred from the wall to the fluid faster for the geometry with surface features. The Table below compares calculated heat transfer coefficient for flat channel and surface feature geometry. The results showed an improvement of heat transfer coefficient of 143% and pressure drop increase of 63% for the geometry with surface features relative to the case without surface features. Note that the relative improvement in heat transfer is greater that relative increase in pressure drop. Further note that to achieve equal performance as for a flat channel of 1.4 inches in length, only a 0.3 inch long channel with surface features is required.

TABLE

Comparison of heat transfer coefficient and pressure drop between flat channel and surface feature geometry for 0.0125 inch gap

|  | Flat Channel | SFG-1 |
|---|---|---|
| Inlet Velocity (m/s) | 1.54 | 1.54 |
| Reynolds number | ~1000 | ~1000 |
| % increase in area |  | 39% |
| HTC (W/m2/K) | 12076 | 29339 |
| % HTC Improvement |  | 143% |
| Pressure Drop (psi) | 1.2 | 1.9 |
| % Pressure drop increase |  | 63% |

Case 2: 0.040 Inch Channel Gap
Using Gas as the fluid:
Boundary Conditions
    Operating pressure=345 psi
    Outlet pressure=0 psig
    Inlet velocity=0.47 m/s
    Inlet temperature=300 K
    Wall temperature=350 K
Using liquid water as the fluid:
Boundary Conditions
    Operating pressure=14.7 psi
    Outlet pressure=0 psig
    Inlet velocity=0.60 m/s
    Inlet temperature=300 K
    Wall temperature=350 K
The Reynolds number of the fluid in the channel was 1000.
Model Chosen
K-Omega model (SST type) was chosen for CFD analysis. The values of model constants were default values provided by Fluent 6.0.
Full multi-component diffusion species transport model was chosen. The diffusivity was 1E-5 m²/s.
Results For this larger gap, the geometry with surface features still shows a heat transfer enhancement over the flat geometry. Table 2 compares the heat transfer coefficient and pressure drop between the flat geometry and the geometry with surface features.

TABLE

Comparison of heat transfer coefficient and pressure drop for the flat channel and surface feature geometries for 0.040 inch gap

|  | Gas | | Liquid | |
|---|---|---|---|---|
|  | Flat Channel | Surface features | Flat Channel | Surface features |
| Inlet Velocity (m/s) | 0.47 | 0.47 | 0.60 | 0.60 |
| Reynolds number | ~1000 | ~1000 | ~1000 | ~1000 |
| % increase in area |  | 34% |  | 34% |
| HTC (W/m2/K) | 336 | 527 | 5174 | 12244 |
| % HTC Improvement |  | 44% |  | 136% |

TABLE-continued

Comparison of heat transfer coefficient and pressure drop for the flat channel and surface feature geometries for 0.040 inch gap

|  | Gas | | Liquid | |
|---|---|---|---|---|
|  | Flat Channel | Surface features | Flat Channel | Surface features |
| Pressure Drop (psi) | 0.0008 | 0.0011 | 0.07 | 0.09 |
| % Pressure drop increase |  | 40% |  | 36% |

In both cases, the increase in heat transfer coefficient is greater than the pressure drop increase per unit length. Further, it would be expected to decrease the microchannel length for the more efficient exchanger and thus further reducing the system pressure drop.

Example

Methane Combustion

Combustion of methane was modeled using a global one-step mechanism in which methane reacts with 2 oxygen molecules to form one molecule of $CO_2$ and 2 of water (equation 1). The rate of methane consumption was model and being first order in both methane and oxygen (equation 2). The activation energy estimated in a separate study and found to be 553,900 kJ/mol, the pre-exponential factor 1130 m⁴/kg-mol/s and the center temperature was 1098.2K.

$$CH_4 + 2O_2 \rightarrow CO_2 + 2H_2O \qquad \text{Equation 1}$$

$$r_{CH_4} = k_{CH_4} \exp\left(\frac{-E_a}{R}\left(\frac{1}{T} - \frac{1}{T_c}\right)\right) C_{CH_4} C_{O_2} \qquad \text{Equation 2}$$

The specific objective of this example is to use a small CFD model to simulate a microchannel geometry with an isothermal temperature wall boundary condition to quantify combustion performance improvement in a design with surface features compared to a comparable design with flat walls (or no surface features).
The input conditions are given in the following Table

TABLE

Boundary conditions for the Pt-Re fuel lean combustion emissions clean-up channel CFD simulations.

| Run | Units | Case 1 - 750° C. | Case 2 - 850° C. |
|---|---|---|---|
| inlet ppm CH4 | (ppmv) | 2500 | 2500 |
| Inlet gas temperature | (° C.) | 750 | 850 |
| Outlet Pressure | (psig) | 3.3 | 3.3 |
| CH4 inlet flow | (kg/sec) | 2.483E−07 | 2.483E−07 |
| O2 inlet flow | (kg/sec) | 5.181E−06 | 5.181E−06 |
| N2 inlet flow | (kg/sec) | 1.717E−04 | 1.717E−04 |

Figure 8:
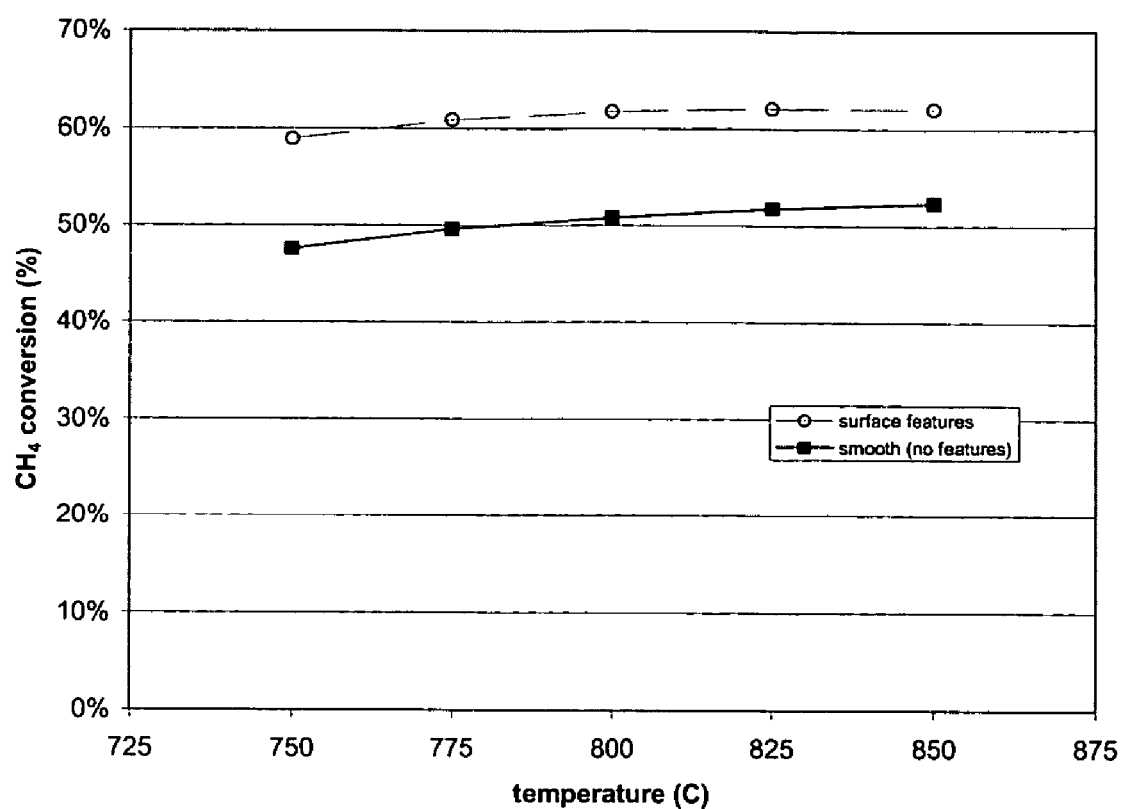
FIG. 8 shows the improvement in methane conversion of surface features versus no surface features.

The experimental performance data with and without surface features is shown in FIG. 8.
The model was run with boundary conditions listed in the table above. The pre-exponential constant for the combustion catalyst kinetics was modified until the model prediction for CH₄ conversion matched the experimental data at 750° C. both with and without surface features. The performance enhancement with surface features was quantified by taking ratios of the pre-exponential factor required in the model to match experimental performance with and without surface features. The surface feature enhancement factor was estimated at 750° C.

The methane conversion performance improvement factor with surface feature at 750° C. was 4.4×. That is to say, a catalyst disposed only on a flat wall would have to be 4.4 times as active at 750 to achieve the same performance as the catalyst disposed in the microchannel with surface features.

Assumptions and References

The geometry is a 0.058 inch gap channel, 0.16 inch wide, and 3.5 inch long

The surface feature pattern was SFG-1 on both top and bottom of the channel.

The lean combustion kinetics pre-exponential factor for the baseline case was 1129.3 and was represented as 1×. The experimental catalyst on the smooth or flat channel as measured in this experiment was much higher—a result from a modified formulation. The same catalyst formulation was used for both cases.

The pre-exponential factor was modified to match the $CH_4$ conversion for smooth channel at 750° C. The $CH_4$ conversion at 750° C. for the smooth channel was approximately 47% (see FIG. 1). After matching the performance of smooth channel, the pre-exponential factor was changed to match the performance with surface features. The following table summarizes the results.

TABLE

Summary of CFD Model Analysis at 750° C.

|  | Smooth Channel | Surface Feature Channel |
|---|---|---|
| Pre-exponential factor lean Kinetics | 191978 | 846960 |
| $CH_4$ conversion |  |  |
| Experimental | 47.6% | 58.9% |
| CFD | 47.9% | 59.5% |
| $O_2$ conversion |  |  |
| CFD | 8.8% | 11.2% |
| CFD Model Mass Balance | 0.0% | 0.0% |
| CFD Model Energy Balance | 0.0% | 0.0% |

The performance improvement factor (at 750° C.) with surface feature=4.4×, thus stated that a catalyst would need to be 4.4× more active to achieve equal conversion performance if disposed on a flat or featureless channel.

Example

Exhaust Clean Up

This example simulates cleanup of the combustion exhaust (final 2500 ppm) in a simplified simulated combustion exhaust stream (containing only $CH_4$, $O_2$, and balance $N_2$).

Design Summary

The geometry included a 0.058 inch gap channel, 0.16 inch wide, and 3.5 inch long in a pellet type device, with a plate on either side of the 0.058 inch gap, which plates either had surface features recessed or had a flat surface. The surface feature pattern selected was SFG-1 on the two major opposing walls of the main channel, in a trans configuration, with 0.010 inch deep features each having a 0.015" span and a 0.015" feature spacing.

Fabrication Details

To minimize background activity the parts in the device had a chromia scale (grown via heat treatment of inconel 617, where the channel was heated to 1000 C for 4 hours in a dilute mixture of oxygen and nitrogen).

Platinum dispersed on fumed alumina was washcoated onto the flat and surface feature containing coupons after heat treating them to grow a chromia scale. The washcoat catalyst was a 50% Pt, 3% CaO on fumed alumina, loaded to ~10 mg/in². The blank coupons were flat and prepared with a chromia scale, but no catalyst.

Experimental Setup

The air and "fuel" ($N_2$+$CH_4$) were preheated separately in coiled tubing, then the air was injected immediately upstream of the device pellet. Since $N_2$ was substituted for all CO, $H_2$, $CO_2$, and $H_2O$ in the simulated exhaust, the kinetic activity was expected to be different than if water were included in the feed. Flows were designed such that 2.05% $O_2$ would remain in the exhaust if all $CH_4$ were combusted. Temperature (750-950° C.) 2) N2 flow rate (7.383-3.184 SLPM)

Held constant: CH4 flow rate (0.0213 SLPM), O2 flow rate (1.035 SLPM), and apparatus Results There was a statistically significant difference measured in conversion of $CH_4$ between the flat and surface featured coupons (24% relative higher conversion at 750° C. and 7% relative higher conversion at 900° C.). CFD simulations confirmed that the initial data at 750-850° C. for the flat pellet were indeed largely mass transport limited and that an increase in catalyst activity of 4.4 times would be required to achieve the same relative increase in methane conversion as was obtained by the addition of surface features. Mixing of air and fuel immediately before entering the pellet greatly decreased the measured background activity even for temperatures as high as 950° C.

Example

Pressure Drop

An experimental study was conducted to determine the pressure drop in the channel with surface features and compare it to the pressure drop in the channel without surface features.

A device was made with SFG0 patterning on both major (opposing) walls of the main channel, in a cis-A orientation. Seven pressure locations were made between inlet and outlet to measure pressures at different locations in the channel. The channel dimensions were 0.16 inch by 0.020 inch by 6.985 inch length.

The surface features were in V shape with 45° angle between the arms of the surface features. The opening of surface features was 0.015 inch and were separated by 0.015 inch between features. The depth of each surface feature was 0.010 inch. The two arms of "V-shape" were connected by curve with radius of 0.008". The other ends of the feature legs (or arms) had a semi-circular shape.

Air was used as the fluid. The stand consisted of one mass flow controller flowing Air, 9 solenoid valves, and 2 differential pressure transducers (0-5 psid and 0-15 psid). The system was completely automated such that after the mass flow controller was calibrated for the various flow rates, and the tubes were attached, Labview would set the flow rate, open the solenoid valves associated with the 1$^{st}$ port, determine which dP transducer to use (either the 0-5 psid or the 0-15 psid), hold for steady state, record the value then move to the next port. The steady state was defined when there was less than 1% variation in the pressure.

The run plan was designed to test the effect of surface feature on pressure drop for different fluids and at different flow rates. The fluids chosen for testing were water and air. The flow rates were varied to obtain Reynolds numbers in both the laminar and transition regimes. Below is the run plan for the experimental testing.

Run 1
For device without surface features

| Experiment No | Fluid | Surface-feature | Flow rate | Flow rate units | Mass flow rate (kg/s) | Reynolds number |
|---|---|---|---|---|---|---|
| ARSTH1 | Air | No | 4.88 | SLPM | 1.048E−04 | 2519 |
| ARSTH2 | Air | No | 6.00 | SLPM | 1.289E−04 | 3097 |
| ARSTH3 | Air | No | 2.63 | SLPM | 5.641E−05 | 1358 |
| ARSTH4 | Air | No | 3.75 | SLPM | 8.059E−05 | 1936 |
| ARSTH5 | Air | No | 6.00 | SLPM | 1.289E−04 | 3097 |
| ARSTH6 | Air | No | 1.50 | SLPM | 3.224E−05 | 774.3 |
| ARSTH7 | Air | No | 3.75 | SLPM | 8.059E−05 | 1936 |
| ARSTH8 | Air | No | 1.50 | SLPM | 3.224E−05 | 774.3 |

Run 2A
For device with surface Cis A Orientation

| Run number | Fluid | Surface-feature | Flow rate | Flow rate units | Mass flow rate (kg/s) | Reynolds number |
|---|---|---|---|---|---|---|
| ARSFG0-45-CISA1-A | Air | Yes | 4.88 | SLPM | 1.048E−04 | 2519 |
| ARSFG0-45-CISA2-A | Air | Yes | 6.00 | SLPM | 1.289E−04 | 3097 |
| ARSFG0-45-CISA3-A | Air | Yes | 2.63 | SLPM | 5.641E−05 | 1358 |
| ARSFG0-45-CISA4-A | Air | Yes | 3.75 | SLPM | 8.059E−05 | 1936 |
| ARSFG0-45-CISA5-A | Air | Yes | 6.00 | SLPM | 1.289E−04 | 3097 |
| ARSFG0-45-CISA6-A | Air | Yes | 1.50 | SLPM | 3.224E−05 | 774.3 |
| ARSFG0-45-CISA7-A | Air | Yes | 3.75 | SLPM | 8.059E−05 | 1936 |
| ARSFG0-45-CISA8-A | Air | Yes | 1.50 | SLPM | 3.224E−05 | 774.3 |

Figure 9:
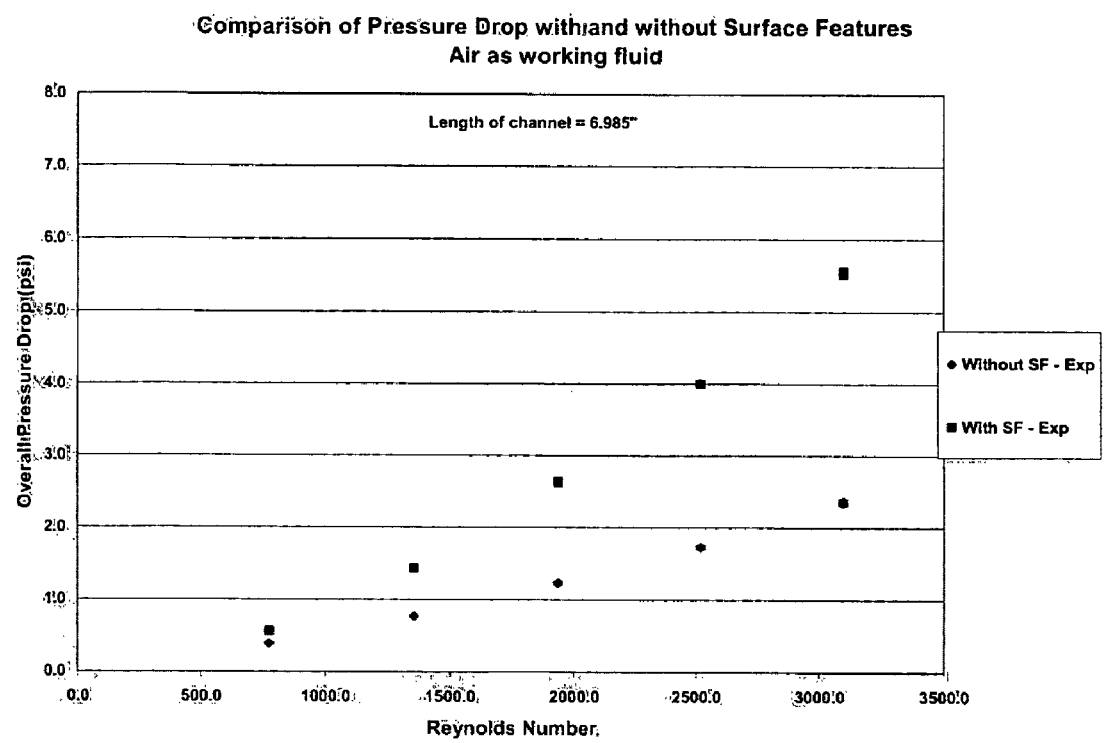
FIG. 9 illustrates pressure drop with and without surface features.
Figure 10:
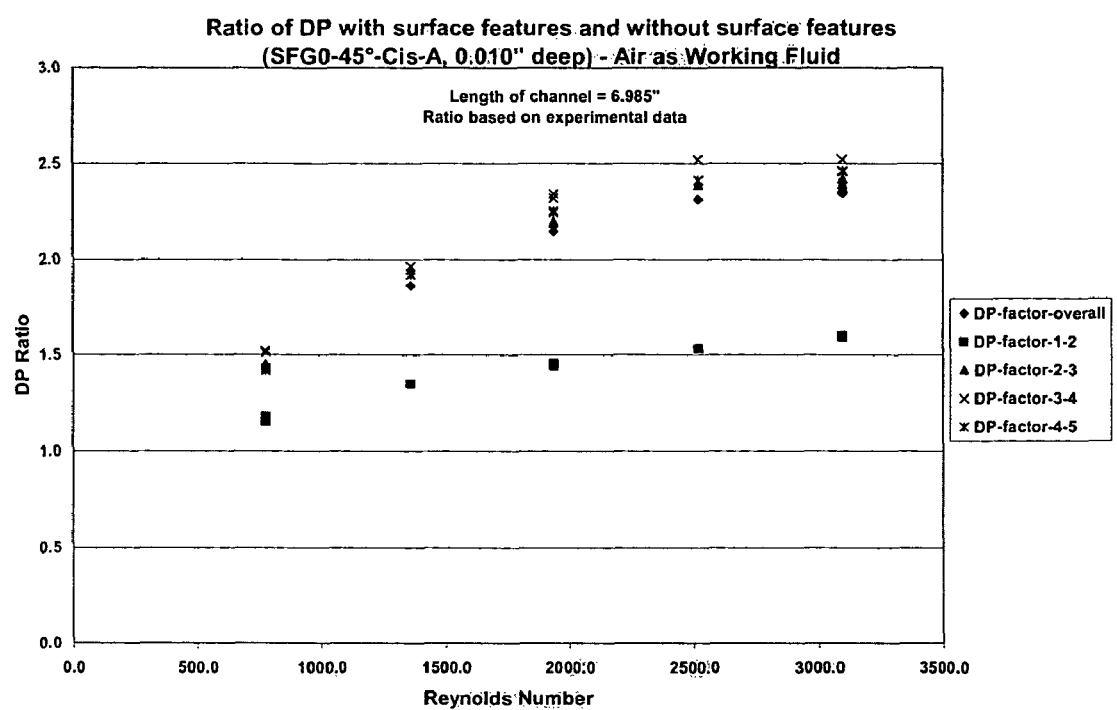
FIG. 10 illustrates the relationship of pressure drop and Reynold's number with and without surface features.

Results:

The overall length of the channel over which pressures were measured was 6.985". FIG. 9 shows the comparison of experimental pressure drop with and without surface features. As we can see from FIG. 9, the difference in the overall channel pressure drop between a channel with surface features and a channel without surface features increases with Reynolds Number. "DP Factor" is defined as: DP Factor=pressure drop in channel with surface features/pressure drop in smooth channel. FIG. 10 shows the variation of DP factor with Reynolds number. The overall DP factor as well as well as DP factors in different sections of the channel were calculated. "DP-factor-1-2" means the DP factor between pressure port 1 and 2 (1 being closest to the inlet). From the figure, we can see that near the inlet (between port 1 and 2) the DP factor variation with Reynolds number is relatively flat. The distance between port 1 and 2 is 0.985". After port 2, the DP factor increased sharply with Reynolds number in the laminar regime and flattened out in the transition flow regime. The variation of subsequent DP-factors with Reynolds number (between port 2 and 3, 3 and 4, 4 and 5) was similar to the overall DP factor variation with Reynolds number. It should be noted that the values of DP factor are a function of surface feature design.

These results show that the increase in pressure drop from the surface feature channels over the flat or smooth channels is a function of the Reynolds number. As the Reynolds number increases, the dP ratio increases from less than 1.5× to more than 2.3×. The pressure drop ratio for the surface feature versus flat channel asymptotes at roughly 2.3× as Reynolds number increases above the laminar region and into the transition and turbulent region. For different surface feature designs, main channel gaps, and fluid properties, the asymptotic value is expected to vary from system to system. These results indicate that the use of surface features may also be beneficial to the enhancement of transition or turbulent flow systems in microchannels, where the increase in pressure drop plateaus with higher Reynolds number, but the net increase in surface area from the surface features may offset the increase in pressure drop. As an example, for a heat exchanger operating in a turbulent flow regime within a microchannel for the preceding example, a surface feature geometry that provides more than 2.3× surface area would give an increase in the overall heat transfer (heat transfer coefficient multiplied by heat transfer area) over the net increase in pressure drop. The net result is a smaller heat exchanger volume for a given duty without an increase in overall pressure drop. The corresponding length of the surface feature microchannel operating in a turbulent regime is likely shorter than a flat microchannel operating in a turbulent regime for similar overall device heat duty.

Example

Modeling of Pressure Drop

In this example, flow through a microchannel having surface features was modeled using FLUENT. The configuration modeled was SFG0-45 degree angle, trans, and, 10.3 inches in length. The purpose of this modeling activity was to explore the pressure drop for this surface feature device under a variety of conditions. CFD results showed that pressure drop was highly sensitive to surface features, with the pressure drop increasing anywhere from 53% up to 162% over the flat channel, depending on conditions.

The particular surface feature geometry included:
    45° surface features
    Placed in a TRANS configuration (opposing orientation on top and bottom walls).
    The surface feature depth=0.010 in.; width=0.015 in.
    Surface feature length-wise pitch=0.042 in.
    gap=0.0125 in.
    total width=0.160 in.

Total length=10.3 in. (0.15 in. upstream and downstream does not include surface features).
Total number of features=239
A CFD mesh was generated for the above geometry, totaling 1.4 million cells—hexahedral in shape.

The CFD model described above was run at 12 different conditions:
- Four (4) runs were conducted at "SMR" conditions, namely: T=800 C, P=2533000 Pa, ρ=5.067 kg/cu.m, inlet velocity=12.13 m/s to 37.6 m/s.
- Four (4) runs were conducted at "water" conditions, namely: T=20 C, P=101325 Pa, ρ=998.2 kg/cu.m, inlet velocity=1.704 m/s to 5.284 m/s.
- Four (4) runs were conducted at "air" conditions, namely: T=20 C, P=101325 Pa, ρ=1.205 kg/cu.m, inlet velocity=25.72 m/s to 79.49 m/s In addition, these CFD runs were repeated at these conditions, but with a CFD model that was void of surface features for comparison purposes.

Basic key assumptions for these CFD analyses include:
1. The channel was constrained to not include reactions.
2. The flow was considered to be fully laminar.
3. The entire flow-field was adiabatic.
4. The flow was steady-state.

Calculations/Analysis

CFD results for these 12+12 runs are included below. The "Total dP" refers to the flow-fields pressure drop over the entire length. The "Developed dP" refers to the pressure drop occurring where the flow is considered periodic. The CFD results showed that the periodic region existed from 0.654 in. up to 10.066 in. Finally the pressure drop increase is also included.

Comparison of Pressure Drop, Surface Features vs. Flat-top, Laminar Flow

With Surface Features - Chevrons Developed Region (0.654 -> 10.066 in.)

| Run Number | ReD [—] | Species [—] | Total dP [psi] | In. Velocity [m/s] | Density [kg/m^3] | Developed dP [psi] | Developed Fric. Factor [—] | Increase in dP [%] |
|---|---|---|---|---|---|---|---|---|
| 1 | 1000.02 | SMR | 3.517 | 12.13 | 5.067 | 3.209 | 0.1462 | 53.2 |
| 2 | 1699.95 | SMR | 8.384 | 20.62 | 5.067 | 7.673 | 0.1210 | 100.8 |
| 3 | 2399.98 | SMR | 14.928 | 29.11 | 5.067 | 13.683 | 0.1082 | 135.8 |
| 4 | 3099.81 | SMR | 23.030 | 37.6 | 5.067 | 21.126 | 0.1002 | 162.1 |
| 5 | 1001.83 | Water | 13.662 | 1.704 | 998.2 | 12.465 | 0.1461 | 53.2 |
| 6 | 1703.22 | Water | 32.580 | 2.897 | 998.2 | 29.818 | 0.1209 | 100.9 |
| 7 | 2405.20 | Water | 58.043 | 4.091 | 998.2 | 53.199 | 0.1082 | 136.2 |
| 8 | 3106.60 | Water | 89.543 | 5.284 | 998.2 | 82.140 | 0.1001 | 162.3 |
| 9 | 997.50 | Air | 3.764 | 25.72 | 1.205 | 3.434 | 0.1463 | 52.9 |
| 10 | 1694.43 | Air | 8.961 | 43.69 | 1.205 | 8.201 | 0.1211 | 100.6 |
| 11 | 2389.81 | Air | 15.929 | 61.62 | 1.205 | 14.599 | 0.1084 | 135.3 |
| 12 | 3082.86 | Air | 24.509 | 79.49 | 1.205 | 22.482 | 0.1003 | 160.8 | w/o Surface Features - FlatTop

| Run Number | ReD [—] | Species [—] | Total dP [psi] | In. Velocity [m/s] | Density [kg/m^3] | Developed dP [psi] | Developed Fric. Factor [—] |
|---|---|---|---|---|---|---|---|
| 1 | 1000.02 | SMR | 2.329 | 12.13 | 5.067 | 2.095 | 0.0955 |
| 2 | 1699.95 | SMR | 4.283 | 20.62 | 5.067 | 3.822 | 0.0603 |
| 3 | 2399.98 | SMR | 6.538 | 29.11 | 5.067 | 5.804 | 0.0459 |
| 4 | 3099.81 | SMR | 9.110 | 37.6 | 5.067 | 8.060 | 0.0382 |
| 5 | 1001.83 | Water | 9.043 | 1.704 | 998.2 | 8.134 | 0.0953 |
| 6 | 1703.22 | Water | 16.631 | 2.897 | 998.2 | 14.842 | 0.0602 |
| 7 | 2405.20 | Water | 25.371 | 4.091 | 998.2 | 22.521 | 0.0458 |
| 8 | 3106.60 | Water | 35.390 | 5.284 | 998.2 | 31.311 | 0.0382 |
| 9 | 997.50 | Air | 2.497 | 25.72 | 1.205 | 2.246 | 0.0957 |
| 10 | 1694.43 | Air | 4.581 | 43.69 | 1.205 | 4.088 | 0.0604 |
| 11 | 2389.81 | Air | 6.988 | 61.62 | 1.205 | 6.204 | 0.0461 |
| 12 | 3082.86 | Air | 9.739 | 79.49 | 1.205 | 8.619 | 0.0385 |

From these results, it was noted as a surprising result that the increase in pressure drop at a given Reynolds number was fairly independent of the actual fluid properties. In other words, at roughly a Reynolds number of 1000, a roughly 52 to 54% increase in pressure drop over the flat channel was seen for a fluid mixture of the steam methane reforming reaction (23 atm, steam to methane at 3 to 1 ratio), and 800 C as compared to fluids of either air (gas) or water (liquid) at 20 C and 1 atm. Similarly at a Reynolds number near 3000, the pressure drop ratio increase was closer to 160%. These remarkable results suggest that the degree of additional mixing as denoted by the increase in pressure drop is dominated by only the Reynolds number. These results are further surprising in that they translate from the laminar flow regime to the transition flow regime (Re ~3000). It is believed that the surface feature geometry and dimensions relative to the main flow channel will vary the absolute value of increase in pressure drop from flat to surface feature channel, but that the increase over a flat wall for a given geometry will be independent of fluid at equal Reynolds number.

Example

Varying Depth and Width of Surface Features

For this study, the surface feature depth and width were varied. CFD models were developed in Fluent-6.0 to study the effect of the depth and width of the surface features. The effect of depth and width were measured qualitatively by looking at the pathlines. For quantitative measurement, a surface reaction was applied on the surface of the features and the composition of gas at the outlet was measured. It was found that the depth of surface features has more impact of flow mixing compared to the width of the surface features.

The description of CFD models for this study is given in the following Table.

TABLE

| Model description for Case 1 | |
|---|---|
| Kinetics pre-exponential factor(s) | 282.3 |
| Case number | 1, 2, 3 |
| Surface feature geometry type | SFG-0-60° |
| Flow direction | Cis-A |
| Surface feature width (mm) | 0.381 |
| Surface feature depth (mm) | 0.508 |
| Surface feature pitch or tangent to tangent spacing (mm) | 0.381 |
| Surface feature angle (degrees relative to width direction, or orthogonal to bulk flow) | 60° |
| Channel gap modeled (mm) | 0.597 |
| Full channel gap (mm) | 1.194 |
| Channel width modeled (mm) | 2.032 |
| Full channel width (mm) | 4.064 |
| Channel length upstream of features (cm) | 0.381 |
| Channel length with surface features (cm) | 5.588 |
| Channel length downstream of features (cm) | 0.381 |
| Total number of surface features per surface feature containing wall | 33 |
| Total number of walls containing surface features | 2 |
| Number of cells | 126,975 |
| Model symmetry | quarter |
| Wall boundary condition | 870° C. wall temperature |
| Inlet fluid temperature (° C.) | 870° C. |
| Inlet mass flow for modeled portion (kg/s) | 4.975E-5 kg/s |

TABLE-continued

| Model description for Case 1 | |
|---|---|
| Inlet velocity profile | uniform |
| Outlet pressure (bar) | 1.26 |
| Reaction enabled? | Yes |
| Fluid properties | |
| Density (kg/m3) | Ideal Gas |
| Heat capacity (J/kg-K) | Mixing Law |
| Thermal conductivity (W/m-K) | Mass-weighted-mixing-law |
| Viscosity (kg/m-sec) | Mass-weighted-mixing-law |
| Inlet Fluid Composition | |
| $O_2$ (mass %) | 0.03240 |
| $CO_2$ (mass %) | 0.31480 |
| $CH_4$ (mass %) | 0.00263 |
| $H_2O$ (mass %) | 0.09184 |
| $H_2$ (mass %) | 0.00000 |
| CO (mass %) | 0.00000 |
| $N_2$ (mass %) | 0.55833 |
| Balances | |
| Mass ([out-in]/in) | 0 |
| Energy ([out-in]/in) | 0 |

Case 2 was the same as case 1 except surface feature width was 0.508 mm. Case 3 was the same as case 1 except surface feature depth was 0.762 mm.

Assumptions for these CFD analyses include: the flow was considered to be fully laminar; the entire flow-field was adiabatic; and the flow was steady-state.

When the depth of the surface features is increased from 0.508 mm to 0.762 mm at a constant main channel gap of 0.597 mm, the frequency of flow moving to the edges and then to the center increases significantly compared to wider surface features.

One of the purposes of introducing surface features in the channel is to break the laminar boundary layer to enhance heat and mass transport properties. The efficacy of increasing width and depth was studied by applying a surface reaction of methane combustion on the surface feature walls and comparing the outlet concentration of methane and overall pressure drop in the channel. The table below lists the inlet/outlet methane concentration and pressure drop for Cases 1, 2 and 3 with surface reaction applied.

TABLE

| Methane concentration and pressure drop | | | |
|---|---|---|---|
| | Inlet methane concentration (PPM) | Outlet methane concentration (PPM) | Pressure drop (psi) |
| Case 1 | 4902 | 937 | 1.81 |
| Case 2 | 4899 | 1036 | 1.85 |
| Case 3 | 4902 | 679 | 2.13 |

As we can see from the Table, Case 3 (with the increased feature depth) provided the minimum methane concentration at the outlet. This is attributed to more movement of flow in the channel and better bringing the fluid in contact with the surface reactive wall. However the movement of the flow results in higher pressure drop in the channel. Also visually looking at pathlines, case 2 looked better than case 1 in flow movement and mixing inside the channel. But the methane outlet concentration comparison between Case 1 and Case 2 showed that the fluid is not brought to the reacting wall as much as in Case 1.

It should be noted that the catalyst kinetics used in this study were somewhat slower (by a factor of 4.5) than those used in previous combustion examples. As such, the resulting outlet prediction of methane ppm is much higher.

Example

Features on Opposing Sides

A comparison of mixing behavior between a channel with surface features on only one wall and a channel with surface features on two opposing walls in a "cis" orientation was evaluated with a main channel having dimensions of 0.0125 inch by 0.160 inch by 2.5 inch. The surface features were of type SFG-0, having a span of 0.015 inch wide and a depth of 0.01 inch and separated from each other by a spacing of 0.015 inch. The surface feature angle for the SFG-0 geometry was 45°. For the particular case considered here it was found that one-sided features with an "A" flow orientation provided the best mixing in a direction perpendicular to the flow. However, the effectiveness of a surface feature design depends upon channel geometry and flow rate.

Calculations/Analysis

The one sided geometry was run with two flow orientations: A and B, where in A flow feeds along the angled legs toward the apex, where in B flow hits the apex and then flows outward past the angled legs.

Comparison of the pressure drop in the channel for one-sided and two-sided surface features in cis A and Cis B orientations is shown in the table below.

TABLE

Pressure drop comparison

|  | Pressure drop (psi) | |
| --- | --- | --- |
|  | Cis A | Cis B |
| One-sided feature | 1.00 | 1.04 |
| Two-sided features | N/A | 1.13 |

The higher pressure drop in the two-sided features is because of features on both sides of the channel. For the "B" flow orientation, the one-sided feature geometry has the lowest pressure drop and provides better mixing than the two sided case. It should be noted that this comparison was done for a relatively small open flow gap of 0.381 mm and a surface feature depth to microchannel open gap ratio of 0.67. It has been shown elsewhere that when the open microchannel gap increases and or the surface feature depth to microchannel open gap ratio decreases below 0.3 then the use of dual sided surface features is particularly advantageous. It is particularly advantageous to move to larger microchannel open gaps to increase the productivity of a unit operation and reduce the total amount of metal contained within a unit operation. In some embodiments, the "A" flow orientation is less likely to form infinite recirculation zones (or dead zones) than the "B" flow orientation. For other patterns, a reverse trend is observed.

Example

Surface Feature Geometry

A number of surface feature geometries were investigated for mixing efficiency and induction of flow rotation, the conditions of which are shown in Tables X1-X2. For the geometry and conditions of case 1 in Table X1, some pathlines of flow appear to become trapped in dead zones at the apex or point of angle change of the surface features at the center of the channel width. In part, the potential dead zones at the apex are formed because the leg length of the two legs of the surface feature is the same and the angle of each leg is changed by 180 degrees thus creating a perfect symmetry point at the apex where the force for flow in the feature is identical down either leg. Patterns that do not create this symmetry point are less prone to the formation of dead zones.

TABLE X1

CFD model geometry and conditions for simulations of cases 1-3.

|  | Case number | | |
| --- | --- | --- | --- |
|  | 1 | 2 | 3 |
| Surface feature geometry type | SFG-0-45°-cis-B | SFG-6-45°-trans | SFG-6-45°-cis |
| Flow direction | Cis-B | N/A | N/A |
| Surface feature width (mm) | 0.381 | 0.381 | 0.381 |
| Surface feature depth (mm) | 0.254 | 0.254 | 0.254 |
| Surface feature pitch or tangent to tangent spacing (mm) | 0.381 | 0.381 | 0.381 |
| Surface feature angle (degrees relative to width direction, or orthogonal to bulk flow) | 45° | 45° | 45° |
| Channel gap modeled (mm) | 0.159 | 0.457 | 0.2285 |
| Full channel gap (mm) | 0.318 | 0.457 | 0.457 |
| Channel width modeled (mm) | 2.032 | 4.064 | 4.064 |
| Full channel width (mm) | 4.064 | 4.064 | 4.064 |
| Channel length upstream of features (cm) | 0.381 | 0.381 | 0.381 |
| Channel length with surface features (cm) | 5.588 | 5.588 | 5.588 |
| Channel length downstream of features (cm) | 0.381 | 0.381 | 0.381 |
| Total number of surface features per surface feature containing wall | 50 | 51 | 51 |
| Total number of walls containing surface features | 2 | 2 | 2 |
| Number of cells | 157,800 | 284,160 | 142,080 |
| Model symmetry | Quarter | Full geometry | Half |
| Wall boundary condition | No-slip | No-slip | No-slip |
| Inlet fluid temperature (° C.) | N/A | N/A | N/A |
| Inlet velocity (m/sec) | 12.13 | 12.13 | 12.13 |

TABLE X1-continued

CFD model geometry and conditions for simulations of cases 1-3.

|  | Case number | | |
| --- | --- | --- | --- |
|  | 1 | 2 | 3 |
| Inlet velocity profile | Uniform | Uniform | Uniform |
| Outlet pressure (bar) | 25.3 | 25.3 | 25.3 |
| Reaction enabled? | No | No | No |
| Fluid properties |  |  |  |
| Density (kg/m3) | 5.067 | 5.067 | 5.067 |
| Viscosity (kg/m-sec) | 3.62e−5 | 3.62e−5 | 3.62e−5 |
| Balances |  |  |  |
| Mass ([out-in]/in) | 2.0e−7 | 6.5e−15 | 2.7e−8 |
| Energy ([out-in]/in) | N/A | N/A | N/A |

TABLE X2

CFD model geometry and conditions for simulations of cases 4-5.

|  | Case number | |
| --- | --- | --- |
|  | 4 | 5 |
| Surface feature geometry type | SFG-5.1-45°-cis-A | SFG-5.1-45°-cis-B |
| Flow direction | Cis-A | Cis-B |
| Surface feature width (mm) | 0.381 | 0.381 |
| Surface feature depth (mm) | 0.254 | 0.254 |
| Surface feature pitch or tangent to tangent spacing (mm) | 0.381 | 0.381 |
| Surface feature angle (degrees relative to width direction, or orthogonal to bulk flow) | 45° | 45° |
| Channel gap modeled (mm) | 0.2285 | 0.457 |
| Full channel gap (mm) | 0.457 | 0.457 |
| Channel width modeled (mm) | 4.064 | 4.064 |
| Full channel width (mm) | 4.064 | 4.064 |
| Channel length upstream of features (cm) | 0.381 | 0.381 |
| Channel length with surface features (cm) | 5.588 | 5.588 |
| Channel length downstream of features (cm) | 0.381 | 0.381 |
| Total number of surface features per surface feature containing wall | 51 | 51 |
| Total number of walls containing surface features | 2 | 2 |
| Number of cells | 118,650 | 284,160 |
| Model symmetry | Half | Full geometry |
| Wall boundary condition | No-slip | No-slip |
| Inlet fluid temperature (° C.) | N/A | N/A |
| Inlet velocity (m/sec) | 12.13 | 12.13 |
| Inlet velocity profile | Uniform | Uniform |
| Outlet pressure (bar) | 25.3 | 25.3 |
| Reaction enabled? | No | No |
| Fluid properties |  |  |
| Density (kg/m3) | 5.067 | 5.067 |
| Viscosity (kg/m-sec) | 3.62e−5 | 3.62e−5 |
| Balances |  |  |
| Mass ([out − in]/in) | 1.4e−15 | 4.7e−16 |
| Energy ([out − in]/in) | N/A | N/A |

The CFD results were analyzed and helped to identify the surface feature characteristics that are discussed below. For the geometry and conditions of case 1 in Table X1, the pathlines of flow become trapped in dead zones in the surface features in the center of the channel width (where the two upstream ends of the surface feature groove leg segments, or angles, meet). The CFD simulation results for case 2 in Table X1 suggest that the trans configuration for this surface feature geometry type creates poorly mixed regions of substantially straight/slightly twisting flow near the center of the main channel gap in those lateral positions across the main channel width which roughly align with the midpoints of each leg segment (or angle) of the surface feature grooves, with the flow near the surface feature containing walls of the main channel swirling around these three central cores of flow. In contrast, the CFD results for the cis configuration of this surface feature geometry (case 3 in Table X1) suggest that the cis configuration mixes much more efficiently across the entire cross section of the main channel flow, having no cores of flow which are not periodically swept into the surface features. Flow lines for case 3 show the same tendency as for other cis configuration cases to pull the bulk of the flow in the main channel toward those those lateral positions across the main channel width which align with the upstream end of each leg segment (or angle) of the surface feature grooves.

The CFD simulation results for cases 4 and 5 in Table X2 suggest that this surface feature geometry is flow direction dependent, with cis-B flow direction developing a well mixed flow somewhat more quickly, and the cis-A flow being bifurcated in the main channel, although both cases show good mixing. As with the cis cases in Table X1, results from both case 4 and case 5 (Table X2) show the bulk of the flow in the main channel is pulled toward those those lateral positions across the main channel width which align with the upstream end of each leg segment (or angle) of the surface feature grooves, and there are no cores of flow which are not periodically swept into the surface features as they travel down the length of the main channel.

Summary of Effect of Feature Geometry

Two aspects of surface feature geometry which are important for providing good mixing within the main channel bulk flow are:
1) The surface features must effectively induce a fraction of the bulk flow in the channel to turn into the leading edge of each surface feature, and
2) maintaining a sufficient feature run length between local upstream and downstream extremities or "ends" of each surface feature for a sufficient number of repeated surface features, repeated along the flow length. The sufficient run length is preferably at least twice the channel gap, and more preferably a minimum of 4 times the channel gap.

One variable important to inducing flow within the surface features is the surface feature depth ratio, $R_{depth}$:

$$R_{depth} = \frac{depth_{SF}}{gap}$$

where $depth_{SF}$ is the depth of the surface feature and gap is the gap in the main channel. In order to induce sufficient flow to enter the surface features, the surface feature depth to channel gap ratio, $R_{depth}$, is preferably in the range 0.010 to 100, more preferably in the range 0.10 to 10, and more preferably in the range 0.25 to 2.

The lateral spread between local upstream and downstream extremities in all surface features along a stretch of channel containing the same surface feature geometry which repeats along the flow length is defined by the lateral spread ratio, $R_{lateral\ spread}$. The lateral spread ratio is defined as:

$$R_{lateral\ spread} = \frac{extremity\_length_{SF} \cdot \cos(\alpha)}{span_{SF}}$$

where $extremity\_length_{SF}$ is the length of a surface feature leg from the local upstream extremity to the local downstream extremity, $\alpha$ is the surface feature angle, and $span_{SF}$ is the span of the surface feature. Note that in the extreme of $\alpha=90°$ (which is a surface feature aligned with the main channel mean bulk flow direction) the lateral spread ratio is zero. In order to be effective at penetrating the bulk flow, the lateral spread ratio should be preferably in the range 3 to 100, and more preferably in the range 5 to 20. Note that having an appropriate lateral spread ratio is a necessary but not sufficient condition to cause significant penetration of the bulk flow by surface feature induced flow effects.

The number and spacing of surface features when continuously repeated in the flow direction are also important. The spacing from feature to feature is preferably less than the extremity_length$_{SF}$ and more preferably within a ratio of 0.1 to 10 of spacing length to the surface feature span, and even more preferably as close as reasonably possible, which may be dictated by fabrication limitations. The minimum number of surface features which should be repeated to establish good mixing depends on the geometry and conditions, but a simplified rule of thumb is to design the channel with an appropriate surface feature entrance length. In other words, we can define a feature entrance length number ($L_{feature\ entrance}$) as:

$$L_{feature\ entrance} = \frac{depth_{SF} \cdot N_{SF} \cdot N_{featured\ walls}}{gap}$$

where $depth_{SF}$ is the depth of the surface feature, gap is the gap in the main channel, $N_{SF}$ is the minimum number of continuously repeated substantially similar surface features per wall, and $N_{featured\ walls}$ is the number of walls containing surface features. In order to establish a good mixing pattern, the feature entrance length number is preferably 5-80, and more preferably 10-40, and still more preferably 10-20. Of course, beyond the feature entrance length, more features than the minimum number may be continuously repeated, but the feature entrance length gives an estimate of the minimum number needed to establish flow patterns which bring fresh bulk flow from the main channel into the active surface features assuming other aspects of the design (such as main channel gap) do not preclude this.

Example

Thermal Reactions

Surface features are anticipated to be advantageous for homogenous reaction, including both catalyzed and uncatalyzed reactions. An example of an uncatalyzed homogeneous reaction is the thermal cracking of ethane to ethylene.

The use of surface features induces mixing or flow rotation in a microchannel and thereby breaks the laminar streamlines. In a traditional laminar flow microchannel a substantial gradient in temperature exists from the channel centerline to the wall. For endothermic reactions, the centerline temperature is much cooler and thus the overall rate of reaction is reduced. For exothermic reactions, the centerline temperature is much higher and thus the formation of unwanted side reactions may be exacerbated. The flow rotation within the channel reduces the temperature gradients within the channel. In addition, a much higher heat transfer coefficient along with more surface area to transfer heat at the wall of the microchannel is created with wall surface features. Heat can thus be more quickly added to the process microchannel for endothermic reactions or more quickly removed from the process channel for exothermic reactions, potentially preventing unwanted side reactions. The anticipated increase in surface heat flux may be more than 2× that of a corresponding flat channel that is based on a cross section that is tangent to the top of the surface features. The overall reactor volume for a homogenous reaction that includes surface features may then be up to a factor of ten smaller than the corresponding volume of a reactor that does not include surface features.

Example

Impact of Capillary Features on the Uptake and Repartition of the Catalyst

Two coupons (152 mm long×12.7 mm wide), one with capillary features (3CFC=0.76 mm or 3 mil deep capillary features). The capillary features are horizontal slots (angle of 0 degrees and 0.076 mm deep by 0.076 mm wide. The leg length is 4 mm and the other without (flat coupon, FC) were coated by dipping in a Rh acetate solution of 15% (w) Rh in DI water. The capillary features in this example were not formed as through features in thin plates, but as features machined into a thicker plate. Features so formed can be equally effective, and may have cross sections other than rectangular open channels. The surface feature cross section may also be rounded at the corners, triangular, fully rounded, etc. In this example (11), the cross section of the surface or capillary features has rounded corners. Then the coupons were dried vertically at 120° C., similar to processing within a device, and calcined horizontally at 400° C. After calcination the uptake was 2.3 mg($Rh_2O_3$)/$in^2$ for FC and 5.1 mg($Rh_2O_3$)/$in^2$ for the 3CFC capillary feature containing coupons.

Surface Inspection of the Two Coupons by SEM:

On the 3CFC coupon, the Rh distribution was uniform on a macro scale from top to bottom and from left to right across the coupon face; however on the flat coupon, the distribution of metal is not uniform in either the axial or lateral direction.

Coating Quality:

Cracks are observed in the coating, made with a 15% (wt) Rh solution. By using a lower concentration coating solution, cracking can be minimized. An optical photo was obtained of a coupon with capillary features that was coated two times with an 8% Rh solution. The Rh loading in the coating was 8 mg ($Rh_2O_3$)/$in^2$. No cracking was observed.

Model Validation of Capillary Feature from Experimental Results

The liquid retention per coat during washcoating with an aqueous precious metal salt solution was predicted using a washcoat retention model for the three capillary feature geometries. Each of these geometries was also tested experimentally for catalyst uptake. A contact angle of ~45 degrees was assumed in the model (the approximate value measured for the 8 wt. % rhodium solution on a typical surface-stabilized coupon prior to washcoating). It should be noted that the contact angle does vary somewhat over the heat treated surface and also appears to be somewhat different in the valleys of the capillary features.

Figure 11:
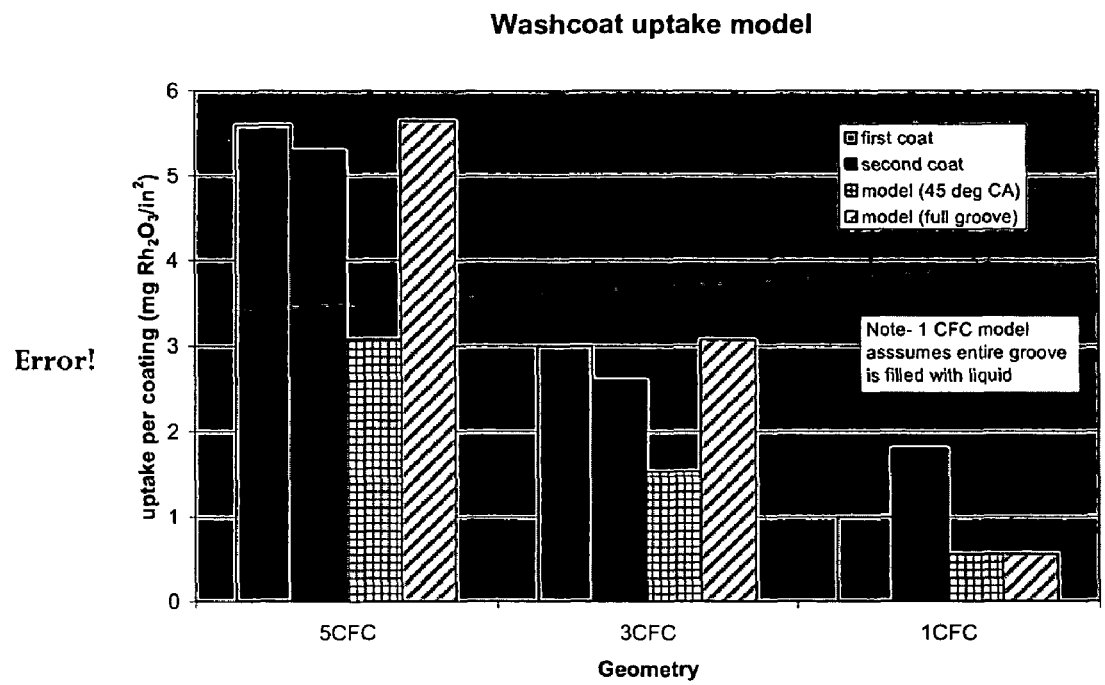
FIG. 11 is a comparison of measured and predicted uptake per coating for the expected liquid surface with a 45 degree contact angle and for capillary features which completely fill with washcoat liquid (full groove).

Since the predicted uptake per coating was consistently low compared to the measured values, the predicted uptake was also calculated assuming that the capillary features completely fill with liquid. Both predictions are compared to measured values in FIG. 11. Note that in FIG. 11, both predictions for the 1CFC geometry assume that the groove is completely filled, since the actual geometry does not match the assumptions made in the washcoat retention model. Surprisingly, the model predictions made assuming that the capillary features completely fill with liquid better match the experimentally measured values. These results are suggestive of a higher contact angle created on the surface generated in the valleys of the capillary features. It should be noted that alumina cracks and surface roughness may also affect the catalyst uptake.

Figure 12:
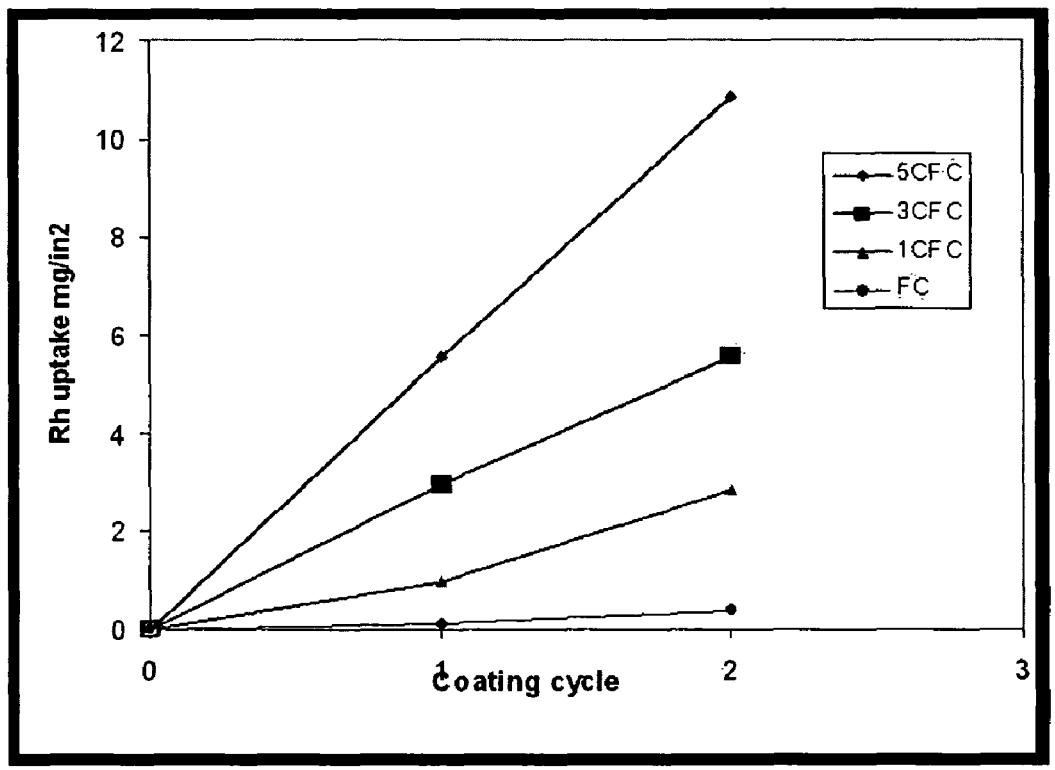
FIG. 12 illustrates a comparison of catalyst uptake on flat coupon (FC) versus those with 5 mil (127 micron), 3 mil (76 micron) or 1 mil (25 micron) deep capillary features.

FIG. 12 shows that Rh uptake depends considerably on the capillary feature design. With respect to the Rh uptake, the coupons can be classified in the following order for efficacy: 5CFC>3CFC>1CFC>FC, where FC means flat channel (no capillary features) and CFC means capillary feature channel or surface feature channel. The number before the CFC moniker refers to the depth of feature in mils or 0.001 inch, that is a 5 CFC is a 5 mil or 0.005 inch or 125 micron deep horizontally aligned surface feature recessed into the main flow channel of the microchannel.

Example

One Sided Surface for the Enhancement of Apparent Catalyst Activity for Methane Steam Reforming The impact of one sided surface features in a microchannel on the apparent activity of Rh/MgO catalyst was investigated in a device with a 0.006 inch flow-by gap by testing a coupon without surface features (flat) and a coupon with surface features at the same level of catalyst loading per unit area. The surface features were formed from chevrons whose arms were placed at a 45° angle to the center line of the channel in its long axis (SFG-0). The features themselves were each 10 mil deep and had a width or span of 15 mil. The tip of the chevron had a 10 mil radius round and the legs were terminated with full rounds. The presence of surface features increased the area available for catalyst retention by a factor of 1.63×. The comparison was conducted at 4.1 ms using a steam to methane ratio of 3:1 over temperatures ranging from 675° C. to 850° C. Coupons were loaded to 9.5 mg/$in^2$ (mg active metal) in the case of the featureless coupon and 10.5 mg/$in^2$ (mg active metal) in the case of the surface feature containing coupon. A computational fluid dynamics simulation was conducted using FLUENT and the inclusion of the features was found to increase the apparent kinetic actively by a factor of at least 2.1. Thus the mass transfer enhancement provided by the one sided surface features (on one side of the channel only) increased the apparent activity by approximately 31% over what would be expected based on the increased surface area alone.

Experimental—Coupons

Coupons for catalyst coating were prepared both with and without surface features. Overall the coupons were 1.4 inch in length, the surface features, on those that contained them, were deployed over a total length of 1.323 inch. The coupons were 0.215 inch in width but the corresponding test device was designed such that reactive gasses could only flow across 0.080 inch of the surface on either side of the center line of the channel's long axis. The coupons were 0.095 inch thick and made of Inconel 617.

The coupons contained 2 thermal wells to allow the metal temperature to be measured during operation. The surface features were formed from chevrons whose arms were placed at a 45° angle to the center line of the channel in its long axis (SFG0). The features themselves were each 10 mil deep and had width or opening of 15 mil. The tip of the chevron was a 10 mil round and the arms were terminated with full rounds. Flat coupons possessed an area of 0.301 $in^2$ for application of catalyst and the coupon with surface features possessed an available surface area for catalyst application of 0.435 $in^2$. These areas were used to calculate the catalyst loading per square inch (9.5 mg/$in^2$ of Rh on 4 mg/$in^2$ MgO for the flat and 10.7 mg/$in^2$ of Rh on 4.2 mg/$in^2$ MgO for the surface feature coupon). The area of each coupon exposed to the reacting gas mixture was 0.212 $in^2$ for the featureless coupon and 0.346 $in^2$ for the surface feature coupon. Prior to catalyst application the coupons were given a coating of nickel aluminide estimated to be between 10 and 20 micron thick and then subsequently heat treated to produce thin adherent scale of alumina.

Experimental—Catalyst

Catalyst was applied to the surface feature coupon by dropping 12 wt %/o Mg($NO_3$)$_2$ solution onto the coupon with a pipet. The coated coupon was dried at 100° C. for 1 hour. The washcoating process was repeated once. Then the coupon was calcined at 1000° C. for 4 hours in air. The MgO loading was 4.2 mg/$in^2$. Next, 10 wt % hexa(acetate)-μ-oxotris(aqua) trirhodium(III)acetate solution was dropped onto the coupon.

The coupon was dried at 100° C. and then calcined at 450° C. for 1 hour. The coating process was repeated to get 10.7 mg/in² Rh loading.

The flat coupon (having no surface features) was heated to 1050° C. in flowing $H_2$ at 3.5° C./min heating rate. After purging with Ar for 1 hour at 1050° C., the gas was changed to 21% $O_2$/Ar. The coupon was heat-treated in following $O_2$/Ar for 10 hours and then cooled to room temperature. An $\alpha$-$Al_2O_3$ scale was generated on the surface after the heat treatment.

Catalyst was applied to the flat coupon dropping a 12 wt % $Mg(NO_3)_2$ solution onto the coupon with a pipet. The coated coupon was dried at 100° C. for 1 hour. The washcoating process was repeated once. Then the coupon was calcined at 1000° C. for 4 hours in air. The MgO loading was 3.7 mg/in². Next, 10 wt % hexa(acetate)-$\mu$-oxotris(aqua)trirhodium(III) acetate solution was dropped onto the coupon. The coupon was dried at 100° C. and then calcined at 450° C. for 1 hour. The coating process was repeated to get 9.4 mg/in² Rh loading.

After preparation the flat coupon carried 9.5 mg/in² of Rh on 4 mg/in² MgO and the surface feature coupon carried 10.7 mg/in² of Rh on 4.2 mg/in² MgO. The blank coupon was also given a thin layer of alumina in a similar manner to the catalyst containing coupons but carried no catalyst.

Experimental—Conditions

One catalyst coated coupon was installed in the microchannel test device, meaning that surface features and catalyst were only present on one wall of the main channel for each test. Once the completed devices were installed in the testing infrastructure the catalysts were reduced by exposing them to a flow of 50 sccm of hydrogen and 450 sccm of nitrogen at ambient pressure and 450° C. for 2 hr. Testing was conducted at 675, 750, 800 and 850° C. The flow of methane was 150 sccm and the flow of steam 450 sccm (steam to carbon ratio was 3:1).

Results—Experimental and Simulation

The results of the experimentation conducted on both a flat and surface featured coupon can be found in Table 1 along with the results of a reactive simulation conducted in the computational fluid dynamics package Fluent™. The flat coupon was tested for approximately 53 hrs time-on-stream with nine samples taken at temperatures ranging from 673° C. to 852° C. The surface feature coupon was tested for approximately 52 hrs time-on-stream with samples taken at temperatures ranging from 671° C. to 865° C.

A test of the background activity of the system was conducted using a set of featureless (flat) coupons. The reduction step was not conducted. At conditions below 800° C. (670, 700, 718), no conversion of methane was noted. At 800° C. the conversion of methane was found to be ~4% and at 900° C. the conversion of methane was found to be ~22%.

Fluent™ simulations were conducted by constructing a calculational domain representing both a channel with out surface features this is to say a fluid domain that is 0.160" wide by 0.006" tall by 1.70" long and a similar domain at that includes surface features as described above deployed over 1.32" of the total 1.7". The reactive portion of the domain is 1.4" long, 0.15" being allowed on both inlet and outlet for to allow the flow to develop. In the reactive portion of the model SMR activity a was applied as a surface based rate and water gas shift was allowed to proceed as a volumetric rate such that it was at local equilibrium with the gas composition. In the case of SMR activity only surfaces corresponding to those on the coupons were set as catalytically active. The modeling employed the gas inlet temperatures, flow rates and outlet pressures measured in the experiments. Isothermal boundary conditions equal to the coupon temperatures were also applied.

The first kinetic level was determined using an activation energy of 169 kJ/mol and a predetermined rate form in which the rate of reforming is proportional to the partial pressure of methane raised to the 1.6 power and adjusting the pre-exponential value (rate constant) until a reasonable match was obtained between the experimental results for the featureless coupon and the prediction of the CFD model. This was set as kinetic level 1. The same procedure was applied to the data collected using the surface feature coupon and a second kinetic level established. The second level was found to be 2.1 times that of the first level.

TABLE 1

Experimental Results and Model Predictions for both Flat and Featured Coupons

| Temperature (° C.) | Featureless Coupon Kinetic Level = 1x (baseline as predicted based on flat or featureless channel or coupon) | | Feature Coupon Kinetic Level = 2x over baseline | |
|---|---|---|---|---|
| | Experiment (%) | Prediction (%) | Experiment (%) | Prediction (%) |
| 675 | 9.9 | 11.7 | 20.5 | 18.7 |
| 750 | 35.1 | 35.6 | 48.8 | 45.1 |
| 800 | 58.0 | 55.9 | 70.8 | 62.6 |
| 850 | 71.8 | 70.9 | 81.6 | 75.4 |

These results show that the use of surface features further enables a reduction in external mass transport resistance found with chemical reactions. A catalyst would have to be at least 2 times as active if disposed on a flat wall than if disposed on a surface feature channel. This result is due in part to the increase in surface area (roughly 60%) and in part to a reduction in external mass transport resistance resulting from the elimination of laminar parabolic fluid profile and the induction of convection to bring reactants from the bulk flow path to the catalyst coated wall.

Example 14

2 Sided Surface Features for the Enhancement of Fuel Lean Combustion of Methane and Carbon Monoxide A platinum rhenium catalyst was applied as a slurry to two types coupons, one with surface features and one without surface features, and these were tested to determine enhancement produced by the addition of surface features in the fuel lean combustion (excess oxygen) of CO and methane. Results indicated greater conversion of both CO and methane over the surface feature coupon. Increased pressure drop observed over the surface feature coupons (1.5 to 1.8×) indicated that the surface features were affecting the flow field. Although both coupons experienced deactivation the surface feature coupon obtained steady conversion with time-on-steam duration of the test. Conversion of methane appeared to be limited by reaction rate for both the flat and surface feature coupons however conversions of CO appeared limited by mass transfer. In the case of CO combustion inclusion of surface features reduced the initial outlet CO by a factor of 15× (compared to a increase in surface area available for catalysis of 2.2×).

Average enhancement for CO combustion after the burn in period was 4.1×. This boost in activity is above that expected based on the surface area effect and can be attributed to mixing of the streamlines by the surface features (and there by maximizing the concentration of reacting species close to the catalytic surface) as well as by increasing the effective residence time of any fluid volume by causing it to turn and take a longer path through the reactor (longer than that which would occur in strictly laminar flow).

The surface feature coupon had approximately 2.2 times the surface area of the flat coupon and as the catalyst was applied such as to provide similar loading rates (mass per unit area) it would be expected that an effect in this order would be seen however the reduction of CO over the surface feature coupon reflect on average an increase in reaction rate 4.1× greater than the flat or featureless coupon. Thus, for CO combustion, the surface features provide enhancement over a flat coupon much in excess of that expected by the increased mass of catalyst. This enhancement is largely due to the mixing of the flow induced by the features. This mixing maintains high reactive species concentrations close the catalyst covered surface. In addition to this mixing effect fluid elements tend to be moved in longer pathways through the reactor than they would otherwise experience in laminar flow. This has the effect of increasing the average residence time for any given fluid element.

Example 15

"See-Through" Surface Features for the Enhancement of Mixing and Heat Transfer

A "See-Through" surface feature is one, of any shape that passes continuously through a wall such that a connection is made to an adjacent channel (i.e., the surface channel connects a bulk flow channel to an adjacent space or channel). Multiple see-through features may be aligned on top of each other to increase the depth of a surface feature. Even in the absence of a solid surface at the bottom of the feature they will still act to turn the flow in the main channel as fluid shears against fluid in the adjacent channel. "See-Through" features are especially useful in situations in which single sided mixing of a relatively large gap is required.

In a second application the features can be used to stir an incompressible flow that is required to maintain solids in suspension. A benefit of the "See Through" features is that, especially when the channels are deployed vertically, suspended particles cannot accumulate at the 'bottom' of the features but the particles find that, when they become disengaged that they fall back into streamlines that re-suspend them. In another application solid particles are suspended in a compressible flow and are maintained in suspension via "See Through" features and in yet another application liquid droplets are suspended in a compressible flow and maintained in suspension. Similar effects can be obtained with two immiscible (or partially immiscible fluids).

In a third application catalyst can be retained in a surface feature and the effectiveness of the coating increased by allowing diffusion of reactants and products into the coating from both sides (as opposed to coatings in a pocket type surface feature in which diffusion is from one side only.

In a fourth application two immiscible fluids are flowing on either side of the see-through feature containing wall, for example air saturated with water and water saturated with air, are flowing co-currently on either side of the feature. Particles suspended in the air stream are brought into the features by the mixing of the air stream by the features and are brought in contact with the water. The particles then become suspended in the water and are scrubbed from the gas phase. Alternatively, a gas and liquid (or liquid and liquid) may not be saturated and the contacting at the interface leads to the production of saturated streams. Such see-though features might also be useful for liquid-liquid contacting, such as might be done in liquid-liquid extraction.

Example 17

The effect of varying surface feature geometry and orientation was evaluated via CFD simulation of methane combustion in a large gap (0.047") main channel when operated with a high velocity (>80 m/s) for the reduction of emissions or the conversion of a dilute mixture oxygen and methane in nitrogen to very low levels of methane at the outlet.

An analysis was performed that compared methane combustion results over a 64 mm long exhaust reactor section, having surface features over 55 mm of that length, with 5700 ppm methane inlet at constant wall temperature of 870° C. for: a straight channel (no surface features), SFG-0-Cis-A-60° (surface features on two opposing walls aligned as a mirror image through a center plane and oriented at 60° relative to entrance plane (90° is parallel to the direction of net flow)), SFG-0-Cis-B-75° and SFG-5.1-Cis-B-60'. The SFG-5.1 geometry was the SFG-5 geometry which continually repeated the "check" surface feature in the same orientation. For each of these geometries, a 0.38 mm feature span and feature spacing, and a 0.51 mm feature depth was used. Each surface feature spanned the entire main channel width of 4.1 mm on each of the opposing walls. The SFG-0-Cis-A-60° had the lowest outlet methane ppm (262 ppm), followed by the SFG-5 Cis-B-60' (529 ppm), SFG-0-Cis-B-75' (545 ppm) and the straight channel (2844 ppm).

TABLE

Tabulated results for the 5700 ppm inlet methane combustion cases

| Geometry | Conversion | Dry gas Methane ppm | Pressure drop [psid] |
|---|---|---|---|
| Straight channel 0.047" tall | 50.5% | 2844 | 0.76 |
| CSF-0-Cis-B-75° 0.047" tall, 0.015" wide, 0.020" deep | 90.5% | 545 | 1.33 |
| CSF-0-Cis-A-60° 0.047" tall, 0.015" wide, 0.020" deep | 95.4% | 262 | 1.80 |
| CSFG-5.1-Cis-B-60° 0.047" tall, 0.015" wide, 0.020" deep | 90.8% | 529 | 1.60 |

The concentration of methane drops fairly linearly in the first few tenths of an inch of the reactor and then begins to decrease less significantly from 0.3 to 0.4 inches along the reactor length. In this region, the flowfield created by surface features is not yet at steady state and mixing is initiating within the reactor. After about 0.4 inches or so along the main channel length, the bulk flow begins to mix or rotate well within the reactor and the methane emissions drop again at a fairly steep rate. The flow is not laminar but moving and rotating in all directions thus new mass is brought into the centerline by advection not diffusion and thus the variation in centerline concentration. After about 2 inches the centerline concentration begins to get more uniform as the total conversion of methane reaches a high level. After 2.3 inches (where the surface features end) the centerline concentration is very low thus showing a very good conversion efficiency of the surface feature channel for this highly mass transfer limited problem.

The entrance length of 0.3 inch corresponds to roughly 10 surface features into the bulk flow path. The entrance length of roughly 10 features is less than the entrance length of a flat microchannel that exceeds 10 hydraulic diameter lengths into the microchannel. For this case with a gap of 1.19 mm, the hydraulic diameter exceeds 1.2 mm and thus more than 1.2 cm of total reactor length is required to achieve the fully developed laminar flow field. By contrast, the surface feature channel approaches the fully developed flow in 0.8 cm, in part because the size of the surface features (0.015 inch gap and span between surface features) is less than the microchannel gap of 0.047 inch. A shorter entrance length effect is anticipated with surface features that induce good mixing as opposed to a flat or smooth channel.

At elevated flow rates (>50 m/s) the SFG-0-Cis-A-45° features showed flow recirculation in the surface features. The angle of inclination of the SFG-0-Cis-A chevrons was increased from 45 degrees to 60° and 75°. The results showed two important things: The angle strongly affects mixing for higher velocity flow rates, and as the angle of the surface feature increases from 60 degress to 75 degrees, the cis-B orientation becomes slightly favored over the cis-A orientation. The best reaction performance for this case was observed with the cis-A orienation at 60 degrees angle. The best reaction performance case also had the highest pressure drop, attributed to the increased flow movement from the main channel to the active surface features.

Example 18

Residence Time Distribution Comparison

Residence time distribution (RTD) is an important performance indicator when designing a chemical reactor. The flows in microchannel reactors are, under most operating conditions, laminar. In a featureless microchannel reactor the fluid near the reactor walls is hard to push out of the reactor. This can potentially cause poor product selectivity and a hot spot for the exothermic reactions. In order to improve upon the RTD of a laminar flow reactor, surface features incorporated into channel walls can split the overall flow entering the reactor into many sub-flow streams without any external energy input. Surface features of opposite orientation on the opposite walls tend to hold the fluid longer.

In all cases, the use of surface features makes the flow profile closer to plug flow and thus gives a much narrower residence time distribution. The features selected in this study are SFG-0 at a 45 degree angle. In this example, the cis-A orientation gives the most flow rotation and the flow profile that is steepest and thus closest to true plug flow.

In a second comparison, a transient RTD evaluation was done to compare the RTD in a flat microchannel (1.02 mm by 4.1 mm, having no surface features) versus the same main channel with 0.25 mm deep recessed oblique grooves (pattern SFG-1). The hydrodynamics of the channel with surface feature was closer to plug flow. Laminar flow in a tube will show a classical Taylor-Aris dispersion in RTD resulting from the fast flow in the centerline (1.5× the average) and slow flow near the no-slip boundary. The rectangular microchannel has two axis points (lateral and transverse) with no slip boundary conditions. The resulting parabolic flow profile gives gradients in velocity in both the x and y direction. The resulting 2-D gradients give rise to the multiple slopes in the straight channel RTD.

Example 19

Vorticity in Microchannels with Surface Features

Vorticity

Vorticity ($\omega$) is the local vector component or rotation of flow, the vector product of the del vector ($\nabla$) and the velocity vector U.

$$-\omega = \nabla \times u$$

The magnitude of this vector is proportional to the strength of the rotation of the fluid, and thus is a means to quantify the degree of mixing. It turns out that the vorticity vectors move in ways which mirror the motion of the fluid itself. If the fluid is stretched, the vorticity increases along the axis of stretching; if the fluid is tilted, the vorticity vectors tilt with it; viscosity acts on vorticity exactly as it does on velocity. The vorticity for fully developed laminar flow is theoretically zero and thus the corresponding flat channel microchannel will have zero vorticity once the flow is fully developed.

The following conditions were used for the steam methane reforming CFD simulations in microchannel with surface features for which the vorticity comparisons were made.

0.0125" (0.32 mm) main channel gap
2.5" (63.5 mm) long
0.160" (4.1 mm) wide main channel
Surface features of 0.015" (0.38 mm) span, 0.010" (0.25 mm) depth, and 0.015" (0.38 mm) separation
10 m/s inlet flow rate
350 psig (25.1 bar) outlet
3 parts steam to 1 part methane
Reynolds number ~1450, and well within the laminar regime.

The evaluated geometries were (all geometries had angles of 45 degrees, except the SFG-4 geometry, which had an angle of 22.5 degrees):
SFG-0F-Cis-A (SFG-0 with Fanelli)
SFG-0-Cis-A
SFG-0-Cis-B
SFG-0F-Trans
SFG-4-Trans Using the FLUENT CFD computer code a calculation of the volume averaged overall vorticity magnitude of the full channel volume was completed, including the open channel and surface features volume. The table below shows the vorticity results and qualitative mixing results for the streams. The higher the degree of vorticity in the channel qualitatively correlates with improved mixing. The degree of mixing for a given surface feature could correlate better with the main channel vorticity or the surface feature volume vorticity. Vorticity is a function of local velocity so density and velocity can change its overall value.

A cross-section of SFG-0-Cis-A's fluid vorticity magnitude across a cross-section 1.875" down the channel showed a high degree of vorticity in the corners of the main channel. The interaction between these three surfaces in the corners and the channel flow help generate mixing in the surface features and the surface of the main channel.

TABLE

Geometry and volume-average vorticity magnitude and qualitative mixing results.

| Surface Feature geometry | Volume-averaged vorticity magnitude ($s^{-1}$) | Qualitative Mixing results |
|---|---|---|
| SFG-0F-Cis-A | 77841 | Two vortices see the cross-width centerline mix three times through the surface feature before exiting - Good mixing |
| SFG-0-Cis-A | 75830 | Two vortices see the cross-width centerline path lines mix three times through the surface feature before exiting - Good mixing |
| SFG-0-Cis-B | 74525 | Two vortices in which the cross-width centerline path lines run into the surface features centers and recirculate without leaving the surface feature |
| SFG-0F-Trans | 72468 | Two vortices with the cross-width centerline path lines sees some mixing, but the centers of each vortice don't mix much |
| SFG-4-Trans | 71628 | The whole channel's flow rotates but the center of the flow doesn't enter the surface features |

The magnitude of the vorticity vector ranged from 100 (hz) to more than 628,000 hz. The average volume averaged vorticity for this case exceeds 70,000 hz This surprisingly high vorticity reflects the excellent degree of mixing created by surface features. It should be noted that vorticity alone is insufficient to ascribe performance for a unit operation with an active surface feature. The pattern SFG4 (trans) has a relatively high vorticity, although not as high as SFG0, but it does not provide excellent performance. The centerline flow molecules do not enter the active surface feature region at least 1 time.

A comparison case was done for a flat channel operating in a turbulent regime. The flat or smooth channel was taken as the same geometry 0.0125" (0.32 mm) main channel gap
2.5" (63.5 mm) long
0.160" (4.1 mm) wide main channel
Surface features of 0.015" (0.38 mm) span, 0.010" (0.25 mm) depth, and 0.015" (0.38 mm) separation
30 m/s inlet flow rate (or 3× the flowrate of the previous case)
350 psig (25.1 bar) outlet
3 parts steam to 1 part methane
Reynolds number ~4360, and well within the laminar regime.

The peak vorticity in the surface feature channel at a lower Reynolds number was surprisingly higher than that found in a flat channel at a much higher Reynolds number (4360). For 3 times the flowrate, the peak vorticity near the wall was 551000 hz as compared to 628000 hz for the surface feature channel with a Reynolds number of 1450. Furthermore, the increase in vorticity penetrates the bulk flow path more in the surface feature channel than in the flat microchannel operated with 3× the flowrate or 3× the Reynolds number. The flat channel localized the maximum vorticity near the wall rather than creating more flow rotation and movement in the bulk flow channel.

The pressure drop for the flat channel operated at a Reynolds number of 4360 was 0.47 psig as calculated by Fluent under the conditions described above, and a corresponding flat channel operating at a Reynolds number of 1450 was 0.2 psig. The pressure drop through the microchannel with surface features has been modeled and measured as 2× the flat channel for a Reynolds number near 1500 and gives roughly 0.4 psig pressure drop. The net result is more mixing at the lower Reynolds number and with a lower net pressure drop by the use of active surface features than by taking the same channel into the turbulent flow regime.

Example

Heat Transfer

A test device was fabricated to demonstrate heat transfer enhancement using channels with surface features. The body of the device contained a slot such that two coupons were inserted in the slot and the gap between the inserted coupons formed a microchannel for the fluid to flow in. The device body was made of a 12.7 mm diameter rod and the openings for the coupons, part of slot made in the device body, was 5.59 mm×2.54 mm and was located 0.64 mm off the center of the cross section of the rod. When the coupons were inserted in the openings, a microchannel with a nominal 1.27 mm gap was formed. The width of the microchannel was 4.06 mm. The overall length of the body was 88.39 mm. Wells for thermocouples were placed 25.4 mm from of each end of the device main body. The thermocouple wells were 3.81 mm deep and had a diameter of 0.89 mm. Overall both the smooth wall and surface feature coupons were 88.39 mm in length. For the surface features coupons, the total length of surface features was 86.36 mm. The coupons were 5.46 mm in width. The coupons were 2.41 mm thick and made of Inconel 617.

Figure 13:
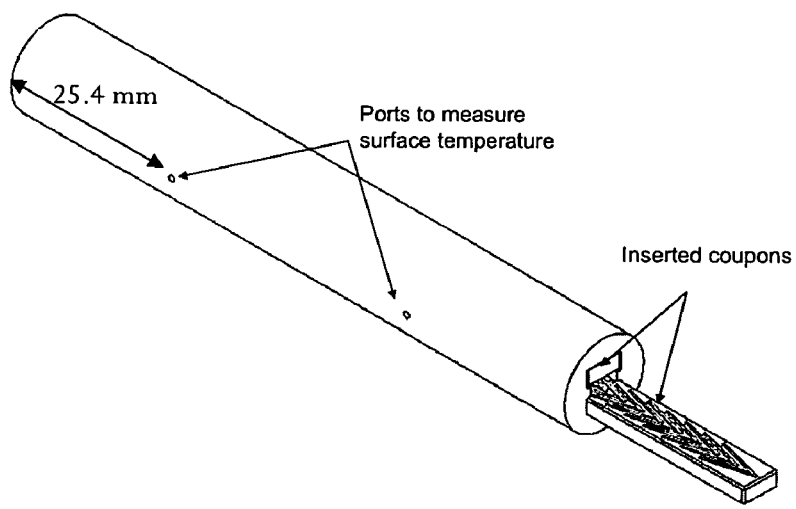
FIG. 13 illustrates an assembly of a testing device body and inserted coupon

The reactor with coupons with surface features is shown in FIG. 13. The surface features were in the form of "V" shape whose arms were placed at a 75° angle (where a 90 degree angle is essentially parallel with the main direction of flow and a 0 degree angle is essentially horizontal to the main flow path. The features themselves were each 0.51 mm deep and had width or opening of 0.38 mm. The tip of the surface feature was a 0.20 mm' round and the arms were terminated with full rounds. Each surface feature was separated from the next by 0.38 mm.

Nitrogen was heated to desired temperature in the heater and then entered the device. The device was kept in a constant temperature bath. The nitrogen gas exited from the other end of the device to ambient. All the connections in the flow circuit were using stainless steel swagelok fittings and tubes. During experiments, the constant temperature water bath was continuously circulated to maintain uniform temperature. Two thermocouples were also located on the pioneer pellet surface, each 3.25" from the end of the pellet. A thermocouple was located ~6.3 mm off the surface of the pellet to measure the water temperature. The gas was preheated coming into the device. The device was kept submerged under water at all times to maintain temperature. Watlow Watlube, a thermal conductive slurry, was used between the coupon and main body.

Experiments were run for various flow rates and inlet temperature. The nomenclature used for different thermocouples and pressure transducers is listed below:

TC1: Average gas inlet temperature, 3.2 mm before the entrance to device, ° C.
TC2: Average temperature of thermocouple in the thermocouple hole (near inlet of the device), ° C.
TC3: Average temperature of thermocouple in the thermocouple hole (near outlet of the device), ° C.
TC4: Average gas inlet temperature, 3.2 mm after the exit to device, ° C.
TC5: Average water bath temperature, ° C.
PT1: Average inlet pressure, kPa
PT2: Average outlet pressure, kPa Two orientations were defined for surface feature channel testing. Orientation 1 was defined as when the flow moves in the direction pointed by the surface feature apex. Orientation 2 was defined as when the flow moves opposite to the direction pointed by the surface feature apex. The experimental results for surface features geometry in both orientation and smooth channel geometry are listed below:

with surface feature and channel without surface features. It also gives the predictions for smooth channel.

TABLE

Heat transfer coefficient and pressure drop estimation from experimental data, prediction of heat transfer coefficient and pressure drop for smooth channel

| Device Type | Experimental | | | | |
|---|---|---|---|---|---|
| | Reynolds number | Total Q (W) | LMTD (° C.) | HTC (W/m^2/K) | DP (kPa) |
| Orientation 1 - SF in the direction of flow | 1628 | 12.5 | 49.6 | 267.4 | 1.2 |
| | 3100 | 30.6 | 78.5 | 413.2 | 5.0 |
| | 4714 | 61.9 | 117.9 | 557.0 | 10.7 |
| | 6094 | 83.6 | 138.9 | 638.4 | 18.7 |
| | 7465 | 104.0 | 154.5 | 713.9 | 28.5 |
| Orientation 2 - SF in the direction away from the flow | 1096 | 6.5 | 29.5 | 232.6 | 0.5 |
| | 1618 | 13.1 | 55.5 | 249.9 | 1.1 |
| | 3063 | 32.4 | 86.6 | 397.2 | 4.8 |
| | 4683 | 61.4 | 122.8 | 530.7 | 12.4 |
| | 6034 | 83.2 | 144.9 | 609.1 | 22.0 |
| | 8377 | 117.8 | 172.8 | 723.2 | 41.4 |
| Smooth channel - No surface features | 1061 | 4.5 | 63.5 | 75.0 | 0.3 |
| | 1553 | 8.3 | 91.8 | 95.5 | 0.7 |
| | 2945 | 22.1 | 121.2 | 193.2 | 2.8 |
| | 4506 | 45.1 | 157.2 | 304.0 | 7.2 |

TABLE

Experimental results for surface feature geometry (both orientations) and smooth channel geometry

| Device Type | Flow rate (SLPM) | Wall T - 1 (TC2) | Wall T - 2 (TC3) | Inlet T (TC1) | Outlet T (TC4) | Bath T (TC5) | Inlet pressure (PT1) | Outlet pressure |
|---|---|---|---|---|---|---|---|---|
| Orientation 1 - SF in the direction of flow | 4.64 | 67.7 | 65.1 | 196.9 | 72.8 | 61.7 | 103.1 | 101.8 |
| | 9.28 | 74.0 | 68.7 | 239.6 | 88.4 | 62.6 | 107.8 | 102.7 |
| | 15.00 | 82.1 | 73.5 | 298.1 | 109.8 | 62.0 | 115.4 | 104.7 |
| | 20.00 | 88.9 | 80.2 | 319.7 | 129.6 | 64.7 | 126.2 | 107.5 |
| | 25.00 | 95.2 | 85.6 | 333.1 | 144.4 | 65.5 | 139.4 | 110.9 |
| Orientation 2 - SF in the direction away from the flow | 3.02 | 65.6 | 63.9 | 165.1 | 66.6 | 63.0 | 102.2 | 101.7 |
| | 4.64 | 64.5 | 61.7 | 203.3 | 73.6 | 59.7 | 103.0 | 101.9 |
| | 9.28 | 73.1 | 67.6 | 251.7 | 91.5 | 61.6 | 107.5 | 102.7 |
| | 15.00 | 81.4 | 74.1 | 301.4 | 114.7 | 62.5 | 117.2 | 104.8 |
| | 20.00 | 89.9 | 83.1 | 326.0 | 137.0 | 66.6 | 129.4 | 107.5 |
| | 28.80 | 99.4 | 91.7 | 350.2 | 165.3 | 68.8 | 156.1 | 114.2 |
| Smooth channel - No surface features | 3.02 | 64.1 | 63.0 | 166.0 | 97.6 | 62.3 | 101.9 | 101.7 |
| | 4.64 | 65.7 | 63.5 | 200.5 | 118.6 | 61.7 | 102.5 | 101.8 |
| | 9.28 | 71.6 | 68.9 | 247.7 | 138.9 | 64.1 | 105.5 | 102.8 |
| | 15.00 | 78.7 | 74.1 | 300.0 | 163.5 | 64.8 | 112.0 | 104.9 |
| | 20.00 | 83.8 | 78.9 | 322.6 | 183.8 | 66.5 | 120.3 | 107.7 |
| | 20.00 | 74.7 | 71.3 | 204.0 | 130.7 | 64.3 | 118.5 | 107.5 |
| | 25.00 | 87.7 | 82.9 | 337.7 | 200.9 | 68.3 | 130.4 | 111.3 |
| | 28.80 | 88.6 | 84.1 | 347.7 | 212.0 | 66.1 | 138.9 | 114.7 |

The experimental data (temperature and pressures) and the channel geometry were used to determine the heat transfer coefficient in the channel. All the calculations were based on smooth channel surface area. The smooth channel heat transfer surface area was approximately 6.43 cm$^2$ while the heat transfer surface area for surface feature channel was 19.41 cm$^2$. The increase in heat transfer surface area due to surface features was 2.06 times over the smooth channel heat transfer surface area. Heat transfer coefficient and pressure drop was also predicted for smooth channel based on correlations available in the literature.

The table below gives estimation of heat transfer coefficient and pressure drop from experimental data for channel TABLE-continued Heat transfer coefficient and pressure drop estimation from experimental data, prediction of heat transfer coefficient and pressure drop for smooth channel

| Device Type | Experimental | | | | |
|---|---|---|---|---|---|
| | Reynolds number | Total Q (W) | LMTD (° C.) | HTC (W/m^2/K) | DP (kPa) |
| | 5835 | 61.3 | 177.8 | 365.9 | 12.6 |
| | 6605 | 31.9 | 98.6 | 343.7 | 11.0 |

TABLE-continued

Heat transfer coefficient and pressure drop estimation from experimental data, prediction of heat transfer coefficient and pressure drop for smooth channel

| Device Type | Experimental | | | | |
|---|---|---|---|---|---|
| | Reynolds number | Total Q (W) | LMTD (° C.) | HTC (W/m$^2$/K) | DP (kPa) |
| | 7141 | 75.8 | 193.0 | 416.6 | 19.0 |
| | 8117 | 86.8 | 206.4 | 446.1 | 3.51 |

Where Q = Total heat transfer estimated, W
LMTD = Log Mean Temperature Difference, ° C.
HTC = Estimated heat transfer coefficient, W/m$^2$/K
DP = Experimental pressure drop, kPa The table below shows the heat transfer coefficient enhancement and pressure drop increase in surface feature channel over smooth wall channel.

TABLE

Heat transfer coefficient enhancement and pressure drop increase in surface feature channel over smooth wall channel

Figure 14:
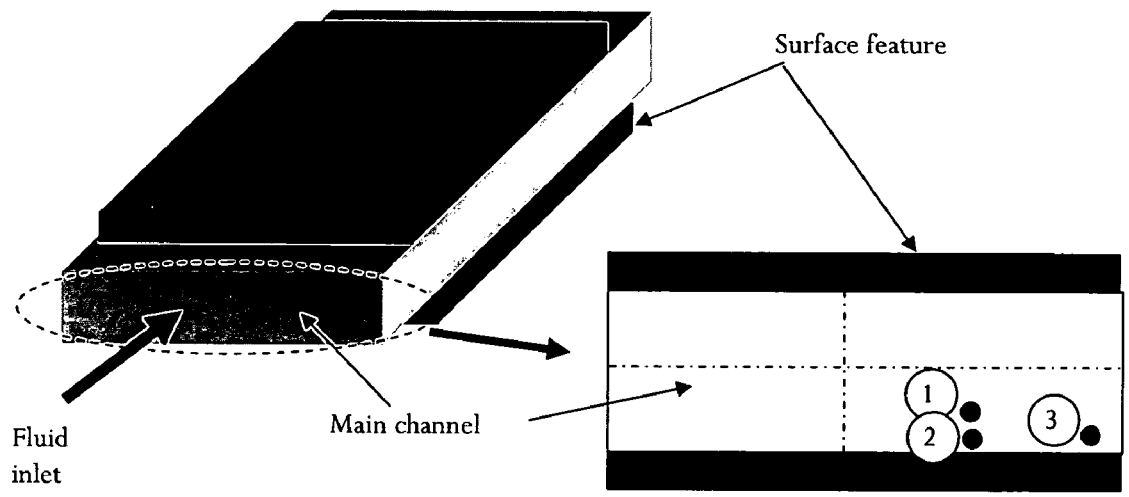
FIG. 14 accompanies an example showing the variation of ratio of heat transfer coefficient increase to pressure drop increase as a function of Reynolds number

| | Reynolds number | HTC Enhancement | DP Increase |
|---|---|---|---|
| Orientation 1 - SF in the direction of flow | 1591 | 2.80 | 1.80 |
| | 3023 | 2.14 | 1.83 |
| | 4610 | 1.83 | 1.49 |
| | 5965 | 1.74 | 1.48 |
| | 7303 | 1.71 | 1.50 |
| Orientation 2 - SF in the direction away from the flow | 1079 | 3.10 | 1.75 |
| | 1586 | 2.62 | 1.60 |
| | 3004 | 2.06 | 1.75 |
| | 4595 | 1.75 | 1.73 |
| | 5935 | 1.66 | 1.74 |
| | 8247 | 1.62 | 11.79 |

Where HTC = Estimated heat transfer coefficient, W/m$^2$/K
DP = Experimental pressure drop, kPa FIG. 14 shows the variation of ratio of heat transfer enhancement to pressure drop increase as a function of Reynolds number. The ratio greater than 1 implies more heat transfer enhancement than pressure drop increase.

Example

The Effects of Reynolds Number on the Effectiveness of Using Surface Features for Mixing of Large Channel Gaps A 0.119 cm (0.047") tall gap channel had SFG-0-Cis-A design with 60° angle chevron surface features was examined using the computational fluid dynamics code Fluent Version 6.2.16. The dimensions of the channel are as follows: Gap of 0.119 cm, width of 0.406 cm (0.160") and length of 6.35 cm (2.5"). The chevrons were 0.051 cm (0.020") deep into the wall and 0.038 cm (0.015") in width, with normal-to-normal chevron separation of 0.038 cm (0.015"). The pattern is cis-A, with the same features on both sides of the channel's gap. The chevrons were centered in the middle of the channel width, with the chevrons extending from the center to the wall 0.203 cm (0.080") on either side at 60° angle between the centerline of the channel width to wall in the direction opposite the direction of flow. In other words the point at the symmetry line of the chevron aligns in the direction of flow. There were 33 total surface features in series, with an upstream development length of 0.406 cm (0.160") prior to the start of the features and a downstream length of 0.584 cm (0.230") from the end of the last chevron's point. The model used the symmetry planes that this geometry afforded: The horizontal width symmetry plane that halves the channel at the center of the channel gap created by the cis alignment, and a vertical gap symmetry plane that halves the channel at the center of the channel's width, created by the centered chevrons. These symmetry lines allow for a quarter symmetric model of the channel.

The conditions of the Fluent Version 6.2.16 models are listed in this paragraph. A total of 127,000 nodes were used in this quarter-symmetry model. The outlet static pressure of the channel was 125.42 kPa (18.19 psia). The design point flow rate was 4.975E-05 kg/s, with the following inlet stream mass fractions: Oxygen at 0.03240, carbon dioxide at 0.31482, methane at 0.00263, steam at 0.09184, and the balance nitrogen, and the species are assumed well mixed at the inlet. The flow rates for the three cases we looked at were 100%, 50% and 10% of the design point flow. The inlet stream and all wall temperatures are held fixed at 870° C. (1598° F.). The system used the laminar viscous flow model, ideal gas law for density and heat capacity, mass-weighted average mixing laws for thermal conductivity and viscosity, and kinetic theory binary diffusivities coupled with full multi-component diffusion equations. The reactor used a surface rate reaction for methane combustion, but the rates aren't germane to the analysis as the fluid mixing as the total methane flow rate for combustion is small and shouldn't greatly change the temperature or composition of the stream for flow path lines, as the inlet and outlet mass-weighted dynamic viscosities are 4.44E-05 kg/m/s and 4.43E-05 kg/m/s, respectively.

The model results are tabulated in Table ZZ, and it shows the inlet flow parameters for the channel and the results for mixing when the percent of the full flow ranging from 100% to 50% to 10%. The Gap based Peclet number is based upon the inlet velocity, the channel gap instead of the main channel (gap and height are the only dimensions used) hydraulic diameter, and the methane diffusivity at the inlet composition and temperature with pressure set at 141.2 kPa. The Reynolds number calculations are based upon four times the model input mass flow rate, the main channel hydraulic diameter and the inlet dynamic viscosity of 4.44E-05 kg/m/s. The percentage of path lines making at least one pass through a surface feature calculation was based upon CFD particle path line analysis with weightless particles released from line made by the inlet plane and the vertical gap symmetry plane (6 path lines) or the horizontal width symmetry plane (23 path lines).

TABLE ZZ

The tabulated model results for the CSF-0-Cis-A 60° surface features with decreasing mass flow rate. For the 10% and 50% flow cases, full mixing was not observed over the 33 feature placed in series.

| | 100% | 50% | 10% |
|---|---|---|---|
| Percent of full flow | | | |
| Inlet bulk velocity [m/s] | 94 | 50.4 | 10.34 |
| Diffusivity of Methane at 870° C., 141.2 kPa [cm$^2$/s] | 2.22 | 2.22 | 2.22 |
| Gap-based Peclet number [—] | 505 | 271 | 56 |
| Inlet Reynolds number [—] | 1705 | 852 | 170 |
| % of path lines making at least one pass through surface features | | | |
| From vertical gap symmetry plane (6 total path lines) | 100.0% | 50.0% | 0.0% |
| From horizontal width symmetry plane (23 total path lines) | 100.0% | 69.5% | 17.4% |

TABLE ZZ-continued

The tabulated model results for the CSF-0-Cis-A 60° surface features with decreasing mass flow rate. For the 10% and 50% flow cases, full mixing was not observed over the 33 feature placed in series.

| Number of features to onset of mixing | 6 | 8 | 10 |
|---|---|---|---|
| Number of features to full mixing (33 total) | 25 | Not applicable | Not applicable |

The results in Table ZZ indicate that the design point flow rate for the CSF-0-Cis-A surface feature with a 60° chevron was very effective in mixing the stream and forcing all of the inlet streams path lines to pass through at least one surface feature. The use of lower flow rates and the same surface feature and channel geometry saw substantially fewer path lines traveling through the features. The 10% and 50% of full flow rates cases had less driving force to travel through these relatively obliquely angled surface features than the higher flow rate. The cis A orientation allowed the full flow rate to take advantage of the lower velocities in the corner, caused by the adjoining solid wall, to allow these corner sections to pass into the additional area given by the surface features. The 60° angle then allowed the exiting flow from the surface feature to leave the surface feature and enter the main channel flow with its momentum more aligned with the direction of flow than if the angle was 45°, for example. When the stream leaves the surface feature it has both flow momentum vectors in the direction of flow and the normal directions which induces mixing in the bulk flow. If the flow rate was to be increased more from the full flow value, increasingly oblique angles may be needed to create mixing, such as 75° or larger. This result indicates that the flow rate through a channel with surface features affects the mixing in the channel, and that the optimal surface feature angle is dependent upon both the channel dimensions and the design flow rate.

Example

Comparison of Time Spent by a Particle in Surface Feature Compared to Main Channel at Different Reynolds Number A case was studied to estimate the time spent by a particle inside the surface features compared to time spent in the main channel (outside surface features) at different Reynolds number. The study was done using computational fluid dynamics tool and the tool used was Fluent V 6.1.22.

The details of the channel dimensions and surface features are shown in FIG. 3b (SFG-1) and described in previous examples. From the point of entrance, the first 3.81 mm section of the channel was without any surface features on any of the walls. The channel cross-section is rectangular in shape and the width and the gap of the channel were 4.57 mm and 1.02 mm. The next 27.94 mm of length contains surface features on the walls with width 4.57 mm and is referred as "surface feature section". The gap of main channel in this section was same as inlet section and was 1.02 mm. The last 5.08 mm length is the exit section and did not have any surface features on any of the walls.

The mesh for CFD model was built using Gambit V2.2.30. The model was built in a way that the gap of the channel (1.02 mm dimension) was in X-direction, length of the channel (36.83 mm dimension) was in Y direction and width of the channel (4.06 mm dimension) was in Z direction. The X-coordinates of the model varied from (1.53 mm, 0, 0) to (2.95 mm, 0, 0). The Y-coordinates of the model varied from (0, 0, 0) to (0, 36.83 mm, 0). The Z-coordinates of the model varied from (0, 0, −4.57 mm) to (0, 0, 0). FIG. 4 shows the X, Y and Z directions and their co-ordinates.

The mesh for the computational fluid analysis was developed in Gambit. The total number of cells was 131106, total number of faces was 542409 and total number of nodes was 177006. The mesh was generated to keep it a regular mesh as much as possible. The fluid considered for has following properties and operating conditions:
i. Viscosity=$1.28 \times 10^{-5}$ kg/m/s
j. Thermal conductivity=0.087 W/m/K
k. Specific heat=2768.03 J/kg/K
l. Density=Using ideal gas law
m. Molecular weight=17.49 g/mol
n. Molecular diffusivity=$1 \times 10^{-5}$ m$^2$/s The inlet face was divided into four equal quadrants as shown in FIG. 4. Each zone was assigned different name, however the thermo-physical properties of each zone were same. So zone A is defined as zone with concentration of A=1, B, C, D=0, zone B is defined as zone with concentration of B=1, A, C and D=0 and so on. The molecular diffusivity between four zones was $1 \times 10^{-5}$ m$^2$/s. The Reynolds number was calculated as $$Re = \frac{\rho v D}{\mu}$$

where ρ=density of fluid, kg/m$^3$
v=Average velocity of fluid at inlet, m/s
D=Hydraulic diameter of channel, m
μ=Viscosity of fluid, kg/m/s Three cases were considered with inlet Reynolds number=10, 100, 1000. The boundary conditions for each case are listed below:
Operating pressure=2379 kPa
Outlet pressure=0 psig
Inlet velocity=0.467 m/s for Re=1000, 0.0467 m/s for Re=10 and 0.00467 m/s for Re=10
Inlet temperature=300 K
Wall temperature=350 K
Zone A mass fraction
 A=1
 B=0
 C=0
 D=0
Zone B mass fraction
 A=0
 B=1
 C=0
 D=0
Zone C mass fraction
 A=0
 B=0
 C=1
 D=0
Zone D mass fraction
 A=0
 B=0
 C=0
 D=1
Model Chosen
K-Omega model (SST type) was chosen for CFD analysis. The values of model constants were default values provided by fluent 6.0. The coefficients of turbulence model were: Alpha*_inf=1; Alpha_inf=0.52; Beta*_inf=0.09; R_beta=8; A1=0.31; Beta_i (inner)=0.075; Beta_i (outer)=0.0828; TKE (inner)P Prandtl#=1.176; TKE(outer)P Prandtl#=1.0; SDR (inner)P Prandtl#=2; SDR(outer)P Prandtl#=1.168; Energy Prandtly number=0.85; Wall Prandtly number=0.85; Turbulent Schmidt number=0.7.

Full multi-component diffusion species transport model was chosen. The diffusivity was 1E-5 $m^2/s$. The properties of mixture of A, B, C and D was calculated based on the mass weighted average. The models were run till mass and energy converged to less than 1% of the inlet mass and energy.

Results

Figure 15:
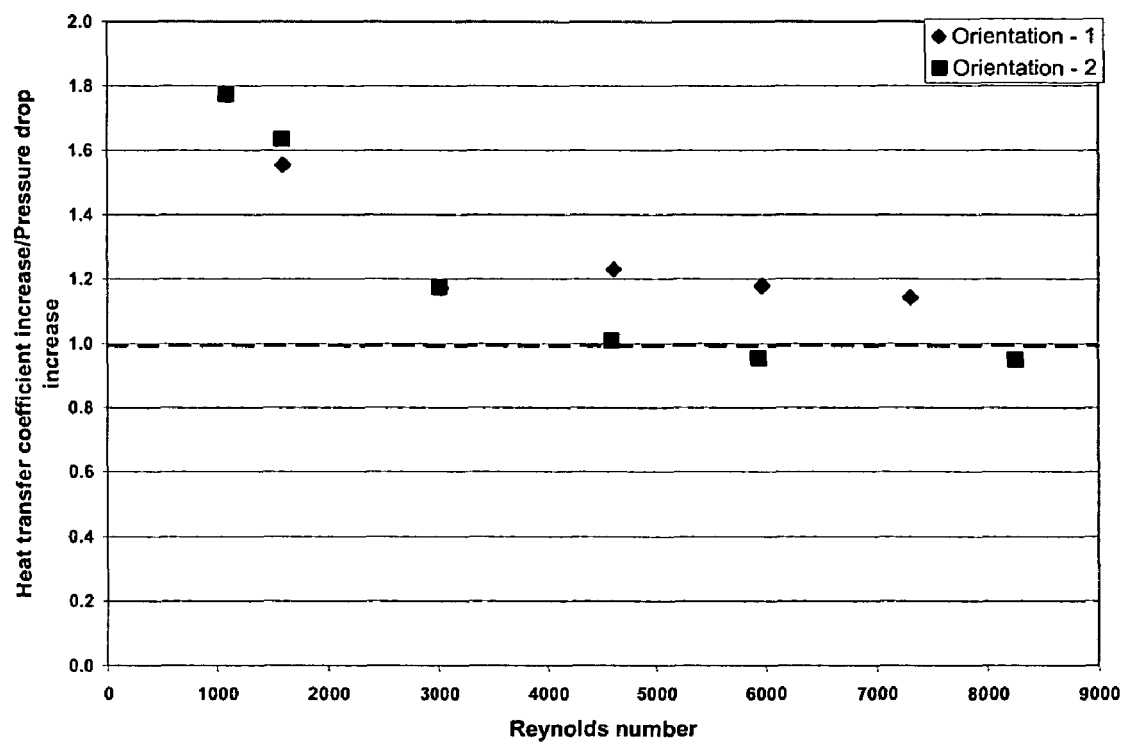
FIG. 15 illustrates particle release location for an example.

Three points were chosen as shown in FIG. 15. All the points were located on the face of the channel where fluid enters. For each point, a mass-less particle was released and how it moves inside the channel was traced. The amount of time particle spent inside the surface features and the time it spent in main channel, outside the surface features was numerically calculated. Particle 1 and particle 2 never entered the surface feature channel for any Reynolds number.

The table below compares the time as Reynolds number is increased from 10 to 1000.

TABLE 1

Comparison of particle time spent inside and outside the surface features

| Reynolds number | Particle 1 % Time Spent | | Particle 2 % Time Spent | | Particle 3 % Time Spent | |
| --- | --- | --- | --- | --- | --- | --- |
| | Inside features | Outside feature (inside main channel) | Inside features | Outside feature (inside main channel) | Inside features | Outside feature (inside main channel) |
| 10 | 0% | 100% | 0% | 100% | 28% | 72% |
| 100 | 0% | 100% | 0% | 100% | 27% | 73% |
| 1000 | 0% | 100% | 0% | 100% | 4% | 96% |

From the table we can see clearly, that the particle in the corner of the channel enters the surface features. Also when the Reynolds number is approximately 1000, chances of particle to be inside the surface feature decreases considerably compared to when the Reynolds number is 10 or 100.

Example

The Effect of Reynolds Number on the Residence Time Spent in the Surface Feature as a Fraction of the Overall Residence Time for an Active Surface Feature Pattern with More than One Angle Per Feature Along the Channel Width A 0.254 m (10") long channel with SFG-0-Cis A/Fanelli type of surface features was considered for the range of Re number from 6 to 600. The simple Chevron type features were mirror images on opposing microchannel faces, in a cis-A configuration relative to the flow. The Chevrons were disconnected at the apex and separated by a distance less than 0.4 mm (or 10% of the total microchannel width). The Fanelli distance or disconnection distance between two legs of a surface feature that are at different angles is preferably less than 20% of the channel width, and more preferably less than 10% of the microchannel width.

The width of the main channel is 0.4064 cm (0.16") and the main channel gap is 0.04572 cm (0.018"). The surface features have depth of 0.254 mm (0.01") and width of 0.381 mm (0.015"). The orientation angle is 45 degrees. Over the whole length of this device there are total of 234 surface features on each side of the opposing wall. The nitrogen is fed to the device at different average velocities. The temperature is constant at 25 C. The pressure at the outlet of the device is set at the 1 atm. The Re number is calculated based on the average velocity at the inlet and the hydraulic diameter of the main channel. The flow field is solved by the Fluent CFD modeling tool.

For the purpose of conducting chemical reactions using the microchannels of feature laden walls, the walls of the flow channels are coated with catalyst. Considering a single surface feature, the ratio of surface area to the fluid volume is quite high. As a result of this, the reactants inside the surface features are more like catalytically converted to the desired products. The time spent inside the surface feature as a fraction of the total residence time can be served as an index for the efficiency of the surface feature The residence time of the fluid spent inside the surface features can be calculated as a fraction of the total residence time by integrating along the trajectories of particles introduced from the inlet of the reactor. For practical purpose, a finite number of particles are released and their trajectories are determined. For the geometry of this example two symmetric planes separate the inlet into four equal quarters. Only trajectories of particles released from one quarter of the inlet need to be considered. The quarter is divided into a number of cells. In each cell one particle is released from the center of it. The more cells that are considered, the larger of the ensemble of the particles whose trajectories are traced, and the more detailed residence time results can be obtained by statistical averaging. For the particles released near the wall, they have much shorter diffusion distance to the catalyst loaded wall. They mostly will be converted on the catalytic walls. For the particles released near the symmetric planes, they are not representative in the sense that they might not flow into the surface features at all, especially if the surface features are completely symmetric. The particles released from the gray area are more representative for the purpose of calculating the residence time of the fluid spent inside the surface feature. For simplicity, only one mass-less particle is released from the dark cell at the center and its trajectory traced.

At any point along the trajectory there is a flow time associated with it which is the real time of the particle spends to arrive that point after its release from the inlet. From the coordinates of any point along the trajectory, it can be determined whether it is inside the recessed space of one of the surface features in the walls. By integrating only the segments of the trajectory which are inside the surface features, the cumulative time of the particle spent in the surface features is calculated. By integrating the whole trajectory from the inlet to the outlet the total residence time is calculated. The ratio of the time the particle spends in the surface features to the total residence time is calculated for all the cases considered and the results are tabulated in the following Table.

| Reynolds number | % Time spent inside the surface features | % Time spent in the main channel |
| --- | --- | --- |
| 6 | 11% | 89% |
| 24 | 16% | 84% |
| 60 | 30% | 70% |
| 600 | 37% | 63% |

The results show that the residence time of the fluid spent inside the surface features as a fraction of the total residence time increases when the Re number is increased although the overall residence time decreases when Re is increased. This indicates that more effective contact with the active surface is achieved when increasing the flow rates or Re number at least for the range of Re number considered for this work.

These results are typical for active surface feature patterns that contain more than one angle across the width of any microchannel wall and where substantially similar surface features are repeated for more than 15 features, especially when using a cis orientation on opposing walls. For patterns with only one angle across the width of the microchannel, the fraction of residence time spent within the features is not necessarily improved as the Reynolds number increases.

What is claimed:

1. Microchannel apparatus, comprising:
a microchannel comprising surface features;
at least a segment of the microchannel characterized by a feature entrance length of more than 10;
wherein the segment is at least 1 cm long;
wherein said segment comprises plural similar, repeating surface features; and
wherein the similar, repeating surface features comprise at least 1 angle in each similar surface feature.

2. The microchannel apparatus of claim 1 wherein the microchannel comprises a circumference and wherein the repeating surface features occupy a majority of the circumference.

3. A method of chemical processing, comprising: flowing a fluid into the apparatus of claim 1 and through the microchannel; and performing a unit operation on the fluid in the microchannel.

4. The microchannel apparatus of claim 1 wherein the microchannel has two, major opposing walls comprising surface features, wherein the surface features have a depth, wherein the distance between two major opposing walls defines the channel gap; and
wherein the ratio surface feature depth:channel gap is greater than 0.3.

5. A method of chemical processing, comprising: flowing a fluid into the apparatus of claim 4 and through the microchannel; and performing a unit operation on the fluid in the microchannel.

6. The microchannel apparatus of claim 4 wherein at least 80% of the perimeter of one surface feature (the perimeter being the interface between the surface feature and the main channel) can be superimposed within the perimeter of a second surface feature by translation along the length in the direction of bulk flow in the main channel, with less than 20 degrees (or, more preferably, without) rotation of either feature perimeter, and at least 80% of the perimeter of the other feature can be superimposed within the perimeter of the one feature by translation along the length in the direction of bulk flow in the main channel, with less than 20 degrees (or, more preferably, without) rotation of either feature perimeter.

7. The microchannel apparatus of claim 4 wherein at least 80% of the perimeter of one surface feature (the perimeter being the interface between the surface feature and the main channel) can be superimposed within the perimeter of a second surface feature by translation along the length in the direction of bulk flow in the main channel, without rotation of either feature perimeter, and at least 80% of the perimeter of the other feature can be superimposed within the perimeter of the one feature by translation along the length in the direction of bulk flow in the main channel, without rotation of either feature perimeter.

8. The microchannel apparatus of claim 1 wherein said plural similar, repeating surface features comprise more than 15 similar, repeating surface features.

9. The microchannel apparatus of claim 4 wherein the surface features on the two major opposing walls are substantially "cis" in orientation relative to each other.

10. The microchannel apparatus of claim 4 wherein the aspect ratio of the surface feature run width to channel gap is in the range of 0.5 to 1.

11. The microchannel apparatus of claim 1 wherein the surface features comprise a catalyst coating.

12. The microchannel apparatus of claim 1 wherein the surface features in said segment comprise more than one angle.

13. The microchannel apparatus of claim 4 wherein the surface features have a depth that is more than 100% of the channel gap.

14. The microchannel apparatus of claim 1 wherein, in the similar surface features, at least 80% of the perimeter of one feature can be superimposed within the perimeter of an adjacent feature without rotation by translation along the length of the microchannel.

15. The microchannel apparatus of claim 4 wherein one major wall comprises surface features having a chevron or check mark pattern, and further wherein surface features on the other major opposing wall comprises a similar array of surface features aligned at the same angle or at an inverted angle.

16. The microchannel apparatus of claim 1 wherein the microchannel has a generally square or rectangular cross-section.

17. The microchannel apparatus of claim 16 comprising surface features on three or more surfaces of the microchannel.

18. The microchannel apparatus of claim 1 comprising a parallel array of planar microchannels connected to a manifold and further comprising surface features within the manifold.

19. The microchannel apparatus of claim 1 comprising surface features in two layers stacked on top of each other wherein the pattern in the two layers is different.

20. The microchannel apparatus of claim 1 further comprising surface features having variable patterns and variable depths.

21. The microchannel apparatus of claim 1 wherein the surface features have a lateral spread ratio in the range of 5 to 20.

* * * * *